(12) United States Patent
Shpayzer et al.

(10) Patent No.: US 12,202,921 B2
(45) Date of Patent: Jan. 21, 2025

(54) MODELING MATERIAL FORMULATIONS USABLE IN ADDITIVE MANUFACTURING OF THREE-DIMENSIONAL OBJECTS AT LOW TEMPERATURES

(71) Applicant: Stratasys Ltd., Rehovot (IL)

(72) Inventors: Elena Shpayzer, Rehovot (IL); Eduardo Napadensky, Natania (IL); Raffy Sarfati, Kibbutz Mishmar David (IL); Mayan Rumbak, Mazkeret Batia (IL); Keren Goldshtein, Rehovot (IL)

(73) Assignee: Stratasys Ltd., Rehovot (IL)

( * ) Notice: Subject to any disclaimer, the term of this patent is extended or adjusted under 35 U.S.C. 154(b) by 173 days.

(21) Appl. No.: 16/959,183

(22) PCT Filed: Dec. 31, 2018

(86) PCT No.: PCT/IL2018/051422
§ 371 (c)(1),
(2) Date: Jun. 30, 2020

(87) PCT Pub. No.: WO2019/130323
PCT Pub. Date: Jul. 4, 2019

(65) Prior Publication Data
US 2020/0399411 A1    Dec. 24, 2020

Related U.S. Application Data

(60) Provisional application No. 62/612,466, filed on Dec. 31, 2017.

(51) Int. Cl.
*B29C 64/00* (2017.01)
*B29C 64/112* (2017.01)
(Continued)

(52) U.S. Cl.
CPC .......... *C08F 220/20* (2013.01); *B29C 64/112* (2017.08); *B29C 64/393* (2017.08);
(Continued)

(58) Field of Classification Search
CPC .............................. C08F 220/20; B33Y 10/00
See application file for complete search history.

(56) References Cited

U.S. PATENT DOCUMENTS 5,932,625 A    8/1999    Watanabe et al.
6,228,923 B1   5/2001    Lombardi et al.
(Continued)

FOREIGN PATENT DOCUMENTS

CN    103189187    7/2013
CN    105594308    5/2016
(Continued)

OTHER PUBLICATIONS

Zioga, A., Ekizoglou, N., Siakali-Kioulafa, E. and Hadjichristidis, N., 1997. Characteristic ratio of poly (tetrahydrofurfuryl acrylate) and poly (2-ethylbutyl acrylate). Journal of Polymer Science Part B: Polymer Physics, 35(10), pp. 1589-1592. (Year: 1997).*

(Continued)

*Primary Examiner* — Nicholas R Krasnow

(57) ABSTRACT

Modeling material formulation systems usable in additive manufacturing, 3D inkjet printing in particular, of three-dimensional objects, are provided. The formulations comprise two or more curable materials, such that an average molecular weight of the curable materials in each formulation is no more than 500 grams/mol, such that each formulation features a viscosity of no more than 50 centipoises at a temperature of 35° C. Kits comprising the formulations or formulation systems and additive manufacturing processes utilizing same are also provided.

10 Claims, 10 Drawing Sheets

(51) Int. Cl.
  *B29C 64/393* (2017.01)
  *B33Y 10/00* (2015.01)
  *B33Y 50/02* (2015.01)
  *B33Y 70/00* (2020.01)
  *C08F 220/20* (2006.01)
  *B29K 71/00* (2006.01)
  *B29K 105/00* (2006.01)
  *B33Y 70/10* (2020.01)
  *C08F 220/18* (2006.01)
  *C08F 222/10* (2006.01)
  *C08F 222/22* (2006.01)

(52) U.S. Cl.
  CPC .............. *B33Y 10/00* (2014.12); *B33Y 50/02* (2014.12); *B33Y 70/00* (2014.12); *B29K 2071/02* (2013.01); *B29K 2105/0094* (2013.01); *B29K 2995/0046* (2013.01); *B29K 2995/0092* (2013.01); *B29K 2995/0093* (2013.01); *B33Y 70/10* (2020.01); *C08F 220/1811* (2020.02); *C08F 222/102* (2020.02); *C08F 222/1063* (2020.02); *C08F 222/225* (2020.02)

(56) References Cited

U.S. PATENT DOCUMENTS

| | | | |
|---|---|---|---|
| 6,259,962 B1 | 7/2001 | Gothait | |
| 6,569,373 B2 | 5/2003 | Napadensky | |
| 6,658,314 B1 | 12/2003 | Gothait | |
| 6,850,334 B1 | 2/2005 | Gothait | |
| 7,183,335 B2 | 2/2007 | Napadensky | |
| 7,209,797 B2 | 4/2007 | Kritchman et al. | |
| 7,211,368 B2* | 5/2007 | Coats | B33Y 10/00 526/261 |
| 7,225,045 B2 | 5/2007 | Gothait et al. | |
| 7,255,825 B2 | 8/2007 | Nielsen et al. | |
| 7,300,619 B2 | 11/2007 | Napadensky et al. | |
| 7,479,510 B2 | 1/2009 | Napadensky et al. | |
| 7,500,846 B2 | 3/2009 | Eshed et al. | |
| 7,962,237 B2 | 6/2011 | Kritchman | |
| 9,031,680 B2 | 5/2015 | Napadensky | |
| 9,227,365 B2 | 1/2016 | Dikovsky et al. | |
| 11,352,514 B1* | 6/2022 | Omeis | C08G 18/73 |
| 11,872,747 B2* | 1/2024 | Kasperchik | B22F 12/41 |
| 2003/0107158 A1 | 6/2003 | Levy | |
| 2003/0207959 A1 | 11/2003 | Napadensky et al. | |
| 2004/0138326 A1* | 7/2004 | Arnold | C08F 265/04 524/556 |
| 2005/0113476 A1 | 5/2005 | Akiyama et al. | |
| 2005/0159501 A1* | 7/2005 | Kiefer-Liptak | C09D 11/101 522/71 |
| 2008/0138515 A1* | 6/2008 | Williams | B29C 64/165 524/588 |
| 2009/0224438 A1* | 9/2009 | Stampfl | B33Y 70/00 264/496 |
| 2010/0007692 A1* | 1/2010 | Vanmaele | B41C 1/003 522/101 |
| 2010/0191360 A1 | 7/2010 | Napadensky et al. | |
| 2013/0040091 A1 | 2/2013 | Dikovsky et al. | |
| 2014/0138326 A1 | 5/2014 | Boodaghians et al. | |
| 2014/0275317 A1* | 9/2014 | Moussa | B29C 64/165 522/111 |
| 2016/0046072 A1* | 2/2016 | Rolland | B29C 64/124 264/401 |
| 2016/0208117 A1* | 7/2016 | Loccufier | B41J 2/01 |
| 2016/0326387 A1 | 11/2016 | Arita et al. | |
| 2017/0120515 A1* | 5/2017 | Rolland | B33Y 10/00 |
| 2017/0173865 A1* | 6/2017 | Dikovsky | B29C 64/112 |
| 2017/0275486 A1* | 9/2017 | Chopra | C09D 11/38 |
| 2018/0100075 A1* | 4/2018 | Chopra | C09D 11/00 |
| 2018/0215937 A1* | 8/2018 | Kim | C09D 11/38 |
| 2018/0251646 A1* | 9/2018 | Rolland | C09D 11/107 |
| 2018/0361773 A1* | 12/2018 | Billiet | B33Y 30/00 |
| 2019/0030678 A1* | 1/2019 | Kumar | B24D 18/00 |
| 2019/0119514 A1 | 4/2019 | Yudovin-Farber et al. | |
| 2019/0240900 A1* | 8/2019 | Jansen | C08F 220/1811 |
| 2019/0249018 A1* | 8/2019 | Steeman | C09D 11/102 |
| 2019/0337117 A1* | 11/2019 | Ganapathiappan | B24B 37/26 |
| 2020/0031040 A1* | 1/2020 | Goredema | H05K 3/287 |
| 2020/0031041 A1* | 1/2020 | Goredema | B29C 64/112 |
| 2020/0079896 A1* | 3/2020 | Nishiura | C08K 3/16 |
| 2020/0095437 A1* | 3/2020 | Haga | C09D 11/102 |
| 2020/0102413 A1* | 4/2020 | Talken | B33Y 70/00 |
| 2020/0115571 A1* | 4/2020 | Civelek | C09D 11/101 |
| 2020/0215747 A1* | 7/2020 | Soppera | B33Y 80/00 |
| 2020/0282637 A1* | 9/2020 | Holt | B22F 12/224 |
| 2020/0338834 A1 | 10/2020 | Sphayzer et al. | |
| 2020/0354542 A1* | 11/2020 | O'Sullivan | C08K 3/22 |
| 2020/0377628 A1* | 12/2020 | Polidore | C08F 136/06 |
| 2020/0399411 A1* | 12/2020 | Shpayzer | B29C 64/393 |
| 2021/0009853 A1* | 1/2021 | Fitzpatrick | C09D 133/08 |
| 2021/0024682 A1* | 1/2021 | Suzuki | C08G 18/6208 |
| 2021/0130523 A1* | 5/2021 | Sugimoto | C08F 290/048 |
| 2021/0162657 A1* | 6/2021 | Chartrain | B29C 64/135 |
| 2021/0205951 A1* | 7/2021 | Ganapathiappan | B24B 37/24 |
| 2021/0317297 A1* | 10/2021 | Jena | A61C 13/34 |
| 2022/0080665 A1* | 3/2022 | Glassman | B29C 64/393 |
| 2022/0089856 A1* | 3/2022 | Kennedy | B29C 64/129 |
| 2022/0154005 A1* | 5/2022 | Fong | B33Y 10/00 |
| 2022/0193988 A1* | 6/2022 | Walker | B29C 64/357 |
| 2022/0259361 A1* | 8/2022 | Ito | G03F 7/027 |
| 2022/0274867 A1* | 9/2022 | Chen | C03C 1/026 |
| 2023/0059558 A1* | 2/2023 | Chien | C08F 2/38 |
| 2023/0158735 A1* | 5/2023 | Hughes | B33Y 10/00 428/311.51 |
| 2023/0357453 A1* | 11/2023 | Page | C08F 220/54 |
| 2024/0083104 A1* | 3/2024 | Garra | B33Y 70/00 |
| 2024/0140022 A1* | 5/2024 | Song | B29C 64/129 |
| 2024/0173914 A1* | 5/2024 | Rau | B29C 64/286 |
| 2024/0174877 A1* | 5/2024 | Asmacher | C08F 290/062 |
| 2024/0198582 A1* | 6/2024 | Frank | G03F 7/2051 |

FOREIGN PATENT DOCUMENTS

| | | |
|---|---|---|
| CN | 106660266 | 5/2017 |
| CN | 107097414 | 8/2017 |
| CN | 107107461 | 8/2017 |
| CN | 107107462 | 8/2017 |
| CN | 107501477 | 12/2017 |
| EP | 3208073 | 8/2017 |
| EP | 3251818 | 12/2017 |
| EP | 3254835 | 12/2017 |
| EP | 3715094 | 9/2020 |
| JP | 2015-219371 | 12/2015 |
| JP | 2017-222049 | 12/2017 |
| JP | 2017-537178 | 12/2017 |
| WO | WO 2015/056614 | 4/2015 |
| WO | WO 2015/118552 | 8/2015 |
| WO | WO 2016/063282 | 4/2016 |
| WO | WO 2016/121587 | 8/2016 |
| WO | WO 2016/142947 | 9/2016 |
| WO | WO 2017/029657 | 2/2017 |
| WO | WO 2017/050604 | 3/2017 |
| WO | WO 2017/122211 | 7/2017 |
| WO | WO 2018/055521 | 3/2018 |
| WO | WO 2018/055522 | 3/2018 |
| WO | WO 2019/130321 | 7/2019 |
| WO | WO 2019/130323 | 7/2019 |

OTHER PUBLICATIONS

English Translation Dated Dec. 27, 2021 of Notification of Office Action and Search Report Dated Nov. 15, 2021 From the State Intellectual Property Office of the People's Republic of China Re. Application No. 201880089704.7. (7 Pages).

Notification of Office Action and Search Report Dated Dec. 9, 2021 From the State Intellectual Property Office of the People's Republic of China Re. Application No. 201880090526.X. (8 Pages).

(56) References Cited

OTHER PUBLICATIONS

Restriction Official Action Dated Jun. 15, 2022 From the US Patent and Trademark Office Re. U.S. Appl. No. 16/959,170. (7 Pages.
English Translation Dated Aug. 21, 2022 of Notification of Office Action and Search Report Dated Aug. 5, 2022 From the State Intellectual Property Office of the People's Republic of China Re. Application No. 201880090526.X. (6 Pages).
Notification of Office Action and Search Report Dated Nov. 15, 2021 From the State Intellectual Property Office of the People's Republic of China Re. Application No. 201880089704.7. (10 Pages).
International Preliminary Report on Patentability Dated Jul. 9, 2020 From the International Bureau of WIPO Re. Application No. PCT/IL2018/051419. (12 Pages).
International Preliminary Report on Patentability Dated Jul. 9, 2020 From the International Bureau of WIPO Re. Application No. PCT/IL2018/051422. (11 Pages).
International Search Report and the Written Opinion Dated Apr. 8, 2019 From the International Searching Authority Re. Application No. PCT/IL2018/051419. (18 Pages).
International Search Report and the Written Opinion Dated Apr. 8, 2019 From the International Searching Authority Re. Application No. PCT/IL2018/051422. (17 Pages).
Communication Pursuant to Article 94(3) EPC Dated Jun. 30, 2022 From the European Patent Office Re. Application No. 18836918.5. (7 Pages).
Notification of Office Action and Search Report Dated Aug. 5, 2022 From the State Intellectual Property Office of the People's Republic of China Re. Application No. 201880090526.X. (8 Pages).
Translation Dated Jan. 17, 2022 of Notification of Office Action Dated Dec. 9, 2021 From the China National Intellectual Property Administration Re. Application No. 201880090526.X. (4 Pages).
Notice of Reason(s) for Rejection Dated Nov. 1, 2022 From the Japan Patent Office Re. Application No. 2020-536771.and its Translation Into English.
Office Action Dated Nov. 28, 2022 From the Israel Patent Office Re. Application No. 275769. (5 Pages).
Notification of Office Action and Search Report Dated Oct. 10, 2022 From the State Intellectual Property Office of the People's Republic of China Re. Application No. 201880089704.7 and Its Translation Into English. (9 Pages).
Official Action Dated Sep. 21, 2022 From the US Patent and Trademark Office Re. U.S. Appl. No. 16/959,170. (34 Pages).
Office Action Dated Dec. 19, 2022 From the Israel Patent Office Re. Application No. 275770. (4 Pages).
Decision on Rejection Dated Feb. 28, 2023 From the State Intellectual Property Office of the People's Republic of China Re. Application No. 2020-536771 and Its Translation Into English. (5 Pages).
Official Action Dated Dec. 15, 2023 from the US Patent and Trademark Office Re. U.S. Appl. No. 16/959,170. (5 pages).
Notice of Reason for Rejection Dated Aug. 12, 2022 From the Japan Patent Office Re. Application No. 2020-536767 and Its Translation Into English. (11 Pages).
Notice of Reason for Rejection Dated Mar. 3, 2023 From the Japan Patent Office Re. Application No. 2020-536767 and its Translation Into English. (8 Pages).
Official Action Dated May 3, 2024 from the US Patent and Trademark Office Re. U.S. Appl. No. 16/959,170. (8 pages).
Notice of Reason for Rejection Dated Jul. 12, 2024 From the Japan Patent Office Re. Application No. 2023-106760 and Its Translation Into English. (11 Pages).
Communication Pursuant to Article 94(3) EPC Dated Apr. 18, 2023 From the European Patent Office Re. Application No. 18836535.7 (8 Pages).
Interview Summary Dated Jun. 13, 2023 from the US Patent and Trademark Office Re. U.S. Appl. No. 16/959,170. (2 pages).
Official Action Dated Apr. 19, 2023 from the US Patent and Trademark Office Re. U.S. Appl. No. 16/959,170. (31 pages).
Notice of Reason(s) for Rejection Dated Feb. 28, 2023 From the Japan Patent Office Re. Application No. 2020-536771. (5 pages).

\* cited by examiner

MODELING MATERIAL FORMULATIONS USABLE IN ADDITIVE MANUFACTURING OF THREE-DIMENSIONAL OBJECTS AT LOW TEMPERATURES

RELATED APPLICATIONS

This application is a National Phase of PCT Patent Application No. PCT/IL2018/051422 having International filing date of Dec. 31, 2018, which claims the benefit of priority under 35 USC § 119(e) of U.S. Provisional Patent Application No. 62/612,466, filed Dec. 31, 2017. The contents of the above applications are all incorporated by reference as if fully set forth in their entirety.

PCT Patent Application No. PCT/IL2018/051422 is also related to U.S. Provisional Patent Application No. 62/612,455, filed on Dec. 31, 2017. The contents of the above applications are all incorporated by reference as if fully set forth herein in their entirety.

The PCT Patent Application No. PCT/IL2018/051422 is also related to co-filed PCT Patent Application No, PCT/IL2018/051419 filed on Dec. 31, 2018 entitled "SUPPORT MATERIAL FORMULATIONS USABLE IN ADDITIVE MANUFACTURING OF THREE-DIMENSIONAL OBJECTS AT LOW TEMPERATURES". The contents of the above applications are all incorporated by reference as if fully set forth in their entirety.

FIELD AND BACKGROUND OF THE INVENTION

The present invention, in some embodiments thereof, relates to additive manufacturing and, more particularly, but not exclusively, to modeling material formulations usable in additive manufacturing processes performed at low working temperatures (e.g., lower than 50° C.).

Additive manufacturing is generally a process in which a three-dimensional (3D) object is manufactured utilizing a computer model of the objects. Such a process is used in various fields, such as design related fields for purposes of visualization, demonstration and mechanical prototyping, as well as for rapid manufacturing (RM).

The basic operation of any AM system consists of slicing a three-dimensional computer model into thin cross sections, translating the result into two-dimensional position data and feeding the data to control equipment which manufacture a three-dimensional structure in a layerwise manner.

Various AM technologies exist, amongst which are stereolithography, digital light processing (DLP), and three dimensional (3D) printing, 3D inkjet printing in particular. Such techniques are generally performed by layer by layer deposition and solidification of one or more building materials, typically photopolymerizable (photocurable) materials.

In three-dimensional printing processes, for example, a building material is dispensed from a print head having a set of nozzles to deposit layers on a supporting structure. Depending on the building material, the layers may then solidify, harden or cured, optionally using a suitable device.

Various three-dimensional printing techniques exist and are disclosed in, e.g., U.S. Pat. Nos. 6,259,962, 6,569,373, 6,658,314, 6,850,334, 7,183,335, 7,209,797, 7,225,045, 7,300,619, 7,479,510, 7,500,846, 7,962,237 and 9,031,680, all of the same Assignee, the contents of which are hereby incorporated by reference.

A printing system utilized in additive manufacturing may include a receiving medium and one or more print heads. The receiving medium can be, for example, a fabrication tray that may include a horizontal surface to carry the material dispensed from the print head. The print head may be, for example, an ink jet head having a plurality of dispensing nozzles arranged in an array of one or more rows along the longitudinal axis of the print head. The print head may be located such that its longitudinal axis is substantially parallel to the indexing direction. he printing system may further include a controller, such as a microprocessor to control the printing process, including the movement of the print head according to a pre-defined scanning plan (e.g., a CAD configuration converted to a Stereo Lithography (STL) format and programmed into the controller). The print head may include a plurality of jetting nozzles. The jetting nozzles dispense material onto the receiving medium to create the layers representing cross sections of a 3D object.

In addition to the print head, there may be a source of curing energy, for curing the dispensed building material. The curing energy is typically radiation, for example, UV radiation.

Additionally, the printing system may include a leveling device for leveling and/or establishing the height of each layer after deposition and at least partial solidification, prior to the deposition of a subsequent layer.

The building materials may include modeling materials and support materials, which form the object and the temporary support constructions supporting the object as it is being built, respectively.

The modeling material (which may include one or more material(s)) is deposited to produce the desired object/s and the support material (which may include one or more material(s)) is used, with or without modeling material elements, to provide support structures for specific areas of the object during building and assure adequate vertical placement of subsequent object layers, e.g., in cases where objects include overhanging features or shapes such as curved geometries, negative angles, voids, and so on.

Both the modeling and support materials are preferably liquid at the working temperature at which they are dispensed, and subsequently harden or solidify, typically upon exposure to a curing condition, typically curing energy (e.g., UV curing), to form the required layer shape. After printing completion, support structures are removed to reveal the final shape of the fabricated 3D object.

Several additive manufacturing processes allow additive formation of objects using more than one modeling material, also referred to as "multi-material" AM processes. For example, U.S. Patent Application having Publication No. 2010/0191360, of the present Assignee, discloses a system which comprises a solid freeform fabrication apparatus having a plurality of print heads, a building material supply apparatus configured to supply a plurality of building materials to the fabrication apparatus, and a control unit configured for controlling the fabrication and supply apparatus. The system has several operation modes. In one mode, all print heads operate during a single building scan cycle of the fabrication apparatus. In another mode, one or more of the print heads is not operative during a single building scan cycle or part thereof.

In a 3D inkjet printing process such as Polyjet™ (Stratasys Ltd., Israel), the building material is selectively jetted from one or more print heads and deposited onto a fabrication tray in consecutive layers according to a pre-determined configuration as defined by a software file.

The Polyjet™ technology allows control over the position and composition of each voxel (volume pixel), which affords enormous design versatility and digital programming of multi-material structures. Other advantages of the Polyjet™ technology is the very high printing resolution, up to 14 μm layer height, and the ability to print multiple materials simultaneously, in a single object. This multi-material 3D printing process often serves for fabrication of complex parts and structures that are comprised of elements having different stiffness, performance, color or transparency. New range of materials, programmed at the voxel level, can be created by the PolyJet™ printing process, using only few starting materials.

U.S. Pat. No. 9,227,365, by the present assignee, discloses methods and systems for solid freeform fabrication of shelled objects, constructed from a plurality of layers and a layered core constituting core regions and a layered shell constituting envelope regions. These methodologies are referred to also as Digital ABS.

Current PolyJet™ technology offers the capability to use a range of curable (e.g., polymerizable) materials that provide polymeric materials featuring a variety of properties, ranging, for example, from stiff and hard materials (e.g., curable formulations marketed as the Vero™ Family materials) to soft and flexible materials (e.g., curable formulations marketed as the Tango™ and Agilus™ families), and including also objects made using Digital ABS, which contain a shelled multi-material made of two starting materials (e.g., RGD515 & RGD535/531), and simulate properties of engineering plastic. Most of the currently practiced PolyJet materials are curable materials which harden or solidify upon exposure to radiation, mostly UV radiation and/or heat.

In order to be compatible with most of the commercially-available print heads utilized in a 3D inkjet printing system, the uncured building material should feature the following characteristics: a relatively low viscosity (e.g., Brookfield Viscosity of up to 50 cps, or up to 35 cps, preferably from 8 to 25 cps) at the working (e.g., jetting) temperature; Surface tension of from about 25 to about 55 Dyne/cm, preferably from about 25 to about 40 Dyne/cm; and a Newtonian liquid behavior and high reactivity to a selected curing condition, to enable fast solidification of the jetted layer upon exposure to a curing condition, of no more than 1 minute, preferably no more than 20 seconds. Additional requirements include low boiling point solvents (if solvents are used), e.g., featuring a boiling temperature lower than 200 or lower than 190° C., yet characterized preferably by low evaporation rate at the working (e.g., jetting) temperature, and, if the building material includes solid particles, these should feature an average size of no more than 2 microns.

Most of the currently available formulations usable in inkjet printing feature the required viscosity (e.g., from 8 to 25 cps) at a working (e.g., jetting) temperature of 50-90° C. These formulations are not suitable for applications that require low temperature of, for example, 30-40° C., such as office/home environment and printing of biomolecules and other temperature-sensitive materials, since their viscosity at such temperatures increase drastically, beyond the system's requirements.

Additional background art includes WO 2017/050604, PCT/IB2017/055696 and PCT/M2017/055692, all by the present assignee.

SUMMARY OF THE INVENTION

According to an aspect of some embodiments of the present invention there is provided a modeling material formulation system usable in additive manufacturing of a three-dimension object, the formulation system comprising at least two curable materials and featuring a viscosity of no more than 50 cPs at 35° C., wherein an average molecular weight, as defined herein, of the at least two curable materials is no more than 500 grams/mol.

According to some of any of the embodiments described herein the additive manufacturing is 3D inkjet printing.

According to some of any of the embodiments described herein the formulation system comprises at least one formulation which, when hardened, provides a non-elastomeric material, the at least one formulation comprising:

at least one hydrophobic curable material which provides, when hardened, a material featuring Tg higher than 80° C.;

at least one hydrophilic curable material which provides, when hardened, a material featuring Tg higher than 80° C.

According to some of any of the embodiments described herein a total amount of the at least one hydrophobic curable material which provides, when hardened, a material featuring Tg higher than 80° C., is from 25 to 60 weight percents of the total weight of a formulation containing same.

According to some of any of the embodiments described herein the at least one hydrophobic curable material comprises at least one monofunctional curable material, and/or at least one multifunctional curable material.

According to some of any of the embodiments described herein an amount of the at least one hydrophobic monofunctional curable material ranges from 30 to 60 weight percents of the total weight of the formulation containing same.

According to some of any of the embodiments described herein an amount of the at least one hydrophobic multifunctional curable material ranges from 0 to 25 weight percents of the total weight of a formulation containing same.

According to some of any of the embodiments described herein a total amount of the at least one hydrophilic curable material which provides, when hardened, a material featuring Tg higher than 80° C., is from 15 to 35 weight percents of the total weight of a formulation containing same.

According to some of any of the embodiments described herein the at least one hydrophilic curable material comprises at least one monofunctional curable material and/or at least one multifunctional curable material.

According to some of any of the embodiments described herein an amount of the at least one hydrophilic monofunctional curable material ranges from 15 to 35, or from 15 to 30 weight percents of the total weight of a formulation containing same.

According to some of any of the embodiments described herein an amount of the at least one hydrophilic multifunctional curable material ranges from 0 to 5 weight percents of the total weight of a formulation containing same.

According to some of any of the embodiments described herein the at least one formulation further comprises at least one of:

at least one hydrophobic curable material which provides, when hardened, a material featuring Tg lower than 25° C.;

at least one hydrophilic curable material which provides, when hardened, a material featuring Tg lower than 25° C.; and at least one hydrophilic curable material which provides, when hardened, a material featuring Tg that ranges from 25° C. to 80° C.

According to some of any of the embodiments described herein a total amount of the at least one hydrophobic curable material which provides, when hardened, a material featuring Tg lower than 25° C. ranges from 0 to 15 weight percents of the total weight of a formulation containing same.

According to some of any of the embodiments described herein the at least one hydrophobic curable material comprises at least one monofunctional curable material, and/or at least one multifunctional curable material.

According to some of any of the embodiments described herein an amount of the at least one hydrophobic monofunctional curable material ranges from 0 to 5 weight percents of the total weight of a formulation containing same.

According to some of any of the embodiments described herein an amount of the at least one hydrophobic multifunctional curable material ranges from 0 to 10 weight percents of the total weight of a formulation containing same.

According to some of any of the embodiments described herein a total amount of the at least one hydrophilic curable material which provides, when hardened, a material featuring Tg lower than 25° C. ranges from 0 to 30 weight percents of the total weight of a formulation containing same.

According to some of any of the embodiments described herein the at least one hydrophilic curable material which provides, when hardened, a material featuring Tg lower than 25° C. comprises at least one hydrophilic monofunctional curable material and/or at least one hydrophilic multifunctional curable material.

According to some of any of the embodiments described herein an amount of the at least one hydrophilic monofunctional curable material featuring Tg lower than 25° C. ranges from 0 to 5 weight percents of the total weight of a formulation containing same.

According to some of any of the embodiments described herein an amount of the at least one hydrophilic multifunctional curable material featuring Tg lower than 25° C. ranges from 0 to 30 weight percents of the total weight of a formulation containing same.

According to some of any of the embodiments described herein a total amount of the at least one hydrophilic curable material which provides, when hardened, a material featuring Tg that ranges from 25° C. to 80° C. ranges from 0 to 15 weight percents of the total weight of a formulation containing same.

According to some of any of the embodiments described herein a total amount of hydrophobic curable materials ranges from 35 to 75 weight percents of the total weight of a formulation containing same.

According to some of any of the embodiments described herein a total amount of hydrophilic curable materials ranges from 20 to 60 weight percents of the total weight of a formulation containing same.

According to some of any of the embodiments described herein the at least one formulation further comprises a curable material featuring a viscosity at room temperature of no more than 15 centipoises.

According to some of any of the embodiments described herein an amount the curable material ranges from 0 to 10, or from 0 to 7, weight percents of the total weight of the formulation comprising same.

According to some of any of the embodiments described herein the three-dimensional object is a non-shelled object.

According to some of any of the embodiments described herein a total amount of the at least one hydrophobic curable material which provides, when hardened, a material featuring Tg higher than 80° C., is from 50 to 60 weight percents of the total weight of a formulation containing same.

According to some of any of the embodiments described herein the at least one hydrophobic curable material which provides, when hardened, a material featuring Tg higher than 80° C. comprises at least one hydrophobic monofunctional curable material and/or at least one hydrophobic multifunctional curable material, each independently provides, when hardened, a material featuring Tg higher than 80° C.

According to some of any of the embodiments described herein an amount of the at least one hydrophobic monofunctional curable material ranges from 30 to 60 weight percents of the total weight of a formulation containing same.

According to some of any of the embodiments described herein an amount of the at least one hydrophobic multifunctional curable material ranges from 0 to 25 weight percents of the total weight of a formulation containing same.

According to some of any of the embodiments described herein a total amount of the at least one hydrophilic curable material which provides, when hardened, a material featuring Tg higher than 80° C., is from 15 to 30 weight percents of the total weight of a formulation containing same.

According to some of any of the embodiments described herein the at least one hydrophilic curable material which provides, when hardened, a material featuring Tg higher than 80° C. comprises at least one hydrophilic monofunctional curable material and/or at least one hydrophilic multifunctional curable material, each independently provides, when hardened, a material featuring Tg higher than 80° C.

According to some of any of the embodiments described herein an amount of the at least one hydrophilic monofunctional curable material which provides, when hardened, a material featuring Tg higher than 80° C., ranges from 15 to 25 weight percents of the total weight of the at least one formulation.

According to some of any of the embodiments described herein an amount of the at least one hydrophilic multifunctional curable material ranges from 0 to 5 weight percents of the total weight of a formulation containing same.

According to some of any of the embodiments described herein a total amount of the at least one hydrophobic curable material which provides, when hardened, a material featuring Tg lower than 25° C., if present, ranges from 0 to 15 weight percents of the total weight of a formulation containing same.

According to some of any of the embodiments described herein the at least one hydrophobic curable material which provides, when hardened, a material featuring Tg lower than 25° C. comprises at least one hydrophobic monofunctional curable material, and/or at least one hydrophobic multifunctional curable material, each independently provides, when hardened, a material featuring Tg lower than 25° C.

According to some of any of the embodiments described herein an amount of the at least one hydrophobic monofunctional curable material which provides, when hardened, a material featuring Tg lower than 25° C., ranges from 0 to 5 weight percents of the total weight of a formulation containing same.

According to some of any of the embodiments described herein an amount of the at least one hydrophobic multifunctional curable which provides, when hardened, a material featuring Tg lower than 25° C. material ranges from 0 to 15 weight percents of the total weight of a formulation containing same.

According to some of any of the embodiments described herein a total amount of the at least one hydrophilic curable material(s) which provide(s), when hardened, a material featuring Tg lower than 25° C., if present, ranges from 0 to 10 weight percents of the total weight of a formulation containing same.

According to some of any of the embodiments described herein the at least one hydrophilic curable material which provides, when hardened, a material featuring Tg lower than 25° C., if present, comprises at least one hydrophilic monofunctional curable material and/or at least one hydrophilic multifunctional curable material, each independently provides, when hardened, a material featuring Tg lower than 25° C.

According to some of any of the embodiments described herein an amount of the at least one hydrophilic monofunctional curable material which provides, when hardened, a material featuring Tg lower than 25° C., ranges from 1 to 10 weight percents of the total weight formulation containing same.

According to some of any of the embodiments described herein an amount of the at least one hydrophilic multifunctional curable material which provides, when hardened, a material featuring Tg lower than 25° C., ranges from 0 to 5 weight percents of the total weight of a formulation containing same.

According to some of any of the embodiments described herein the at least one formulation comprises a first formulation which is characterized, when hardened, by heat deflection temperature (HDT) of at least 60° C., and a second formulation which is characterized, when hardened, by Izod impact resistance (IR) value of at least 35 J/m, wherein each of the first and the second formulations comprises the at least one hydrophobic curable material which provides, when hardened, a material featuring Tg higher than 80° C., and the at least one hydrophilic curable material which provides, when hardened, a material featuring Tg higher than 80° C.

According to some of any of the embodiments described herein a total amount of the at least one hydrophobic curable material which provides, when hardened, a material featuring Tg higher than 80° C., is from 50 to 60 weight percents of the total weight of the first formulation.

According to some of any of the embodiments described herein the at least one hydrophobic curable material which provides, when hardened, a material featuring Tg higher than 80° C. in the first formulation comprises at least one hydrophobic monofunctional curable material and/or at least one hydrophobic multifunctional curable material, each independently provides, when hardened, a material featuring Tg higher than 80° C.

According to some of any of the embodiments described herein an amount of the at least one hydrophobic monofunctional curable material which provides, when hardened, a material featuring Tg higher than 80° C. ranges from 25 to 40 weight percents of the total weight of the first formulation.

According to some of any of the embodiments described herein an amount of the at least one hydrophobic multifunctional curable material which provides, when hardened, a material featuring Tg higher than 80° C. ranges from 15 to 30 weight percents of the total weight of the first formulation.

According to some of any of the embodiments described herein a total amount of the at least one hydrophilic curable material which provides, when hardened, a material featuring Tg higher than 80° C., in the first formulation, is from 25 to 35 weight percents of the total weight of the first formulation.

According to some of any of the embodiments described herein the at least one hydrophilic curable material which provides, when hardened, a material featuring Tg higher than 80° C. in the first formulation comprises at least one monofunctional curable material and/or at least one multifunctional curable material, each independently provides, when hardened, a material featuring Tg higher than 80° C.

According to some of any of the embodiments described herein an amount of the at least one hydrophilic monofunctional curable material which provides, when hardened, a material featuring Tg higher than 80° C., ranges from 20 to 35 weight percents of the total weight of the first formulation.

According to some of any of the embodiments described herein an amount of the at least one hydrophilic multifunctional curable material which provides, when hardened, a material featuring Tg higher than 80° C. ranges from 0 to 5 weight percents of the total weight of the first formulation.

According to some of any of the embodiments described herein a total amount of the at least one hydrophobic curable material which provides, when hardened, a material featuring Tg lower than 25° C., if present in the first formulation, ranges from 0 to 15 of the total weight of the first formulation.

According to some of any of the embodiments described herein the at least one hydrophobic curable material in the first formulation comprises at least one hydrophobic monofunctional curable material and/or at least one hydrophobic multifunctional curable material.

According to some of any of the embodiments described herein an amount of the at least one hydrophobic monofunctional curable material which provides, when hardened, a material featuring Tg lower than 25° C. ranges from 0 to 5 weight percents of the total weight of the first formulation.

According to some of any of the embodiments described herein an amount of the at least one hydrophobic multifunctional curable material which provides, when hardened, a material featuring Tg lower than 25° C., ranges from 0 to 15 weight percents of the total weight of the first formulation.

According to some of any of the embodiments described herein a total amount of the at least one hydrophilic curable material which provides, when hardened, a material featuring Tg lower than 25° C., if present in the first formulation, ranges from 0 to 5 of the total weight of the first formulation.

According to some of any of the embodiments described herein the at least one hydrophilic curable material which provides, when hardened, a material featuring Tg lower than 25° C., if present in the first formulation, comprises at least one hydrophilic monofunctional curable material and/or at least one hydrophilic multifunctional curable material.

According to some of any of the embodiments described herein an amount of the at least one hydrophilic monofunctional curable material which provides, when hardened, a material featuring Tg lower than 25° C., ranges from 0 to 5 weight percents of the total weight of the first formulation.

According to some of any of the embodiments described herein an amount of the at least one hydrophilic multifunctional curable material which provides, when hardened, a material featuring Tg lower than 25° C., ranges from 0 to 5 weight percents of the total weight of the first formulation.

According to some of any of the embodiments described herein a total amount of the at least one hydrophobic curable material which provides, when hardened, a material featuring Tg higher than 80° C., is from 30 to 45 weight percents of the total weight of the second formulation.

According to some of any of the embodiments described herein the at least one hydrophobic curable material which provides, when hardened, a material featuring Tg higher than 80° C. in the second formulation comprises at least one hydrophobic monofunctional curable material and/or at least one hydrophobic multifunctional curable material, each independently provides, when hardened, a material featuring Tg higher than 80° C. According to some of any of the embodiments described herein an amount of the at least one hydrophobic monofunctional curable material which provides, when hardened, a material featuring Tg higher than 80° C., ranges from 25 to 40 weight percents of the total weight of the second formulation.

According to some of any of the embodiments described herein an amount of the at least one hydrophobic multifunctional curable material which provides, when hardened, a material featuring Tg higher than 80° C., ranges from 0 to 25 weight percents of the total weight of the second formulation.

According to some of any of the embodiments described herein a total amount of the at least one hydrophilic curable material which provides, when hardened, a material featuring Tg higher than 80° C., in the second formulation, is from 25 to 35 weight percents of the total weight of the second formulation.

According to some of any of the embodiments described herein the at least one hydrophilic curable material which provides, when hardened, a material featuring Tg higher than 80° C. in the second formulation comprises at least one monofunctional curable material and/or at least one multifunctional curable material, each independently provides, when hardened, a material featuring Tg higher than 80° C.

According to some of any of the embodiments described herein an amount of the at least one hydrophobic monofunctional curable material which provides, when hardened, a material featuring Tg higher than 80° C., ranges from 20 to 35 weight percents of the total weight of the second formulation.

According to some of any of the embodiments described herein an amount of the at least one hydrophobic multifunctional curable material which provides, when hardened, a material featuring Tg higher than 80° C. ranges from 0 to 5 weight percents of the total weight of the second formulation.

According to some of any of the embodiments described herein a total amount of the at least one hydrophobic curable material which provides, when hardened, a material featuring Tg lower than 25° C., if present in the second formulation, ranges from 0 to 5 weight percents of the total weight of the second formulation.

According to some of any of the embodiments described herein the at least one hydrophobic curable material in the second formulation comprises at least one hydrophobic monofunctional curable material and/or at least one hydrophobic multifunctional curable material, each independently provides, when hardened, a material featuring Tg lower than 25° C.

According to some of any of the embodiments described herein an amount of the at least one hydrophobic monofunctional curable material which provides, when hardened, a material featuring Tg lower than 25° C., ranges from 0 to 5 weight percents of the total weight of the second formulation.

According to some of any of the embodiments described herein an amount of the at least one hydrophobic multifunctional curable material which provides, when hardened, a material featuring Tg lower than 25° C., ranges from 0 to 5 weight percents of the total weight of the second formulation.

According to some of any of the embodiments described herein a total amount of the at least one hydrophilic curable material which provides, when hardened, a material featuring Tg lower than 25° C., if present in the second formulation, ranges from 10 to 30 of the total weight of the second formulation.

According to some of any of the embodiments described herein the at least one hydrophilic curable material which provides, when hardened, a material featuring Tg lower than 25° C., if present in the second formulation, comprises at least one hydrophilic monofunctional curable material and/or at least one hydrophilic multifunctional curable material, each independently provides, when hardened, a material featuring Tg lower than 25° C.

According to some of any of the embodiments described herein an amount of the at least one hydrophilic monofunctional curable material which provides, when hardened, a material featuring Tg lower than 25° C., ranges from 0 to 5 weight percents of the total weight of the second formulation.

According to some of any of the embodiments described herein an amount of the at least one hydrophilic multifunctional curable material provides, when hardened, a material featuring Tg lower than 25° C., ranges from 10 to 30 weight percents of the total weight of the second formulation.

According to some of any of the embodiments described herein the at least one formulation comprises at least one formulation which, when hardened, provides an elastomeric material, the at least one formulation comprising:
an elastomeric curable material;
a monofunctional mono-functional curable material; and
optionally, a difunctional curable material.

According to some of any of the embodiments described herein an amount of the elastomeric curable material is at least 30 weight percents of the total weight of formulation containing same.

According to some of any of the embodiments described herein an amount of the elastomeric curable material ranges from 35 to 60 weight percents of the total weight of formulation containing same.

According to some of any of the embodiments described herein a total amount of the at least one monofunctional curable material ranges from about 20 to about 60 of the total weight of a formulation containing same.

According to some of any of the embodiments described herein the at least one monofunctional curable material comprises a hydrophobic monofunctional curable material provides, when hardened, a material featuring Tg of at least 80° C.

According to some of any of the embodiments described herein an amount of the hydrophobic monofunctional curable material which provides, when hardened, a material featuring Tg of at least 80° C., ranges from 20 to 30 weight percents of the total weight of a formulation containing same.

According to some of any of the embodiments described herein the at least one monofunctional curable material comprises at least one hydrophilic monofunctional curable material that provides, when hardened, a material featuring Tg lower than 25° C.

According to some of any of the embodiments described herein an amount of the hydrophilic monofunctional curable material which provides, when hardened, a material featuring Tg lower than 25° C., is no more than 25 weight percents weight percents of the total weight of a formulation containing same.

According to some of any of the embodiments described herein the at least one monofunctional curable material comprises at least one hydrophobic monofunctional curable material that provides, when hardened, a material featuring Tg lower than 25° C.

According to some of any of the embodiments described herein an amount of the hydrophobic monofunctional curable material which provides, when hardened, a material featuring Tg lower than 25° C., is no more than 10 weight percents weight percents of the total weight of a formulation containing same.

According to some of any of the embodiments described herein an amount of the difunctional curable material, if present, ranges from 1 to 15, or from 1 to 5, weight percents of the total weight of a formulation containing same.

According to some of any of the embodiments described herein the at least one formulation further comprises a non-reactive material featuring a viscosity, at room temperature, of no more than 15 centipoises or no more than 10 centipoises.

According to some of any of the embodiments described herein the non-reactive material is a polymeric material.

According to some of any of the embodiments described herein an amount of the non-reactive material ranges from 0 to 10 weight percents of the total weight of the at least one formulation.

According to some of any of the embodiments described herein each of the two or more curable materials are UV-curable materials.

According to some of any of the embodiments described herein the formulation further comprises a photoinitiator.

According to some of any of the embodiments described herein an amount of the photoinitiator in each formulation in the formulation system ranges from 1 to 3 weight percents of the total weight of a formulation comprising same.

According to an aspect of some embodiments of the present invention there is provided a method of fabricating a three-dimensional object, the method comprising:
   receiving three-dimensional printing data corresponding to the shape of the object; and
   dispensing droplets of the formulation system as described herein in any of the respective embodiments in layers, on a receiving medium, using at least one inkjet printing head, according to the printing data,
   wherein a temperature of the inkjet printing heads and of the formulation system is no more than 40° C.

According to an aspect of some embodiments of the present invention there is provided a kit comprising the formulation system as described herein in any of the respective embodiments, identified for use in 3D inkjet printing of a three-dimensional object.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
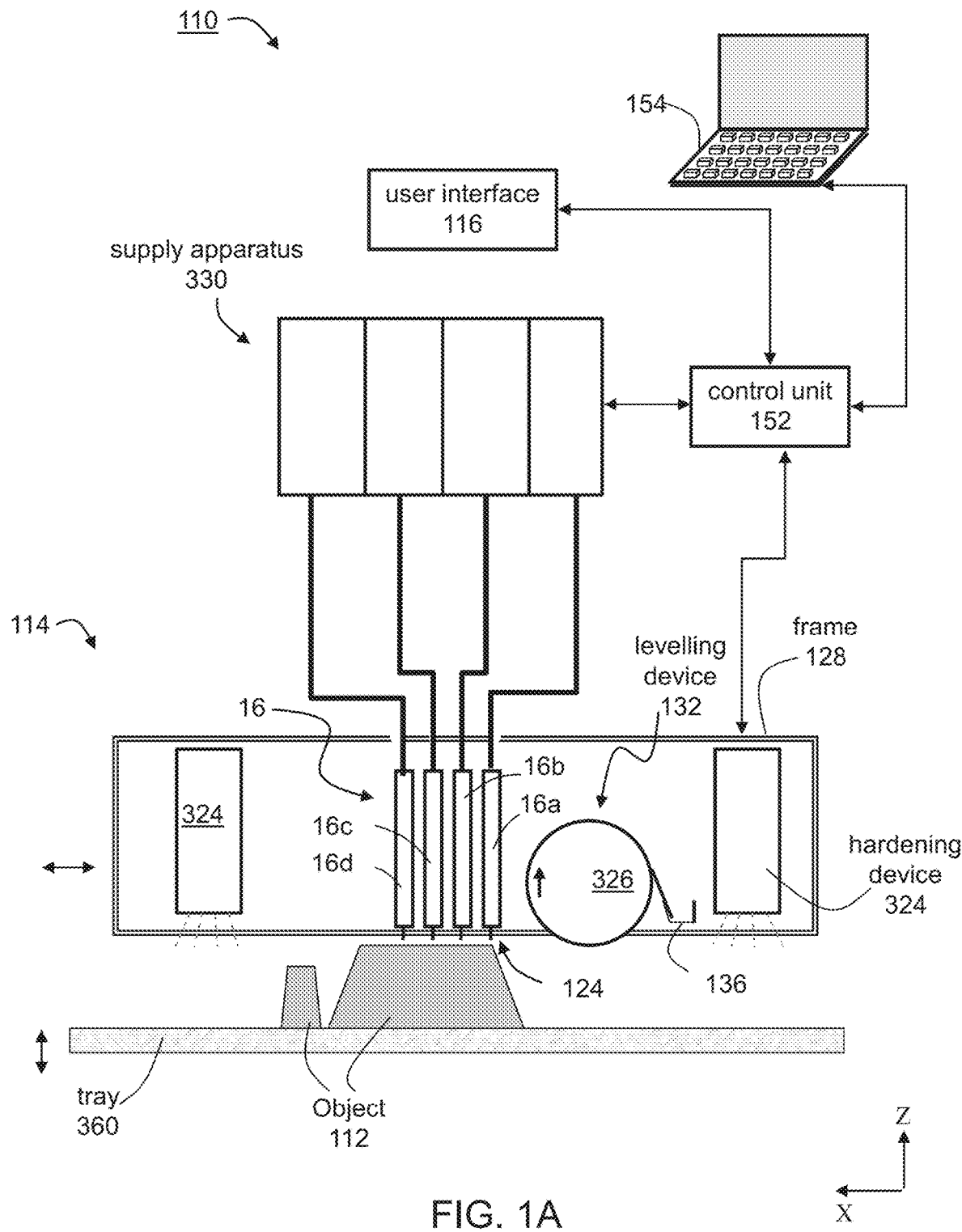
FIGS. 1A-D are schematic illustrations of an additive manufacturing system according to some embodiments of the invention.

The present invention, in some embodiments thereof, relates to additive manufacturing and, more particularly, but not exclusively, to modeling material formulations usable in additive manufacturing processes performed at low working temperatures (e.g., lower than 50° C.).

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As discussed hereinabove, curable materials that are usable in additive manufacturing, and particularly in 3D inkjet printing, of 3D objects, should feature properties which, in addition to providing model objects that feature the required properties, meet the process requirements. In 3D inkjet printing, for example, formulations comprising the curable materials (the uncured building material) should be jettable, that is, stable and compatible with the jetting system, such that effective jetting, without damaging the print heads and the jetting nozzles, is effected.

As further discussed hereinabove, in order to meet the jetting requirements, an uncured building material should feature a relatively low viscosity (e.g., Brookfield Viscosity of up to 50 cps, or up to 35 cps, preferably from 8 to 25 cps) at the working (e.g., jetting) temperature; Surface tension of from about 25 to about 55 Dyne/cm, preferably from about 25 to about 40 Dyne/cm; and a Newtonian liquid behavior and high reactivity to a selected curing condition, to enable fast solidification of the jetted layer upon exposure to a curing condition, of no more than 1 minute, preferably no more than 20 seconds. Additional requirements include low boiling point solvents (if solvents are used), e.g., featuring a boiling temperature lower than 200 or lower than 190° C., yet characterized preferably by low evaporation rate at the working (e.g., jetting) temperature, and, if the building material includes solid particles, these should feature an average size of no more than 2 microns.

Most of the currently available formulations usable in inkjet printing feature the required viscosity (e.g., from 8 to 25 cps) at a working (e.g., jetting) temperature of 50-90° C., typically 70° C., thus requiring heating the jetting apparatus and optionally the formulation itself, during the printing process.

Such a working temperature prevents the use of volatile solvents, of materials that are temperature-sensitive, such as biological materials, and moreover, is not suitable for applications in an office or home environment.

In a search for material formulations that are jettable, as defined herein, at lower temperatures that are compatible with the above-mentioned applications, the present inventors have conducted laborious, extensive studies, in which varying modifications were introduced into currently available building materials (uncured).

During these studies, the present inventors have designed and successfully practiced modeling material formulations which, when hardened, provide materials that feature thermal and mechanical properties that are similar to those provided by currently available formulations, yet, are jettable at low working temperatures, that is, at a temperature which is lower than 50° C.

Embodiments of the present invention therefore relate to novel formulations and formulation systems which are usable in additive manufacturing such as 3D inkjet printing, to kits comprising these formulations and formulation systems, to additive manufacturing utilizing these formulations and formulation systems and to 3D objects obtained thereby.

Herein throughout, the term "object" describes a final product of the additive manufacturing. This term refers to the product obtained by a method as described herein, after removal of the support material, if such has been used as part of the building material. The "object" therefore essentially consists (at least 95 weight percents) of a hardened (e.g., cured) modeling material.

The term "object" as used herein throughout refers to a whole object or a part thereof.

Herein throughout, the phrases "building material formulation", "uncured building material", "uncured building material formulation", "building material" and other variations therefore, collectively describe the materials that are dispensed to sequentially form the layers, as described herein. This phrase encompasses uncured materials dispensed so as to form the object, namely, one or more uncured modeling material formulation(s), and uncured materials dispensed so as to form the support, namely uncured support material formulations.

Herein throughout, the phrase "cured modeling material" or "hardened modeling material" describes the part of the building material that forms the object, as defined herein, upon exposing the dispensed building material to curing, and, optionally, if a support material has been dispensed, also upon removal of the cured support material, as described herein. The cured modeling material can be a single cured material or a mixture of two or more cured materials, depending on the modeling material formulations used in the method, as described herein.

The phrase "cured modeling material" or "cured modeling material formulation" can be regarded as a cured building material wherein the building material consists only of a modeling material formulation (and not of a support material formulation). That is, this phrase refers to the portion of the building material, which is used to provide the final object.

Herein throughout, the phrase "modeling material formulation", which is also referred to herein interchangeably as "modeling formulation", "model formulation" "model material formulation" or simply as "formulation", describes a part or all of the building material which is dispensed so as to form the object, as described herein. The modeling material formulation is an uncured modeling formulation (unless specifically indicated otherwise), which, upon exposure to curing condition, forms the object or a part thereof.

In some embodiments of the present invention, a modeling material formulation is formulated for use in three-dimensional inkjet printing and is able to form a three-dimensional object on its own, i.e., without having to be mixed or combined with any other substance.

In some embodiments of the present invention, a modeling material formulation is formulated for use in three-dimensional inkjet printing, while circumventing the need to apply heating to the jetting apparatus, for example, to the printing heads and/or nozzle arrays.

An uncured building material can comprise one or more modeling material formulations, and can be dispensed such that different parts of the object are made, upon curing, of different cured modeling formulations or different combinations thereof, and hence are made of different cured modeling materials or different mixtures of cured modeling materials.

The formulations forming the building material (modeling material formulations and support material formulations) comprise one or more curable materials, which, when exposed to a curing condition, form hardened (cured) material.

Herein throughout, a "curable material" is a compound (typically a monomeric or oligomeric compound, yet optionally a polymeric material) which, when exposed to a curing condition, as described herein, solidifies or hardens to form a cured material. Curable materials are typically polymerizable materials, which undergo polymerization and/or cross-linking when exposed to a suitable curing condition (e.g., a suitable energy source).

A curable material, according to the present embodiments, also encompasses materials which harden or solidify (cure) without being exposed to a curing energy, but rather to a curing condition (for example, upon exposure to a chemical reagent), or simply upon exposure to the environment.

The terms "curable" and "solidifyable" as used herein are interchangeable.

The polymerization can be, for example, free-radical polymerization, cationic polymerization or anionic polymerization, and each can be induced when exposed to curing energy such as, for example, radiation, heat, etc., as described herein.

In some of any of the embodiments described herein, a curable material is a photopolymerizable material, which polymerizes and/or undergoes cross-linking upon exposure to radiation, as described herein, and in some embodiments the curable material is a UV-curable material, which polymerizes and/or undergoes cross-linking upon exposure to UV radiation, as described herein.

In some embodiments, a curable material as described herein is a photopolymerizable material that polymerizes via photo-induced free-radical polymerization. Alternatively, the curable material is a photopolymerizable material that polymerizes via photo-induced cationic polymerization.

In some of any of the embodiments described herein, a curable material can be a monomer, an oligomer or a (e.g., short-chain) polymer, each being polymerizable and/or cross-linkable as described herein.

In some of any of the embodiments described herein, when a curable material is exposed to a curing condition (e.g., radiation), it hardens (undergoes curing) by any one, or combination, of chain elongation and cross-linking.

In some of any of the embodiments described herein, a curable material is a monomer or a mixture of monomers which can form a polymeric material upon a polymerization reaction, when exposed to a curing condition (e.g., curing energy) at which the polymerization reaction occurs. Such curable materials are also referred to herein as monomeric curable materials.

Herein and in the art, the term "monomer" or "monomeric" describes a material that is devoid of repeating backbone units that are linked to one another.

In some of any of the embodiments described herein, a curable material is an oligomer or a mixture of oligomers which can form a polymeric material upon a polymerization reaction, when exposed to a curing condition (e.g., curing energy) at which the polymerization reaction occurs. Such curable materials are also referred to herein as oligomeric curable materials.

Herein and in the art, the term "oligomer" or "oligomeric" describes a material that comprises repeating backbone units that are linked to one another, wherein the number of such repeating units is from 2 to 10.

In some of any of the embodiments described herein, a curable material is a polymer or a mixture of polymers which can form a higher and/or cross-linked polymeric material upon a polymerization reaction, when exposed to a curing condition (e.g., curing energy) at which the polymerization reaction occurs. Such curable materials are also referred to herein as polymeric curable materials.

Herein and in the art, the term "polymer" or "polymeric" describes a material that comprises repeating backbone units that are linked to one another, wherein the number of such repeating units is higher than 10. A "polymer" or "polymeric material" can also be defined as such that when a few backbone units are removed from the material, its propertied do not change significantly.

In some of any of the embodiments described herein, a curable material, whether monomeric or oligomeric or polymeric, can be a mono-functional curable material or a multi-functional curable material.

Herein, a mono-functional curable material comprises one functional group that can undergo polymerization when exposed to a curing condition (e.g., curing energy such as radiation).

A multi-functional curable material comprises two or more, e.g., 2, 3, 4 or more, functional groups that can undergo polymerization when exposed to a curing condition (e.g., curing energy). Multi-functional curable materials can be, for example, di-functional, tri-functional or tetra-functional curable materials, which comprise 2, 3 or 4 groups that can undergo polymerization, respectively. The two or more functional groups in a multi-functional curable material are typically linked to one another by a linking moiety, as defined herein. When the linking moiety is an oligomeric or polymeric moiety, the multi-functional group is an oligomeric or polymeric multi-functional curable material. Multi-functional curable materials can undergo polymerization when subjected to a curing condition (e.g., curing energy) and/or act as cross-linkers.

Embodiments of the present invention relate to novel formulations and formulation systems which are usable is additive manufacturing of three-dimensional objects, and which feature a viscosity of no more than 50 centipoises (cPs or cps) at a temperature of 35° C., wherein the viscosity is determined according to standard procedures known in the art and/or as described in the Examples section that follows.

The formulations and formulation systems described herein provide, when hardened, modeling materials which feature properties which are at least similar, let alone improved, compared to currently used modeling material formulations. The formulation and formulation systems described herein thus provide, for example, hardened materials featuring a variety of properties, ranging, for example, from stiff and hard materials (e.g., similar to those obtained from curable formulations marketed as the Vero™ Family materials) to soft and flexible materials (e.g., similar to elastomeric materials obtained from curable formulations marketed as the Tango™ and Agilus™ families), objects made of multi-materials (e.g., PolyJet methodology), such as digital materials (DM methodology), as described herein, and shelled objects made using Digital ABS methodology, which contain a shelled multi-material made of two starting materials (e.g., similar to formulation systems marketed as RGD515 & RGD535/531), and simulate properties of engineering plastic, such as described, for example, in WO 2011/135496, WO 2018/055522 and WO2018/055521.

The phrase "digital materials", abbreviated as "DM", as used herein and in the art, describes a combination of two or more materials on a microscopic scale or voxel level such that the printed zones of a specific material are at the level of few voxels, or at a level of a voxel block. Such digital materials may exhibit new properties that are affected by the selection of types of materials and/or the ratio and relative spatial distribution of two or more materials.

In exemplary digital materials, the modeling material of each voxel or voxel block, obtained upon curing, is independent of the modeling material of a neighboring voxel or voxel block, obtained upon curing, such that each voxel or voxel block may result in a different model material and the new properties of the whole part are a result of a spatial combination, on the voxel level, of several different model materials.

Herein throughout, whenever the expression "at the voxel level" is used in the context of a different material and/or properties, it is meant to include differences between voxel blocks, as well as differences between voxels or groups of few voxels. In preferred embodiments, the properties of the whole part are a result of a spatial combination, on the voxel block level, of several different model materials.

Herein, a "modeling material formulation system" describes one or more modeling material formulations that are used to form the three-dimensional object. The one or more formulations in a formulation system can be used in single jetting mode, when typically a single modeling material formulations is used, in multi-jetting mode, such as PolyJet, or in a multi-material mode, including DM mode, when two or more modeling material formulations are combined, and in the provision of shelled objects, where two or more formulations, each featuring certain properties, as previously described, are used for forming a core-shell structure, as is further discussed hereinafter.

Embodiments of the present invention further relate to kits in which the novel formulations disclosed herein are packaged.

Embodiments of the present invention further relate to a method of additive manufacturing a three-dimensional object using the formulations or formulation systems described herein.

The method of the present embodiments manufactures three-dimensional objects in a layerwise manner by forming a plurality of layers in a configured pattern corresponding to the shape of the objects, as described herein.

The method is generally effected by sequentially forming a plurality of layers in a configured pattern corresponding to the shape of the object, such that formation of each of at least a few of said layers, or of each of said layers, comprises dispensing a building material (uncured) which comprises one or more modeling material formulation(s) as described herein, and exposing the dispensed modeling material to a curing condition (e.g., curing energy) to thereby form a cured modeling material, as described in further detail hereinafter.

In some exemplary embodiments of the invention an object is manufactured by dispensing a building material (uncured) that comprises two or more different modeling material formulations, each modeling material formulation from a different dispensing head and/or a different array of nozzles of an inkjet printing apparatus. The modeling material formulations are optionally and preferably deposited in layers during the same pass of the printing heads. The modeling material formulations and/or combination of formulations within the layer are selected according to the desired properties of the object, and as further described in detail hereinbelow.

The final three-dimensional object is made of the modeling material or a combination of modeling materials or a combination of modeling material/s and support material/s or modification thereof (e.g., following curing). All these operations are well-known to those skilled in the art of solid freeform fabrication.

The Formulation System:

According to an aspect of some embodiments of the present invention there is provided a modeling material formulation system usable in additive manufacturing of a three-dimension object, which features a viscosity of no more than 50 cPs at 35° C., as defined herein.

According to some of any of the embodiments described herein, each formulation in the formulation system features a viscosity of no more than 40, or no more than 30, or no more than 25, or no more than 20, and even of less than 20, cPs, at 35° C.

According to some of any of the embodiments described herein, each formulation in the formulation system features a viscosity in the range of from about 8 to about 50, or from about 8 to about 40, or from about 8 to about 30, or from about 8 to about 25, or from about 8 to about 20, or from about 8 to about 15, cPs, at 35° C., including any intermediate value and subranges therebetween.

According to some of any of the embodiments described herein, each formulation in the formulation system features a viscosity in the range of from about 8 to about 50, or from about 8 to about 40, or from about 8 to about 30, or from about 8 to about 25, or from about 8 to about 20, or from about 8 to about 15, cPs, at 30° C., including any intermediate value and subranges therebetween.

According to some of any of the embodiments described herein, each formulation in the formulation system features a viscosity in the range of from about 8 to about 50, or from about 8 to about 40, or from about 8 to about 30, or from about 8 to about 25, or from about 8 to about 20, or from about 8 to about 15, cPs, at 25° C., including any intermediate value and subranges therebetween.

By "formulation system" it is meant a system that comprises one or more formulations, that is, one or more modeling material formulations, whereby each formulation in the system features the indicated viscosity. When the formulation system comprises two or more modeling material formulations it is a multi-formulation system, which comprises two or more modeling material formulations that can be used in combination to form a multi-material object.

When a formulation system comprises two or more formulations, each formulation can feature the same or different viscosity, yet each of the formulations features a viscosity as claimed.

According to some of any of the embodiments described herein, the formulation system is suitable for use, or is usable, in additive manufacturing processes, as described herein.

According to some of any of the embodiments described herein, the formulation system is suitable for use, or is usable, in 3D inkjet printing, as described herein.

According to some of any of the embodiments described herein, the formulation system is compatible with the jetting printing apparatus, particularly with the inkjet printing heads and arrays of nozzles therein, which dispense the formulations, as it features the required viscosity so as to be readily dispensed from the printing heads through the nozzle arrays, it features the required surface tension, and it is sufficiently stable (non-reactive) at the jetting conditions so as to avoid clogging of the dispensing (inkjet printing) heads and/or the nozzle arrays therein.

According to some of any of the embodiments described herein, the formulation system meets all the requirements of a 3D inkjet printing system, as recognized in the art and described herein.

According to some of any of the embodiments described herein, the formulation system comprises two or more curable materials, as defined herein.

According to some embodiments, each formulation in the formulation system comprises two or more curable materials as defined herein.

According to some of any of the embodiments described herein, the two or more curable materials can be monomeric curable materials, oligomeric curable materials or a mixture of monomeric and oligomeric curable materials, as defined herein.

According to some of any of the embodiments described herein, the two or more curable materials comprise a mixture of monomeric and oligomeric curable materials, as defined herein.

According to some of any of the embodiments described herein, a weight ratio between monomeric and oligomeric curable materials is at least 1:1, and is preferably higher, for example, is 1.1:1, or 1.2:1, or 1.3:1, or 1.5:1, or 1.6:1, or 1.7:1, or 1.8:1, or 1.9:1, or 2:1, and even higher.

According to some of any of the embodiments described herein, a weight ratio between monomeric and oligomeric curable materials ranges from 1:1 to 5:1, or from 1:1 to 4:1, or from 1.2:1 to 4:1, including any intermediate value and subranges therebetween.

According to some of any of the embodiments described herein, the two or more curable materials comprise a mixture of monomeric and oligomeric curable materials, and an amount of the monomeric curable materials is at least 50% by weight of the total weight of curable materials.

In some embodiments, an amount of monomeric curable materials is at least 60%, or at least 70%, or at least 80%, by weight, of the total weight of curable materials.

In exemplary embodiments, an amount of monomeric curable materials is from 80% to 90%, by weight, of the total weight of curable materials.

According to some of any of the embodiments described herein, an average molecular weight of the two or more curable materials is no more than 500 grams/mol.

By "average molecular weight" it is meant the sum of molecular weights of all the curable materials in a formulation, divided by the number of curable materials in the formulation.

According to some of any of the embodiments described herein, an average molecular weight of the two or more curable materials ranges from 200 to 500 grams/mol, or from 250 to 500 grams/mol, or from 300 to 500 grams/mol, including any intermediate value and subranges therebetween.

According to some of any of the embodiments described herein, a relative average molecular weight of the two or more curable materials is no more than 500 grams/mol.

By "relative average molecular weight" it is meant the averaged molecular weight of the curable materials in the formulation or formulation system relative to their concentration in the formulation or formulation system, that is the sum of a molecular weight multiplied by a relative concentration in the formulation or formulation system, for each component, divided by the total concentration of curable materials in the formulation or formulation system, as follows:

(MW×% wt. of $A$+MW $a$% wt. of $B$)/total % wt. of curable materials.

According to some of any of the embodiments described herein, a relative average molecular weight of the two or more curable materials ranges from 200 to 500 grams/mol, or from 250 to 500 grams/mol, or from 300 to 500 grams/mol, including any intermediate value and subranges therebetween. As discussed hereinabove, curable materials included in the one or more formulations in the formulation system of the present embodiments can be selected so as to provide a wide range of hardened materials, featuring variable properties such as elasticity, hardness, stiffness, and thermal stability, and various structures, including shelled and non-shelled structures.

The formulation system as described herein can comprise curable materials as described herein which can provide, in the same object, for example, portions made of rigid materials, portions made of elastomeric material, portions made of materials with high HDT (thermal stability) and portions made of materials with high Impact resistance, by selecting modeling formulations that provide materials with the desired properties at selected region(s) of the object, while utilizing the low viscosity of all these formulations at low temperatures.

According to some of any of the embodiments described herein, the formulation system comprises at least one formulation which, when hardened, provides a non-elastomeric, rigid material.

According to some of any of the embodiments described herein, the formulation system comprises at least one formulation which, when hardened, provides an elastomeric material.

According to some of any of the embodiments described herein, the formulation system comprises at least two formulations which are suitable, when used together, for forming shelled objects featuring a core region and at least one envelope region which at least partially surrounds the core region. The two formulations can be selected so as to feature properties as previously described for shelled objects. For example, in some embodiments, such a formulation system comprises a first formulation which, when hardened, provides a material featuring a high HDT (e.g., higher than 60° C.), and a second formulation which, when hardened, provides a material featuring high Impact resistance (e.g., higher than 35 J/m). In some embodiments, such a formulation system comprises two formulations which provide materials featuring a certain ratio of the elastic moduli thereof.

Herein throughout, the phrases "rubber", "rubbery materials", "elastomeric materials" and "elastomers" are used interchangeably to describe materials featuring characteristics of elastomers. The phrase "rubbery-like material" or "rubber-like material" is used to describe materials featuring characteristics of rubbers, prepared by additive manufacturing (e.g., 3D inkjet printing) rather than conventional processes that involve vulcanization of thermoplastic polymers.

The term "rubbery-like material" is also referred to herein interchangeably as "elastomeric material".

Elastomers, or rubbers, are flexible materials that are characterized by low Tg (e.g., lower than 10° C., preferably lower than 0° C. and even lower than −10° C.).

Herein, "Tg" refers to glass transition temperature defined as the location of the local maximum of the E" curve, where E" is the loss modulus of the material as a function of the temperature. Broadly speaking, as the temperature is raised within a range of temperatures containing the Tg temperature, the state of a material, particularly a polymeric material, gradually changes from a glassy state into a rubbery state.

Herein, "Tg range" is a temperature range at which the E" value is at least half its value (e.g., can be up to its value) at the Tg temperature as defined above.

Without wishing to be bound to any particular theory, it is assumed that the state of a polymeric material gradually changes from the glassy state into the rubbery within the Tg range as defined above. The lowest temperature of the Tg range is referred to herein as Tg(low) and the highest temperature of the Tg range is referred to herein as Tg(high).

In any of the embodiments described herein, the term "temperature higher than Tg" means a temperature that is higher than the Tg temperature, or, more preferably a temperature that is higher than Tg(high).

The following describes some of the properties characterizing rubbery materials, as used herein and in the art.

Shore A Hardness, which is also referred to as Shore hardness or simply as hardness, describes a material's resistance to permanent indentation, defined by type A durometer scale. Shore hardness is typically determined according to ASTM D2240. Elastomeric materials are typically characterized by low Shore Hardness, e.g., lower than 100.

Elastic Modulus, which is also referred to as Modulus of Elasticity or as Young's Modulus, or as Tensile modulus, or "E", describes a material's resistance to elastic deformation when a force is applied, or, in other words, as the tendency of an object to deform along an axis when opposing forces are applied along that axis. Elastic modulus is typically measured by a tensile test (e.g., according to ASTM D 624) and is determined by the linear slope of a Stress-Strain curve in the elastic deformation region, wherein Stress is the force causing the deformation divided by the area to which the force is applied and Strain is the ratio of the change in some length parameter caused by the deformation to the original value of the length parameter. The stress is proportional to the tensile force on the material and the strain is proportional to its length. The Elastic Modulus of elastomers is typically low, e.g., lower than 1000 MPa.

Elongation at failure, which is also referred to herein and in the art as elongation at break, $\varepsilon_R$, is determined as the maximal strain (elongation) which can occur (upon application of tensile stress equal to the ultimate tensile strength) before failure of the tested material occurs (e.g., as rupture or necking).

Elongation is the extension of a uniform section of a material, expressed as percent of the original length as follows:

$$\text{Elongation \%} = \frac{\text{Final length} - \text{Original length}}{\text{Original length}} \times 100.$$

Elongation is typically determined according to ASTM D412.

Elongation of elastomers is typically high, e.g., higher than 50% or higher than 100% or higher than 200%. Recovery is determined by releasing the tensile stress after subjecting the tested material as the ratio of the decrease in length to a prior strain after a material (e.g., elastic layer) is subjected to a prior strain which is almost equal to the elongation at failure (optionally about 90% of the elongation at failure, optionally about 95% of the elongation at failure, optionally about 98% of the elongation at failure, optionally about 99% of the elongation at failure, wherein the elongation at failure can be determined using an equivalent sample). Thus, for example, a material extended to an elongation at failure which is 200%, and which upon release of tensile stress returns to a state characterized by a strain of 20% relative to the original length, would be characterized as having a recovery of 90% (i.e., 200%-20% divided by 200%). The recovery of elastomers is typically high, e.g., higher than 50%, or higher than 70% or higher.

Tensile Strength describes a material's resistance to tension, or, in other words, its capacity to withstand loads tending to elongate, and is defined as the maximum stress in MPa, applied during stretching of an elastomeric composite before its rupture. Tensile strength is typically measured by a tensile test (e.g., according to ASTM D 624) and is determined as the highest point of a Stress-Strain curve, as described herein and in the art.

Z Tensile elongation is the elongation measured as described herein upon printing in Z direction.

Tear Resistance (TR), which is also referred to herein and in the art as "Tear Strength" describes the maximum force required to tear a material, expressed in N per mm, whereby the force acts substantially parallel to the major axis of the sample. Tear Resistance can be measured by the ASTM D 412 method. ASTM D 624 can be used to measure the resistance to the formation of a tear (tear initiation) and the resistance to the expansion of a tear (tear propagation). Typically, a sample is held between two holders and a uniform pulling force is applied until deformation occurs. Tear Resistance is then calculated by dividing the force applied by the thickness of the material. Materials with low Tear Resistance tend to have poor resistance to abrasion.

Tear Resistance under constant elongation describes the time required for a specimen to tear when subjected to constant elongation (lower than elongation at break). This value is determined, for example, in an "O-ring" test as described in the Examples section that follows.

Herein and in the art, a material is defined as an elastomer if it features one or more of the above-mentioned properties within a range that characterize elastomeric materials.

Non-elastomeric materials, as used herein, refer to materials that do not exhibit elastomeric properties, and are, for example, rigid materials, characterized by Tg above room temperature and/or high Shore Hardness, and/or high Elastic Modulus, and/or low elongation.

Non-Elastomeric Materials:

According to some of any of the embodiments described herein, at least one formulation in the formulation system of the present embodiments provides, when hardened, a non-elastomeric (rigid) material.

Such formulations are suitable for use in additive manufacturing of an object which comprises, in at least a portion thereof, a non-elastomeric, rigid, material.

In some of any of the embodiments described herein, formulations which provide non-elastomeric materials comprise a mixture of hydrophilic and hydrophobic materials which feature properties as indicated in the respective embodiments herein.

Herein throughout, the term "hydrophilic" describes a physical property of a compound or a portion of a compound (e.g., a chemical group in a compound) which accounts for transient formation of bond(s) with water molecules, typically through hydrogen bonding.

A hydrophilic compound or portion of a compound (e.g., a chemical group in a compound) is one that is typically charge-polarized and capable of hydrogen bonding.

Hydrophilic compounds or groups typically include one or more electron-donating heteroatoms which form strong hydrogen bonds with water molecules. Such heteroatoms include, but are not limited to, oxygen and nitrogen. Preferably, a ratio of the number of carbon atoms to a number of heteroatoms in a hydrophilic compounds or groups is 10:1 or lower, and can be, for example, 8:1, more preferably 7:1, 6:1, 5:1 or 4:1, or lower. It is to be noted that hydrophilicity of compounds and groups may result also from a ratio between hydrophobic and hydrophilic moieties in the compound or chemical group, and does not depend solely on the above-indicated ratio.

Hydrophilic compounds dissolve more readily in water than in oil or other hydrophobic solvents. Hydrophilic compounds can be determined by, for example, as having Log P lower than 0.5, when Log P is determined in octanol and water phases, at a temperature lower than 50° C., or lower than 40° C., or lower than 35° C. or lower than 30° C., e.g., at 25° C.

Alternatively, hydrophilic compounds can be determined by, for example, the Hansen parameters, as having relative energy distance (RED) higher than 1, when calculated for interaction with water as a solvent, at a temperature lower than 50, or lower than 40° C., or lower than 35° C. or lower than 30° C., e.g., at 25° C.

A hydrophilic compound can have one or more hydrophilic groups that render the compound hydrophilic. Such groups are typically polar groups, comprising one or more electron-donating heteroatoms such as oxygen and nitrogen. The hydrophilic group can be, for example, one or more substituent(s) of a monomeric mono-functional curable material or two or more substituents or interrupting groups of an oligomeric mono-functional curable material. The hydrophilic group can be, for example, one or more substituent(s) of a monomeric multi-functional curable material or one or more substituents or interrupting groups of a linking moiety of a monomeric multi-functional curable moiety. The hydrophilic group can be, for example, two or more substituents or interrupting groups of an oligomeric linking moiety in oligomeric multi-functional curable material.

Exemplary hydrophilic groups include, but are not limited to, an electron-donating heteroatom, a carboxylate, a thiocarboxylate, oxo (═O), a linear amide, hydroxy, a (C1-4) alkoxy, an (C1-4) alcohol, a heteroalicyclic (e.g., having a ratio of carbon atoms to heteroatoms as defined herein), a cyclic carboxylate such as lactone, a cyclic amide such as lactam, a carbamate, a thiocarbamate, a cyanurate, an isocyanurate, a thiocyanurate, urea, thiourea, an alkylene glycol (e.g., ethylene glycol or propylene glycol), and a hydrophilic polymeric or oligomeric moiety, as these terms are defined hereinunder, and any combinations thereof (e.g., a hydrophilic group that comprises two or more of the indicated hydrophilic groups).

In some embodiments, the hydrophilic group is, or comprises, an electron donating heteroatom, a carboxylate, a heteroalicyclic, an alkylene glycol and/or a hydrophilic oligomeric moiety.

A hydrophilic polymeric or oligomeric moiety, as used herein, comprises a polymeric chain which comprises hydrophilic groups as defined herein. The hydrophilic groups can be heteroatoms within the backbone chain of the polymeric moiety, as, for example, in poly(alkylene glycols) or hydrophilic pendant groups. A polymeric or oligomeric moiety, according to some embodiments of the present invention, preferably has from 10 to 40 repeating backbone units, more preferably from 10 to 20 repeating backbone units.

A hydrophilic mono-functional curable material according to some embodiments of the present invention can be a vinyl-containing compound represented by Formula I:

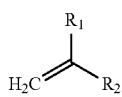

Formula I wherein at least one of $R_1$ and $R_2$ is and/or comprises a hydrophilic group, as defined herein.

The (═CH$_2$) group in Formula I represents a polymerizable group, and is typically a UV-curable group, such that the material is a UV-curable material.

For example, $R_1$ is a hydrophilic group as defined herein and $R_2$ is a non-hydrophilic group, for example, hydrogen, C(1-4) alkyl, C(1-4) alkoxy, or any other substituent, as long as the compound is hydrophilic, as defined herein.

In some embodiments, $R_1$ is a carboxylate, and the compound is a mono-functional acrylate monomer. In some of these embodiments, $R_2$ is methyl, and the compound is mono-functional methacrylate monomer. In other embodiments, $R_2$ is a hydrophilic substituent, namely, a substituent which is, or which comprises, a hydrophilic group as described herein.

In some of any of these embodiments, the carboxylate group, —C(═O)—OR', comprises R' which is a hydrophilic group. Exemplary R' groups include, but are not limited to, heteroalicyclic groups (having a ratio of 5:1 or lower of carbon atoms to electron-donating heteroatoms, such as morpholine, tetrahydrofurane, oxalidine, and the likes), hydroxyl, C(1-4)alkoxy, thiol, alkylene glycol or a polymeric or oligomeric moiety, as described herein. An exemplary monomeric mono-functional acrylate is acryloyl morpholine (ACMO).

In some embodiments, $R_1$ is amide, and in some embodiments, it is a cyclic amide such as lactam, and the compound is a vinyl lactam. In some embodiments, $R_1$ is a cyclic carboxylate such as lactone, and the compound is a vinyl lactone.

When one or both of $R_1$ and $R_2$ comprise a polymeric or oligomeric moiety, for example, a hydrophilic oligomeric moiety, as defined herein, the mono-functional curable compound of Formula I is an exemplary oligomeric mono-functional curable material. Otherwise, it is an exemplary monomeric mono-functional curable material.

Exemplary oligomeric mono-functional curable materials include, but are not limited to, a mono-(meth)acrylated urethane oligomer derivative of polyethylene glycol, a mono-(meth)acrylated polyol oligomer, a mono-(meth)acrylated oligomer having hydrophilic substituents, and a mono-(meth)acrylated polyethylene glycol (e.g., methoxypolyethylene glycol). (Meth)acrylated means that the oligomer or polymer comprises an acrylate or methacrylate functional group.

In some embodiments, $R_1$ is a poly(alkylene glycol), as defined herein.

A hydrophilic multi-functional curable material according to some embodiments of the present invention can be represented by Formula II:

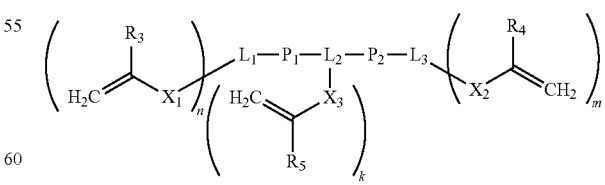

Formula II wherein:
each of $R_3$, $R_4$ and $R_5$ is independently hydrogen, C(1-4) alkyl, or a hydrophilic group, as defined herein;
each of $L_1$, $L_2$ and $L_3$ is independently a linking moiety or absent;

each of $P_1$ and $P_2$ is independently a hydrophilic group as defined herein or absent;

each of $X_1$, $X_2$ and $X_3$ is independently C(1-4)alkyl, or a hydrophilic group, as defined herein, or absent; and each of n, m and k is 0, 1, 2, 3 or 4, provided that n+m+k is at least 2, and provided that at least one of $R_3$, $R_4$, $R_5$, $X_1$, $X_2$, $X_3$ $P_1$ and $P_2$ is a hydrophilic group, as defined herein.

Multi-functional curable materials of Formula II in which one, two or all of $X_1$, $X_2$ and $X_3$, when present, is oxo, are multi-functional acrylates, which can be further substituted by a hydrophilic group, as described hereinabove. When one or more of $R_3$, $R_4$ and $R_5$, when present, is methyl, the curable materials are multi-functional methacrylates.

Multifunctional curable materials in which one, two or all of $X_1$, $X_2$ and $X_3$, when present, is oxo, can include a combination of acrylate and methacrylate functional moieties.

In some embodiments, the acrylate or methacrylate multifunctional curable material is monomeric, such that none of $P_1$ and $P_2$ is a polymeric or oligomeric moiety. In some of these embodiments, one or both of $P_1$ and $P_2$ is a hydrophilic group as described herein, for example, an alkylene glycol, or any other hydrophilic linking group, or a short chain (e.g., of 1-6 carbon atoms), substituted or unsubstituted hydrocarbon moiety, as defined herein.

In some embodiments, one or both of $P_1$ and $P_2$ is a polymeric or oligomeric moiety as defined herein, and the curable compound is an oligomeric multi-functional curable material, for example, an oligomeric multi-functional acrylate or methacrylate, as described herein for $X_1$, $X_2$ and/or $X_3$. If both $P_1$ and $P_2$ are present, $L_2$ can be, for example, a linking moiety such as a hydrocarbon, comprising alkyl, cycloalkyl, aryl and any combination thereof. Exemplary such curable materials include ethoxylated or methoxylated polyethylene glycol diacrylate, and ethoxylated bisphenol A diacrylate.

Other non-limiting examples include polyethylene glycol diacrylate, polyethylene glycol dimethacrylate, polyethylene glycol-polyethylene glycol urethane diacrylate, and a partially acrylated polyol oligomer.

In some embodiments, one or more of $P_1$ and $P_2$ is, or comprises, a poly(alkylene glycol) moiety, as defined herein.

In some of any of the embodiments of an acrylate or methacrylate multifunctional curable material of Formula II, one or more of $R_3$, $R_4$ and $R_5$ is a hydrophilic group as described, for example, for $R_1$ and $R_2$ in Formula I, herein. In these embodiments, $P_1$ and/or $P_2$ can be present or absent, and can be, or comprise, a hydrophilic group or not, as long as the material is hydrophilic, as defined herein.

Alternatively, one, two or all of $X_1$, $X_2$ and $X_3$, when present, can be —O—, such that at least one functional moiety in the multi-functional curable material is vinyl ether.

In some embodiments, n and m are each 1, k is 0, $X_1$ is O, $X_2$ is absent, and the compound is a vinyl ether, which can be substituted or not. In some of these embodiments, $L_1$, $L_2$, $L_3$, $P_1$ and $P_2$ are absent, and the compound is a monomeric vinyl ether. Examples of monomeric vinyl ethers include ethyl vinyl ether, propyl vinyl ether, isobutyl vinyl ether, cyclohexyl vinyl ether, 2-ethylhexyl vinyl ether, butyl vinyl ether, ethylene glycol monovinyl ether, di(ethylene glycol) divinyl ether, butane diol divinyl ether, hexane diol divinyl ether, cyclohexane dimethanol monovinyl ether and the like.

In some embodiments, $P_1$ and $P_2$ are absent, and one of $L_1$ and $L_2$ is an alkylene chain substituted by one or more hydrophilic groups. An exemplary such curable compound is 1,4-cyclohexane dimethanol divinyl ether.

In some embodiments, one or more of $P_1$ and $P_2$ is a hydrophilic polymeric or oligomeric moiety, as defined herein. In some embodiments, one or more of $P_1$ and $P_2$ is, or comprises, a poly(alkylene glycol) moiety, as defined herein. In some embodiments the polymeric moiety is substituted by one or more vinyl ether substituents.

In some of any of the embodiments related to Formula II, one or more of the substituents of the polymerizable group, $R_3$, $R_4$ and $R_5$, can be a hydrophilic group as described for $R_1$ and $R_2$ in Formula I herein.

In some of any of the embodiments related to Formula II, when P1 and P2 is a polymeric or oligomeric moiety, this moiety can comprise hydrophilic heteroatoms as defined herein, within the backbone chain or the backbone chain can be substituted by hydrophilic groups, as described herein.

According to some of any of the embodiments described herein, each of the hydrophilic curable materials is a monomeric or oligomeric, mono-functional or multi-functional, acrylate or methacrylate, for example, as described herein in any of the respective embodiments.

According to some of any of the embodiments described herein, a hydrophilic curable material as described herein is water-soluble or water-miscible.

According to some of any of the embodiments described herein, a hydrophilic curable material as described herein is also referred to herein as a polar curable material.

A "hydrophobic" curable material, as described herein, refers to materials which are characterized by Log P, when measured for water and octanol, higher than 1, and preferably higher.

Hydrophobic curable materials can be represented by Formulae I and II as presented herein, wherein none or only a minority of the groups is a hydrophilic group.

Hydrophobic curable materials include, as non-limiting examples, monofunctional acrylates or methacrylates, in which R' in Formula I is R' is an alkyl, cycloalkyl, alkaryl, aryl, and the like.

Hydrophobic curable materials include, as non-limiting examples, multifunctional acrylates or methacrylates, in which the majority of the variables in Formula II is R' is or comprises an alkyl, cycloalkyl, alkaryl, aryl, and the like.

Exemplary multi-functional curable materials that are usable in the context of these embodiments include diacrylates such as aliphatic urethane diacrylate oligomer and/or monomeric diacrylates, preferably short chain diacrylates such as, but not limited to, isobornyl diacrylate.

Exemplary multi-functional curable materials can have Formula II as described herein, yet, $R_3$, $R_4$, $R_5$, $P_1$ and $P_2$, when present, are non-hydrophilic groups, or, together result in a non-hydrophilic compound.

Exemplary monofunctional curable materials include, as non-limiting examples, isobornyl acrylate or isobornyl methacrylate.

Hydrophobic curable materials are typically water-insoluble or water-immiscible.

Hydrophobic curable materials are also referred to herein as apolar curable materials.

Hydrophobic compounds dissolve more readily in oil or other hydrophobic solvents than water. Hydrophobic compounds can be determined by, for example, as having Log P higher than 1, when Log P is determined in octanol and water phases, at a temperature lower than 50° C., or lower than 40° C., or lower than 35° C. or lower than 30° C., e.g., at 25° C. Alternatively, hydrophobic compounds can be determined by, for example, the Hansen parameters, as having relative energy distance (RED) lower than 1, when calculated for interaction with water as a solvent, at a temperature lower than 50, or lower than 40° C., or lower than 35° C. or lower than 30° C., e.g., at 25° C. In some of any of these embodiments, a formulation which provides, when hardened, a non-elastomeric, rigid, material, comprises:

at least one hydrophobic curable material which provides, when hardened, a material featuring Tg higher than 80° C.; and at least one hydrophilic curable material which provides, when hardened, a material featuring Tg higher than 80° C.

Herein throughout, whenever a property of a curable material is mentioned for a hardened material thereof, the hardened material is made solely from the hardened curable material.

In some of any of the embodiments described herein for non-elastomeric materials, a total amount of the at least one hydrophobic curable material which provides, when hardened, a material featuring Tg higher than 80° C., is from 25 to 60 weight percents, or from 28 to 55 weight percents, of the total weight of the formulation comprising same, including any intermediate value and subranges therebetween.

In some of any of the embodiments described herein, the hydrophobic curable material which provides, when hardened, a material featuring Tg higher than 80° C. comprises a mixture of a mono-functional curable material and a multi-functional curable material, and in some of these embodiments the multi-functional curable material is a di-functional curable material, as described herein in any of the respective embodiments and any combination thereof.

In some embodiments, a concentration of the hydrophobic monomeric mono-functional curable material(s) ranges from 28 to 60 weight percents, and in some embodiments it ranges from 40 to 50 weight percents, of the total weight of the formulation comprising same, including any intermediate value and subranges therebetween.

In some embodiments, a concentration of the hydrophobic multi-functional (e.g., di-functional) curable material ranges from 0 to 25 weight percents, and in some embodiments, it ranges from 20 to 25 weight percents, of the total weight of the formulation comprising same, including any intermediate value and subranges therebetween.

In some of any of the embodiments described herein a total amount of the at least one hydrophilic curable material which provides, when hardened, a material featuring Tg higher than 80° C., is from 15 to 35 weight percents of the total weight of the at least one formulation.

In some of any of the embodiments described herein, the hydrophilic curable material which provides, when hardened, a material featuring Tg higher than 80° C. comprises a mixture of a mono-functional curable material and a multi-functional curable material, and in some of these embodiments the multi-functional curable material is a di-functional curable material, as described herein in any of the respective embodiments and any combination thereof.

In some of these embodiments, an amount of the at least one hydrophilic monofunctional curable material which provides, when hardened, a material featuring Tg higher than 80° C., ranges from 15 to 30 weight percents of the total weight of the formulation comprising same, including any intermediate value and subranges therebetween.

In some of these embodiments, an amount of the at least one hydrophilic multifunctional curable material which provides, when hardened, a material featuring Tg higher than 80° C. ranges from 0 to 5 weight percents of the total weight of the at least one formulation.

In some of any of the embodiments described herein, a formulation that provides, when hardened, a non-elastomeric, rigid material, further comprises at least one of:

at least one hydrophobic curable material which provides, when hardened, a material featuring Tg lower than 25° C.;

at least one hydrophilic curable material which provides, when hardened, a material featuring Tg lower than 25° C.; and at least one hydrophilic curable material which provides, when hardened, a material featuring Tg that ranges from 25° C. to 50° C.

In some of any of these embodiments, a total amount of the at least one hydrophobic curable material which provides, when hardened, a material featuring Tg lower than 25° C. ranges from 0 to 15 of the total weight of the formulation comprising same, including any intermediate value and subranges therebetween.

In some of these embodiments, the at least one hydrophobic curable material which provides, when hardened, a material featuring Tg lower than 25° C. comprises at least one hydrophobic monofunctional curable material, and/or at least one hydrophobic multifunctional (e.g., difunctional) curable material, each independently provides the indicated Tg when hardened.

In some of these embodiments, an amount of the at least one hydrophobic monofunctional curable material which provides, when hardened, a material featuring Tg lower than 25° C. ranges from 0 to 5 weight percents of the total weight of the formulation comprising same, including any intermediate value and subranges therebetween.

In some of these embodiments, an amount of the at least one hydrophobic multifunctional curable material which provides, when hardened, a material featuring Tg lower than 25° C. ranges from 0 to 10 weight percents of the total weight of the formulation comprising same, including any intermediate value and subranges therebetween.

In some of any of the embodiments described herein, a total amount of the at least one hydrophilic curable material which provides, when hardened, a material featuring Tg lower than 25° C. ranges from 0 to 30 of the total weight of the formulation comprising same, including any intermediate value and subranges therebetween.

In some of these embodiments, the at least one hydrophilic curable material which provides, when hardened, a material featuring Tg lower than 25° C. comprises at least one hydrophilic monofunctional curable material and/or at least one hydrophilic multifunctional (e.g., di-functional) curable material, each independently provides, when hardened, the indicated Tg.

In some of these embodiments, an amount of the at least one hydrophilic monofunctional curable material which provides, when hardened, a material featuring Tg lower than 25° C. ranges from 0 to 5 weight percents of the total weight of the formulation comprising same, including any intermediate value and subranges therebetween.

In some of these embodiments, an amount of the at least one multifunctional curable material ranges from 0 to 30 weight percents of the total weight of the formulation comprising same, including any intermediate value and subranges therebetween.

In some of any of the embodiments described herein, a total amount of the at least one hydrophilic curable material which provides, when hardened, a material featuring Tg that ranges from 25° C. to 80° C. ranges from 0 to 15 of the total weight of the formulation comprising same, including any intermediate value and subranges therebetween.

In some of any of the embodiments described herein, a total amount of hydrophobic curable materials in a formulation that provides a non-elastomeric, rigid, material as described herein, ranges from 35-75 weight percents of the total weight of the formulation comprising same, including any intermediate value and subranges therebetween. In some of any of the embodiments described herein, a total amount of hydrophilic curable materials in a formulation that provides a non-elastomeric, rigid, material, ranges from 20-60 weight percents of the total weight of the formulation comprising same, including any intermediate value and subranges therebetween.

In some of any of the embodiments described herein, a formulation that provides a non-elastomeric, rigid, material, further comprises a curable material that features a viscosity at room temperature of no more than 15 centipoises, or even lower. Such materials are also referred to herein as "reactive diluents". Exemplary such materials include low molecular weight monofunctional and multifunctional divinyl ethers (e.g., DVE2, DVE3), and low molecular weight monofunctional and multifunctional (meth)acrylates (e.g., featuring short alkyls or short alkylene chains).

In some of these embodiments, an amount the curable material ranges from 0 to 7 weight percents of the total weight of the formulation comprising same.

A formulation system that comprises one or more of a formulation as described in the foregoing embodiments can be used in additive manufacturing such as 3D inkjet printing in a single jetting mode, when the formulation system comprises one modeling material formulation, or in a multi material mode (PolyJet), including DM mode, when the formulation system comprises two or more modeling material formulations.

When two or more formulations are used, the formulations can differ from another, for example, by different reactive (curable components) and/or by different non-reactive (non-curable) components, as described hereinafter, as long as it features the indicated viscosity and comprises curable materials as described in any of the respective embodiments.

The following describes exemplary, non-limiting, embodiments of formulations usable in a formulation system that provides non-shelled three-dimensional objects, made of a single modeling material or of multi-materials, including digital materials.

In exemplary formulation systems according to these embodiments, a total amount of the at least one hydrophobic curable material which provides, when hardened, a material featuring Tg higher than 80° C., is from 50 to 60 weight percents of the total weight of the formulation comprising same, including any intermediate values and subranges therebetween.

In some of these embodiments, the at least one hydrophobic curable material which provides, when hardened, a material featuring Tg higher than 80° C. comprises at least one monofunctional curable material and/or at least one multifunctional curable material, as described herein in the respective embodiments.

In some of these embodiments, an amount of the at least one monofunctional curable material ranges from 25 to 60 weight percents of the total weight of the formulation comprising same, including any intermediate values and subranges therebetween.

In some of these embodiments, an amount of the at least one multifunctional curable material ranges from 0 to 25 weight percents of the total weight of the formulation comprising same, including any intermediate values and subranges therebetween.

In exemplary embodiments, the at least one hydrophobic curable material which provides, when hardened, a material featuring Tg higher than 80° C. comprises only a monofunctional curable material, at a concentration of from 50 to 60 weight percents of the total weight of the formulation comprising same, including any intermediate values and subranges therebetween.

In exemplary embodiments, the at least one hydrophobic curable material which provides, when hardened, a material featuring Tg higher than 80° C. is or comprises isobornyl acrylate.

In exemplary formulation systems according to these embodiments, a total amount of the at least one hydrophilic curable material which provides, when hardened, a material featuring Tg higher than 80° C., is from 15 to 30 weight percents of the total weight of the formulation comprising same, including any intermediate values and subranges therebetween. In some of these embodiments, the at least one hydrophilic curable material which provides, when hardened, a material featuring Tg higher than 80° C. comprises at least one monofunctional curable material and/or at least one multifunctional curable material.

In some of these embodiments, an amount of the at least one monofunctional curable material ranges from 15 to 25, weight percents of the total weight of the formulation comprising same, including any intermediate values and subranges therebetween.

In some of these embodiments, an amount of the at least one multifunctional curable material ranges from 0 to 5, e.g., 3, weight percents of the total weight of the formulation comprising same, including any intermediate values and subranges therebetween. In exemplary embodiments, the multifunctional material is a trifunctional material, for example, an isocyanurate triacrylate.

In exemplary embodiments, the at least one hydrophilic curable material which provides, when hardened, a material featuring Tg higher than 50° C. is or comprises ACMO.

In exemplary formulation systems according to these embodiments, a total amount of the at least one hydrophobic curable material which provides, when hardened, a material featuring Tg lower than 25° C., if present, ranges from 0 to 15, or from 5 to 15, or from 10 to 15, weight percents, of the total weight of the formulation comprising same, including any intermediate values and subranges therebetween.

In some of these embodiments, the at least one hydrophobic curable material comprises at least one monofunctional curable material, and/or at least one multifunctional curable material.

In some of these embodiments, an amount of the at least one monofunctional curable material ranges from 0 to 5, or from 1 to 3, weight percents of the total weight of the formulation comprising same, including any intermediate values and subranges therebetween.

In some of these embodiments, an amount of the at least one multifunctional curable material ranges from 0 to 15, or from 5 to 15, or from 8 to 12, weight percents of the total weight of the at least one formulation.

In exemplary formulation systems according to these embodiments, a total amount of the at least one hydrophilic curable material which provides, when hardened, a material featuring Tg lower than 25° C., if present, ranges from 0 to 10, or from 1 to 10, or from 2 to 8, e.g., about 5, weight percents, of the total weight of the formulation comprising same, including any intermediate values and subranges therebetween.

In some of these embodiments, the at least one hydrophilic curable material which provides, when hardened, a material featuring Tg lower than 25° C., if present, comprises at least one monofunctional curable material and/or at least one multifunctional curable material, and in some embodiments, it comprises only monofunctional curable material(s) at an amount as described hereinabove.

In exemplary formulation systems according to these embodiments, the formulation further comprises a reactive diluent as described herein, at a concentration of from about 1 to about 10, or from about 3 to about 7, or from about 5 to about 7 weight percents of the total weight of the formulation, including any intermediate values and subranges therebetween. Exemplary curable materials that are suitable for use in the context of these embodiments are presented in Table 1 in the Examples section that follows.

Core-Shell Materials:

A formulation system according to these embodiments can be used also in a D-ABS mode, for providing shelled objects, as described herein. Such a formulation system comprises, for example, one formulation which features, when hardened, high HDT, and one formulation which features, when hardened, high Impact resistance.

As used herein, the term "Izod impact resistance", which also referred to as "Izod notch impact resistance" or simply as "impact resistance" refers to the loss of energy per unit of thickness following an impact force applied to the respective formulation or combination of formulations. Suitable test procedures for determining the Izod impact resistance of a formulation or combination of formulations are the ASTM D-256 series, particularly the ASTM D-256-06 series. In some embodiments of the present invention the core and shell of the structure differ in their Izod impact resistance value as measured by any method of the ASTM D-256-06 series. It is noted that in the standard ASTM methods there is need to machinate a notch. However, in many cases, this process cuts the shell and exposes the core to the notch tip. Therefore, this standard method is less preferred for evaluating the impact resistance of a structure built according to some embodiments of the present invention. Preferred procedures for determining the impact resistance will now be described. These procedures are particularly useful when the AM includes comprises three-dimensional printing.

According to a first procedure, a test specimen is printed with a rectangular patch made of the shelling formulation or combination of formulations. The dimensions of the patch are calculated in such way that after the notch preparation (as required by the standard ASTM procedure) a 0.25 mm layer of the shelling formulation or combination of formulations remains complete.

According to a second procedure, a test specimen is printed with notch instead of cutting the notch after the specimen is printed. The orientation of the specimen on the tray is vertical, for example, in the Z-Y plane (referred to herein as "orientation F").

As used herein, HDT refers to a temperature at which the respective formulation or combination of formulations deforms under a predetermined load at some certain temperature. Suitable test procedures for determining the HDT of a formulation or combination of formulations are the ASTM D-648 series, particularly the ASTM D-648-06 and ASTM D-648-07 methods.

In various exemplary embodiments of the invention the core and shell of the structure differ in their HDT as measured by the ASTM D-648-06 method as well as their HDT as measured by the ASTM D-648-07 method. In some embodiments of the present invention the core and shell of the structure differ in their HDT as measured by any method of the ASTM D-648 series. In the majority of the examples herein, HDT at a pressure of 0.45 MPa was used.

In exemplary embodiments of formulation systems that are usable for providing a shelled three-dimensional object in a digital ABS (D-ABS) mode, the object comprises a core region and one or more envelope regions at least partially surrounding the core region, as described in further detail hereinafter.

Exemplary formulation systems according to these embodiments comprise a first formulation which is characterized, when hardened, by heat deflection temperature (HDT) of at least 60° C., and a second formulation which is characterized, when hardened, by Izod impact resistance (IR) value of at least 35, or at least 40, J/m.

The first formulation is also referred to herein as Part A formulation, or as RF formulation. The second formulation is also referred to herein as Part B formulation, or as DLM formulation.

According to the present embodiments, each of the first and the second formulations comprises the at least one hydrophobic curable material which provides, when hardened, a material featuring Tg higher than 80° C., and the at least one hydrophilic curable material which provides, when hardened, a material featuring Tg higher than 50° C., as these are defined herein.

The following presents exemplary embodiments of an RF formulation.

In exemplary embodiments of an RF formulation, a total amount of the at least one hydrophobic curable material which provides, when hardened, a material featuring Tg higher than 50° C., is from 50 to 60 weight percents of the total weight of the first formulation, including any intermediate value and subranges therebetween.

In some of these embodiments, the at least one hydrophobic curable material which provides, when hardened, a material featuring Tg higher than 80° C. in the first formulation comprises at least one monofunctional curable material and/or at least one multifunctional curable material, preferably comprising at least one di-functional curable material and at least one trifunctional curable material, In some of these embodiments, an amount of the at least one monofunctional curable material ranges from 25 to 40, or from 30 to 40, weight percents of the total weight of the first formulation, including any intermediate value and subranges therebetween.

In some of these embodiments, an amount of the at least one multifunctional (e.g., difunctional) curable material ranges from 15 to 30, or from 20 to 25, weight percents of the total weight of the first formulation, including any intermediate value and subranges therebetween.

In exemplary embodiments of the RF formulation, a total amount of the at least one hydrophilic curable material which provides, when hardened, a material featuring Tg higher than 50° C., in the first formulation, is from 25 to 35, e.g., 30, weight percents of the total weight of the at least one formulation.

In some of these embodiments, the at least one hydrophilic curable material in the first formulation comprises at least one monofunctional curable material and/or at least one multifunctional curable material.

In some of these embodiments, an amount of the at least one monofunctional curable material ranges from 20 to 35, or from 25 to 35, e.g., 30, weight percents of the total weight of the first formulation, including any intermediate value and subranges therebetween.

In some of these embodiments, an amount of the at least one multifunctional curable material ranges from 0 to 5, e.g., 0, weight percents of the total weight of the first formulation, including any intermediate value and subranges therebetween.

In exemplary embodiments of an RF formulation, a total amount of the at least one hydrophobic curable material which provides, when hardened, a material featuring Tg lower than 25° C., if present in the first formulation, ranges from 0 to 15, or from 5 to 15, e.g., about 10, of the total weight of the first formulation, including any intermediate value and subranges therebetween.

In some of these embodiments, the at least one hydrophobic curable material in the first formulation comprises at least one monofunctional curable material and/or at least one multifunctional curable material.

In some of these embodiments, an amount of the at least one monofunctional curable material ranges from 0 to 5, or from 1 to 5, e.g., 2, weight percents of the total weight of the first formulation, including any intermediate value and subranges therebetween.

In some of these embodiments, an amount of the at least one multifunctional (e.g., difunctional) curable material ranges from 0 to 15, or from 5 to 15, or from 5 to 10, e.g., 8, weight percents of the total weight of the first formulation.

In exemplary embodiments of an RF formulation, a total amount of the at least one hydrophilic curable material which provides, when hardened, a material featuring Tg lower than 25° C., if present in the first formulation, ranges from 0 to 5 of the total weight of the at least one formulation, including any intermediate value and subranges therebetween. In exemplary embodiments, it is not present in the RF formulation.

In exemplary embodiments of an RF formulation, a total amount of the at least one hydrophobic curable material which provides, when hardened, a material featuring Tg ranging from 25 to 80° C., if present in the first formulation, ranges from 0 to 5 of the total weight of the at least one formulation, including any intermediate value and subranges therebetween. In exemplary embodiments, it is not present in the RF formulation.

The following presents exemplary embodiments of DLM formulation.

In exemplary embodiments of a DLM formulation, a total amount of the at least one hydrophobic curable material which provides, when hardened, a material featuring Tg higher than 50° C., is from 30 to 45, or from 30 to 40, or from 35 to 40 (e.g., 37) weight percents of the total weight of the second formulation, including any intermediate value and subranges therebetween.

In some of these embodiments, the at least one hydrophobic curable material which provides, when hardened, a material featuring Tg higher than 50° C. in the second formulation comprises at least one monofunctional curable material and/or at least one multifunctional curable material, and in some embodiments it comprises only monofunctional curable material(s).

In some of these embodiments, an amount of the at least one monofunctional curable material ranges from 30 to 40, or from 35 to 40, weight percents of the total weight of the second formulation, including any intermediate value and subranges therebetween.

In some of these embodiments, an amount of the at least one multifunctional curable material ranges from 0 to 25 weight percents of the total weight of the second formulation, including any intermediate value and subranges therebetween.

In exemplary embodiments of a DLM formulation, a total amount of the at least one hydrophilic curable material which provides, when hardened, a material featuring Tg higher than 80° C., in the second formulation, is from 25 to 35, e.g., about 30, weight percents of the total weight of the at least one formulation, including any intermediate value and subranges therebetween.

In some of these embodiments, the at least one hydrophilic curable material in the second formulation comprises at least one monofunctional curable material and/or at least one multifunctional curable material, and in some embodiments it comprises only monofunctional curable material(s).

In exemplary embodiments of a DLM formulation, a total amount of the at least one hydrophobic curable material which provides, when hardened, a material featuring Tg lower than 25° C., if present in the second formulation, ranges from 0 to 5 of the total weight of the second formulation, including any intermediate value and subranges therebetween. In some of these embodiments it is not present.

In exemplary embodiments of a DLM formulation, a total amount of the at least one hydrophilic curable material which provides, when hardened, a material featuring Tg lower than 25° C., if present in the second formulation, ranges from 10 to 40, or from 10 to 30, or from 20 to 30, or from 25 to 30 (e.g., about 28), weight percents, of the total weight of the second formulation, including any intermediate value and subranges therebetween.

In some of these embodiments, the at least one hydrophilic curable material which provides, when hardened, a material featuring Tg lower than 25° C., comprises at least one monofunctional curable material and/or at least one multifunctional curable material, and in some of these embodiments, it comprises only multifunctional (e.g., trifunctional) curable material(s). An exemplary material is SR415 or like compound.

In exemplary embodiments of a DLM formulation, it further comprises a reactive diluent as described herein, in an amount of from 1 to 5, e.g., 3, weight percents of the total weight of the formulation, including any intermediate value and subranges therebetween.

Exemplary materials usable in the context of the RF and DLM formulations as described herein are presented in Table 1 in the Examples section that follows.

Elastomeric Materials

According to some of any of the embodiments described herein, at least one formulation in the formulation system of the present embodiments provides, when hardened, an elastomeric material, as defined herein.

Such formulations are suitable for use in additive manufacturing of an object which comprises, in at least a portion thereof, an elastomeric material.

In some of any of the embodiments described herein, formulations which provide elastomeric materials primarily comprise one or more elastomeric curable materials, as defined herein, and further comprise one or more of non-elastomeric materials, including hydrophilic and/or hydrophobic materials, as described herein, which may be selected so as to feature properties as indicated in the respective embodiments herein.

The phrase "elastomeric curable material" describes a curable material, as defined herein, which, upon exposure to a curing condition (e.g., curing energy), provides a cured material featuring properties of an elastomer (a rubber, or rubber-like material).

Elastomeric curable materials typically comprise one or more polymerizable (curable) groups, which undergo polymerization upon exposure to a suitable curing condition, linked to a moiety that confers elasticity to the polymerized and/or cross-linked material. Such moieties typically comprise alkyl, alkylene chains, hydrocarbon, alkylene glycol groups or chains (e.g., oligo or poly(alkylene glycol) as defined herein, urethane, oligourethane or polyurethane moieties, as defined herein, and the like, including any combination of the foregoing, and are also referred to herein as "elastomeric moieties".

An elastomeric mono-functional curable material according to some embodiments of the present invention can be a vinyl-containing compound represented by Formula I above, wherein at least one of $R_1$ and $R_2$ is and/or comprises an elastomeric moiety, as described herein.

For example, $R_1$ is or comprises an elastomeric moiety as defined herein and $R_2$ is, for example, hydrogen, C(1-4) alkyl, C(1-4) alkoxy, or any other substituent, as long as it does not interfere with the elastomeric properties of the cured material.

In some embodiments, $R_1$ is a carboxylate, and the compound is a mono-functional acrylate monomer. In some of these embodiments, $R_2$ is methyl, and the compound is mono-functional methacrylate monomer.

In some of any of these embodiments, the carboxylate group, —C(=O)—OR', comprises R' which is an elastomeric moiety as described herein.

In some embodiments, $R_1$ is amide, and the compound is a mono-functional acrylamide monomer. In some of these embodiments, $R_2$ is methyl, and the compound is mono-functional methacrylamide monomer.

(Meth)acrylates and (meth)acrylamides are collectively referred to herein throughout as (meth)acrylic materials.

In some embodiments, $R_1$ is a cyclic amide, and in some embodiments, it is a cyclic amide such as lactam, and the compound is a vinyl lactam. In some embodiments, $R_1$ is a cyclic carboxylate such as lactone, and the compound is a vinyl lactone.

When one or both of $R_1$ and $R_2$ comprise a polymeric or oligomeric moiety, the mono-functional curable compound of Formula I is an exemplary polymeric or oligomeric mono-functional curable material. Otherwise, it is an exemplary monomeric mono-functional curable material.

In multi-functional elastomeric materials, the two or more polymerizable groups are linked to one another via an elastomeric moiety, as described herein.

In some embodiments, a multifunctional elastomeric material can be represented by Formula I as described herein, in which $R_1$ comprises an elastomeric material that terminates by a polymerizable group, as described herein.

For example, a di-functional elastomeric curable material can be represented by Formula I*:

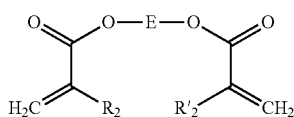

Formula I* wherein E is an elastomeric linking moiety as described herein, and $R'_2$ is as defined herein for $R_2$.

In another example, a tri-functional elastomeric curable material can be represented by Formula III:

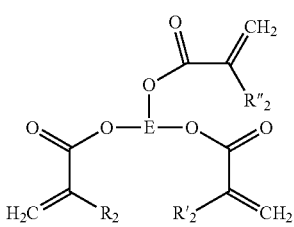

Formula III wherein E is an elastomeric linking moiety as described herein, and $R'_2$ and $R''_2$ are each independently as defined herein for $R_2$.

In some embodiments, a multi-functional (e.g., di-functional, tri-functional or higher) elastomeric curable material can be collectively represented by Formula IV:

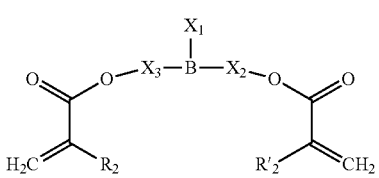

Formula IV

Wherein:

$R_2$ and $R'_2$ are as defined herein;

B is a di-functional or tri-functional branching unit as defined herein (depending on the nature of $X_1$);

$X_2$ and $X_3$ are each independently absent, an elastomeric moiety as described herein, or is selected from an alkyl, a hydrocarbon, an alkylene chain, a cycloalkyl, an aryl, an alkylene glycol, a urethane moiety, and any combination thereof; and $X_1$ is absent or is selected from an alkyl, a hydrocarbon, an alkylene chain, a cycloalkyl, an aryl, an alkylene glycol, a urethane moiety, and an elastomeric moiety, each being optionally being substituted (e.g., terminated) by a meth(acrylate) moiety (O—C(=O)CR''$_2$=CH$_2$), and any combination thereof, or, alternatively, $X_1$ is:

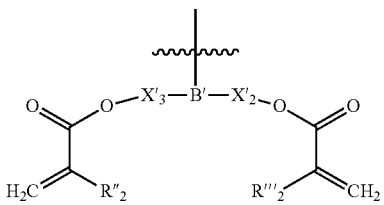

wherein:

the curved line represents the attachment point;

B' is a branching unit, being the same as, or different from, B;

$X'_2$ and $X'_3$ are each independently as defined herein for $X_2$ and $X_3$; and $R''_2$ and $R'''_2$ are as defined herein for $R_2$ and $R'_2$.

provided that at least one of $X_1$, $X_2$ and $X_3$ is or comprises an elastomeric moiety as described herein.

The term "branching unit" as used herein describes a multi-radical, preferably aliphatic or alicyclic group. By "multi-radical" it is meant that the linking moiety has two or more attachment points such that it links between two or more atoms and/or groups or moieties.

That is, the branching unit is a chemical moiety that, when attached to a single position, group or atom of a substance, creates two or more functional groups that are linked to this single position, group or atom, and thus "branches" a single functionality into two or more functionalities.

In some embodiments, the branching unit is derived from a chemical moiety that has two, three or more functional groups. In some embodiments, the branching unit is a branched alkyl or a branched linking moiety as described herein.

Multi-functional elastomeric curable materials featuring 4 or more polymerizable groups are also contemplated, and can feature structures similar to those presented in Formula IV, while including, for example, a branching unit B with higher branching, or including an $X_1$ moiety featuring two (meth)acrylate moieties as defined herein, or similar to those presented in Formula III, while including, for example, another (meth)acrylate moiety that is attached to the elastomeric moiety.

In some embodiments, the elastomeric moiety, e.g., Ra in Formula I or the moiety denoted as E in Formulae I*, III and IV, is or comprises an alkyl, which can be linear or branched, and which is preferably of 3 or more or of 4 or more carbon atoms; an alkylene chain, preferably of 3 or more or of 4 or more carbon atoms in length; an alkylene glycol as defined herein, an oligo(alkylene glycol), or a poly(alkylene glycol), as defined herein, preferably of 4 or more atoms in length, a urethane, an oligourethane, or a polyurethane, as defined herein, preferably of 4 or more carbon atoms in length, and any combination of the foregoing.

In some of any of the embodiments described herein, the elastomeric curable material is a (meth)acrylic curable material, as described herein, and in some embodiments, it is an acrylate.

In some of any of the embodiments described herein, the elastomeric curable material is or comprises a mono-functional elastomeric curable material, and is some embodiments, the mono-functional elastomeric curable material is represented by Formula I, wherein $R_1$ is —C(=O)—OR' and R' is an alkylene chain (e.g., of 4 or more, preferably 6 or more, preferably 8 or more, carbon atoms in length), or a poly(alkylene glycol) chain, as defined herein.

In some embodiments, the elastomeric curable material is or comprises a multi-functional elastomeric curable material, and is some embodiments, the multi-functional elastomeric curable material is represented by Formula I*, wherein E is an alkylene chain (e.g., of 4 or more, or 6 or more, carbon atoms in length), and/or a poly(alkylene glycol) chain, as defined herein.

In some embodiments, the elastomeric curable material is or comprises a multi-functional elastomeric curable material, and is some embodiments, the multi-functional elastomeric curable material is represented by Formula III, wherein E is a branched alkyl (e.g., of 3 or more, or of 4 or more, or of 5 or more, carbon atoms in length).

In some of any of the embodiments described herein, the elastomeric curable material is an elastomeric acrylate or methacrylate (also referred to as acrylic or methacrylic elastomer), for example, of Formula I, I*, III or IV, and in some embodiments, the acrylate or methacrylate is selected such that when hardened, the polymeric material features a Tg lower than 0° C. or lower than −10° C.

Exemplary elastomeric acrylate and methacrylate curable materials include, but are not limited to, 2-propenoic acid, 2-[[(butylamino)carbonyl]oxy]ethyl ester (an exemplary urethane acrylate), and compounds marketed under the trade names SR335 (Lauryl acrylate) and SR395 (isodecyl acrylate) (by Sartomer). Other examples include compounds marketed under the trade names SR350D (a trifunctional trimethylolpropane trimethacrylate (TMPTMA), SR256 (2-(2-ethoxyethoxy)ethyl acrylate, SR252 (polyethylene glycol (600) dimethacrylate), SR561 (an alkoxylated hexane diol diacrylate) (by Sartomer). Additional examples include curable materials marketed as the Genomer family (e.g., Genomer 1122).

It is to be noted that other acrylic materials, featuring, for example, one or more acrylamide groups instead of one or more acrylate or methacrylate groups are also contemplated.

In some of any of the embodiment described herein, the elastomeric curable material comprises one or more mono-functional elastomeric curable material(s) (e.g., a mono-functional elastomeric acrylate, as represented, for example, in Formula I) and one or more multi-functional (e.g., di-functional) elastomeric curable materials(s) (e.g., a di-functional elastomeric acrylate, as represented, for example, in Formula I*, III or IV) and in any of the respective embodiments as described herein.

In some embodiments, the additional curable material is a mono-functional acrylate or methacrylate ((meth)acrylate). Non-limiting examples include isobornyl acrylate (IBOA), isobornylmethacrylate, acryloyl morpholine (ACMO), tetrahydrofutyl acrylate, phenoxyethyl acrylate, marketed by Sartomer Company (USA) under the trade name SR-339, urethane acrylate oligomer such as marketed under the name CN 131B, and any other acrylates and methacrylates usable in AM methodologies.

In some embodiments, the additional curable material is a multi-functional acrylate or methacrylate ((meth)acrylate). Non-limiting examples of multi-functional (meth)acrylates include propoxylated (2) neopentyl glycol diacrylate, marketed by Sartomer Company (USA) under the trade name SR-9003, Ditrimethylolpropane Tetra-acrylate (DiTMPTTA), Pentaerythitol Tetra-acrylate (TETTA), and Dipentaerythitol Penta-acrylate (DiPEP), and an aliphatic urethane diacrylate, for example, such as marketed as Ebecryl 230. Non-limiting examples of multi-functional (meth) acrylate oligomers include ethoxylated or methoxylated polyethylene glycol diacrylate or dimethacrylate, ethoxylated bisphenol A diacrylate, polyethylene glycol-polyethylene glycol urethane diacrylate, a partially acrylated polyol oligomer, polyester-based urethane diacrylates such as marketed as CNN91.

In some of any of the embodiments described herein for a formulation that provides, when hardened, an elastomeric material, the formulation comprises:

one or more elastomeric curable material(s), as defined herein in any of the respective embodiments; and one or more mono-functional curable material(s).

In some embodiments, the formulation further comprises one or more difunctional curable material(s).

In some of any of the embodiments described herein for elastomeric materials, the one or more elastomeric curable material(s) comprise at least a monofunctional elastomeric curable material, as described herein. Optionally, the one or more elastomeric curable material(s) comprise, in addition, a multifunctional elastomeric curable materials, e.g., an elastomeric difunctional material, as described herein.

In some of any of the embodiments described herein for elastomeric materials, a total amount of the elastomeric curable material(s) is at least 30, preferably at least 35, weight percents, of the total weight of a formulation comprising same. In some of any of the embodiments described herein for elastomeric materials, a total amount of the elastomeric curable material(s) ranges from about 30 to about 70, or from about 35 to about 65, weight percents of the total weight of the formulation comprising same, including any intermediate values and subranges therebetween.

In some of any of the embodiments described herein for elastomeric materials, a total amount of the one or more non-elastomeric monofunctional curable material(s) ranges from about 20 to about 60, or from about 30 to about 60, or from about 40 to about 60, or from about 45 to about 60, or from about 45 to about 55, or from about 50 to about 55, weight percents of the total weight of the formulation comprising same, including any intermediate values and subranges therebetween.

The monofunctional curable material according to these embodiments can be hydrophilic or hydrophobic, and can be such that provides, when hardened, a material featuring either Tg of at least 80° C. or Tg lower than 25° C.

In some embodiments, the monofunctional curable material(s) comprise one or more hydrophobic monofunctional curable material(s) that provide, when hardened, a material featuring Tg of at least 80° C. Exemplary such materials are described herein.

In some of these embodiments, an amount of hydrophobic monofunctional curable material(s) that provide, when hardened, a material featuring Tg of at least 80° C., ranges from about 20 to about 30, or from about 25 to about 30, weight percents of the total weight of the formulation comprising same, including any intermediate and subranges therebetween.

In some embodiments, the monofunctional curable material(s) comprise one or more hydrophobic monofunctional curable material(s) that provide, when hardened, a material featuring Tg lower than 25° C. Exemplary such materials are as described herein.

In some of these embodiments, an amount of hydrophobic monofunctional curable material(s) that provide, when hardened, a material featuring Tg lower than 25° C., is no more than 25 weight percents weight percents of the total weight of the formulation comprising same, and in some embodiments it is from about 10 to about 25 or from about 20 to about 25, weight percents, including any intermediate and subranges therebetween. Exemplary materials are presented in Table 9 in the Examples section that follows.

In some of these embodiments, an amount of hydrophilic monofunctional curable material(s) that provide, when hardened, a material featuring Tg lower than 25° C., is no more than 10 weight percents of the total weight of the formulation comprising same, and in some embodiments it is either absent or present in an amount of from about 5 to about 8, or from about 5 to about 6, weight percents, including any intermediate and subranges therebetween. Exemplary materials are presented in Table 9 in the Examples section that follows.

In some of any of the embodiments described herein for elastomeric material, a difunctional curable material, if present in the formulation, is in an amount of from about 1 to about 15 weight percents of the total weight of the formulation comprising same, including any intermediate values and subranges therebetween, and in some embodiments it is either absent or is in an amount of from 1 to 10, from 3 to 6, e.g., from about 4 to about 5, weight percents of the total weight of a formulation comprising same.

In some of these embodiments, the di-functional curable material(s) is a high molecular weight difunctional curable material, e.g., higher than 1000 grams/mol, or higher than 2000 grams/mol, or higher than 3000 grams/mol, or even higher.

In some of any of the embodiments described herein for elastomeric materials, the formulation optionally further comprises a non-reactive material, preferably a polymeric material that acts as a plasticizer, and is preferably featuring a viscosity, at room temperature, of no more than 15 centipoises or no more than 10 centipoises or no more than 5 centipoises. If present in the formulation, an amount of such a non-reactive material can range from 1 to 15, or from about 5 to about 15, or from about 5 to about 10, or from about 9 to about 10, weight percents of the total weight of the formulation comprising same, including any intermediate value and subranges therebetween. Exemplary such materials include, but are not limited to, polypropylene glycols, polyethylene glycols, and like compounds, featuring molecular weight of from 300 to 1000 grams/mol.

In some of any of the embodiments described herein for elastomeric materials, the formulation system comprises two or more elastomeric modeling material formulations as described herein, which can differ from one another by the chemical composition of the curable materials, thus providing variable elastomeric properties, and/or by the chemical composition of non-curable materials.

According to some of any of the embodiments described herein for elastomeric materials, the formulation or formulation system provides, when hardened, an elastomeric material that is characterized by elongation of at least 200%, or of at least 250%, or of at least 280%, or of at least 290%, or even higher.

Additional Embodiments

According to some of any of the embodiments described herein, the formulation system consists of one formulation, unless otherwise indicated.

In some of any of the embodiments described herein, one or more of the modeling material formulation(s) further comprises an initiator, for initiating polymerization of the curable materials.

According to some of any of the embodiments described herein, all of the curable materials included in a formulation or formulation system as described herein are UV-curable materials, and in some embodiments, are UV-curable acrylic materials such as acrylates and/or methacrylates.

In some of these embodiments, the formulation system further comprises a photoinitiator.

Non-limiting examples of suitable photoinitiators include benzophenones (aromatic ketones) such as benzophenone, methyl benzophenone, Michler's ketone and xanthones; acylphosphine oxide type photo-initiators such as 2,4,6-trimethylbenzolydiphenyl phosphine oxide (TMPO), 2,4,6-trimethylbenzoylethoxyphenyl phosphine oxide (TEPO), and bisacylphosphine oxides (BAPO's); benzoins and bezoin alkyl ethers such as benzoin, benzoin methyl ether and benzoin isopropyl ether and the like. Examples of photoinitiators are alpha-amino ketone, bisacylphosphine oxide (BAPO's), and those marketed under the tradename Irgacure®.

A photo-initiator may be used alone or in combination with a co-initiator. Benzophenone is an example of a photoinitiator that requires a second molecule, such as an amine, to produce a free radical. After absorbing radiation, benzophenone reacts with a ternary amine by hydrogen abstraction, to generate an alpha-amino radical which initiates polymerization of acrylates. Non-limiting example of a class of co-initiators are alkanolamines such as triethylamine, methyldiethanolamine and triethanolamine.

A concentration of a photoinitiator in a formulation containing same may range from about 0.1 to about 5 weight percents, or from about 1 to about 5 weight percents, preferably from about 1 to about 3 weight percents, of the total weight of a formulation comprising same, including any intermediate value and subranges therebetween.

In some of any of the embodiments described herein, a modeling material formulation can further comprise, in addition to the components described hereinabove, one or more additional agents, which are referred to herein also as non-reactive materials.

Such agents include, for example, surface active agents, stabilizers, antioxidants, fillers, pigments, dispersants, and/or impact modifying agents (toughening agents or toughness modifiers).

In cases where the formulation system comprises two or more formulations, the non-reactive agents can be independently included in one or all of the modeling material formulations in the system.

The term "filler" describes an inert material that modifies the properties of a polymeric material and/or adjusts a quality of the end products. The filler may be an inorganic particle, for example calcium carbonate, silica, and clay.

Fillers may be added to the modeling formulation in order to reduce shrinkage during polymerization or during cooling, for example, to reduce the coefficient of thermal expansion, increase strength, increase thermal stability, reduce cost and/or adopt rheological properties.

In some embodiments, a modeling formulation comprises a surface active agent and/or a dispersant. A surface-active agent may be used to reduce the surface tension of the formulation to the value required for jetting or for printing process, which is typically between 10 dyne/cm and 50 dyne/cm, for instance about 30 dyne/cm. An exemplary such agent is a silicone surface additive, e.g., of the BYK family.

In any of the exemplary modeling material formulations described herein, a concentration of a surfactant ranges from 0 to about 1% weight, and is, for example, 0, 0.01, 0.05, 0.1, 0.5 or about 1%, by weight, including any intermediate value therebetween, of the total weight of the formulation or formulation system comprising same.

In any of the exemplary modeling material formulations described herein, a concentration of a dispersant ranges from 0 to about 2% weight, and is, for example, 0, 0.1, 0.5, 0.7, 1, 1.2, 1.3, 1.35, 1.4, 1.5, 1.7, 1.8 or about 2%, by weight, including any intermediate value therebetween, of the total weight of the formulation or formulation system comprising same.

Suitable stabilizers (stabilizing agents) include, for example, thermal stabilizers, which stabilize the formulation at high temperatures.

In some embodiments, the modeling formulation comprises one or more pigments. In some embodiments, the pigment's concentration is lower than 35%, or lower than 25% or lower than 15%, by weight. In exemplary embodiments, an amount of a pigment in a formulation comprising same ranges from 0.1 to 5, or 1 to 5, or 1 to 3, or 1 to 2, % by weight of the total weight of a formulation comprising same.

The pigment may be a white pigment. The pigment may be an organic pigment or an inorganic pigment, or a metal pigment or a combination thereof.

In some embodiments the modeling formulation further comprises a dye.

In some embodiments, combinations of white pigments and dyes are used to prepare colored cured materials.

The dye may be any of a broad class of solvent soluble dyes. Some non-limiting examples are azo dyes which are yellow, orange, brown and red; anthraquinone and triarylmethane dyes which are green and blue; and azine dye which is black.

In some of any of the embodiments described herein, one or more of the modeling material formulations comprises a toughening agent.

Non-limiting examples of toughening agents include elastomeric materials. Representative examples include, without limitation, natural rubber, butyl rubber, polyisoprene, polybutadiene, polyisobutylene, ethylene-propylene copolymer, styrene-butadiene-styrene triblock rubber, random styrene-butadiene rubber, styrene-isoprene-styrene triblock rubber, styrene-ethylene/butylene-styrene copolymer, styrene-ethylene/propylene-styrene copolymer, ethylene-propylene-diene terpolymers, ethylene-vinyl acetate and nitrile rubbers. Preferred agents are elastomers such as polybutadienes. Toughening agents such as elastomeric materials can be added to the formulation by incorporating in a modeling material formulation an elastomeric material in a dispersed/dissolved phase.

A concentration of elastomeric materials may range from about 0.10 phr to about 10 phr, or from about 0.1 phr to about 5 phr, relative to the weight of the formulation containing same.

A concentration of elastomeric materials may alternatively range from about 0.1% to about 20%, by weight, of the total weight of a formulation containing same.

Other impact modifying agents, such as, for example, carbon fibers, carbon nanotubes, glass fibers, aramid Kevlar, polyparaphenylene benzobisoxazole Zylon, and other polar and non-polar impact modifiers, are also contemplated.

In some embodiments, one or more of the modeling material formulation(s) further comprises a polymerization inhibitor.

In any of the exemplary modeling material formulations described herein, a concentration of an inhibitor ranges from 0 to about 2% weight, or from 0 to about 1%, and is, for example, 0, 0.1, 0.2, 0.3, 0.4, 0.5, 0.6, 0.7, 0.8, 0.9 or about 1%, by weight, including any intermediate value therebetween, of the total weight of the formulation or a formulation system comprising same.

Kits:

In some of any of the embodiments described herein there is provided a kit comprising the modeling material formulation(s) or the formulation system, as described herein in any of the respective embodiments and any combination thereof.

In some embodiments, when the kit comprises two or more modeling material formulations, or a formulation system comprising two or more formulations, each formulation is packaged individually in the kit.

In some embodiments, the formulation further comprises a photoinitiator as described herein, and in some of these embodiments, the photoinitiator is packaged individually within the kit, that is, separately from other components of the formulation or formulation system.

In exemplary embodiments, the formulation(s) are packaged within the kit in a suitable packaging material, preferably, an impermeable material (e.g., water- and gas-impermeable material), and further preferably an opaque material. In some embodiments, the kit further comprises instructions to use the formulations in an additive manufacturing process, preferably a 3D inkjet printing process as described herein. The kit may further comprise instructions to use the formulations in the process in accordance with the method as described herein.

System and Methods

Figure 2A:
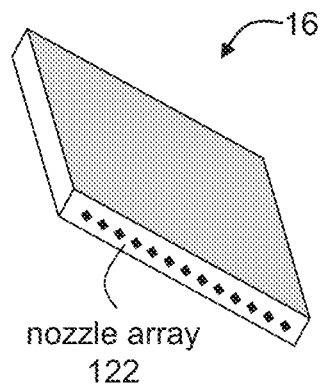
FIGS. 2A-2C are schematic illustrations of print heads according to some embodiments of the present invention.
Figure 2B:
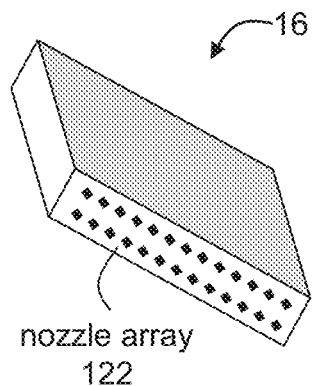
Figure 2C:
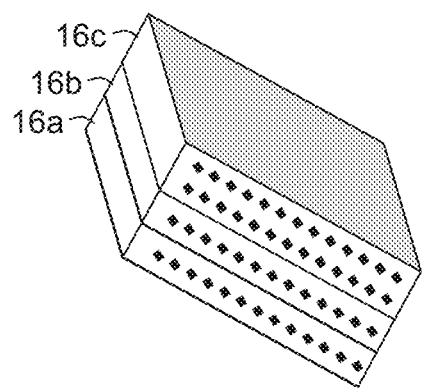

A representative and non-limiting example of a system 110 suitable for AM of an object 112 according to some embodiments of the present invention is illustrated in FIG. 1A. System 110 comprises an additive manufacturing apparatus 114 having a dispensing unit 16 which comprises a plurality of dispensing heads. Each head preferably comprises one or more arrays of nozzles 122, as illustrated in FIGS. 2A-C described below, through which a liquid building material 124 is dispensed.

According to some embodiments of the present invention, apparatus 114 operates at a temperature that does not exceed 35° C.

Preferably, but not obligatorily, apparatus 114 is a three-dimensional inkjet printing apparatus, in which case the dispensing heads are printing heads, and the building material is dispensed via inkjet technology from a printing head having one or more arrays of nozzles to deposit building material formulation in layers on a supporting structure. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material deposition apparatus.

Each dispensing head is optionally and preferably fed via a building material reservoir which may optionally include a temperature control unit (e.g., a temperature sensor and/or a heating device), and a material level sensor. In some embodiments, the temperature control unit is configured so as not to exceed 45° C., 40° C. or 35° C. To dispense the building material, a voltage signal is applied to the dispensing heads to selectively deposit droplets of material via the dispensing head nozzles, for example, as in piezoelectric inkjet printing technology. The dispensing rate of each head depends on the number of nozzles or arrays of nozzles, the type of nozzles and the applied voltage signal rate (frequency). Such dispensing heads are known to those skilled in the art of solid freeform fabrication.

Preferably, but not obligatorily, the overall number of dispensing nozzles or nozzle arrays is selected such that half of the dispensing nozzles are designated to dispense support material and half of the dispensing nozzles are designated to dispense modeling material, i.e. the number of nozzles jetting modeling materials is the same as the number of nozzles jetting support material. In the representative example of FIG. 1A, four dispensing heads 16a, 16b, 16c and 16d are illustrated. Each of heads 16a, 16b, 16c and 16d has a nozzle array. In this Example, heads 16a and 16b can be designated for modeling material/s and heads 16c and 16d can be designated for support material. Thus, head 16a can dispense a first modeling material, head 16b can dispense a second modeling material and heads 16c and 16d can both dispense support material. In an alternative embodiment, heads 16c and 16d, for example, may be combined in a single head having two nozzle arrays for depositing support material. In a further alternative embodiment any one or more of the printing heads may have more than one nozzle arrays for depositing more than one material formulation, e.g. two nozzle arrays for depositing two different modeling material formulations or a modeling material formulation and a support material formulation, each formulation via a different array or number of nozzles.

Yet it is to be understood that it is not intended to limit the scope of the present invention and that the number of modeling material printing heads (modeling heads) and the number of support material printing heads (support heads) may differ. Generally, the number of arrays of nozzles that dispense modeling material formulation, the number of arrays of nozzles that dispense support material formulation, and the number of nozzles in each respective array are selected such as to provide a predetermined ratio, a, between the maximal dispensing rate of the support material formulation and the maximal dispensing rate of modeling material formulation. The value of the predetermined ratio, a, is preferably selected to ensure that in each formed layer, the height of modeling material equals the height of support material. Typical values for a are from about 0.6 to about 1.5.

For example, for a=1, the overall dispensing rate of support material is generally the same as the overall dispensing rate of the modeling material when all the arrays of nozzles operate.

For example, apparatus 114 can comprise M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material formulation level sensor of its own, and receives an individually controlled voltage for its operation.

In some embodiments, the temperature control unit of at least a few of the arrays is configured so as not to exceed 45° C., or 40° C., or 35° C.

Apparatus 114 can further comprise a hardening device 324 which can include any device configured to emit light, heat or the like that may cause the deposited material to harden. For example, hardening device 324 can comprise one or more radiation sources, which can be, for example, an ultraviolet or visible or infrared lamp, or other sources of electromagnetic radiation, or electron beam source, depending on the modeling material being used. In some embodiments of the present invention, hardening device 324 serves for curing or solidifying the modeling material.

As used herein, the term "dispensing head" or "depositing head" encompasses printing heads which are dispensing heads usable in 3D printing such as 3D inkjet printing.

The dispensing head(s) and radiation source are preferably mounted in a frame or block 128 which is preferably operative to reciprocally move over a tray 360, which serves as the working surface. In some embodiments of the present invention the radiation sources are mounted in the block such that they follow in the wake of the dispensing heads to at least partially cure or solidify the materials just dispensed by the dispensing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward. In various exemplary embodiments of the invention, apparatus 114 further comprises one or more leveling devices 132, e.g. a roller 326. Leveling device 326 serves to straighten, level and/or establish a thickness of the newly formed layer prior to the formation of the successive layer thereon. Leveling device 326 preferably comprises a waste collection device 136 for collecting the excess material generated during leveling. Waste collection device 136 may comprise any mechanism that delivers the material to a waste tank or waste cartridge.

In use, the dispensing heads of unit 16 move in a scanning direction, which is referred to herein as the X direction, and selectively dispense building material in a predetermined configuration in the course of their passage over tray 360. The building material typically comprises one or more types of support material and one or more types of modeling material. The passage of the dispensing heads of unit 16 is followed by the curing of the modeling material(s) by radiation source 126. In the reverse passage of the heads, back to their starting point for the layer just deposited, an additional dispensing of building material may be carried out, according to predetermined configuration. In the forward and/or reverse passages of the dispensing heads, the layer thus formed may be straightened by leveling device 326, which preferably follows the path of the dispensing heads in their forward and/or reverse movement. Once the dispensing heads return to their starting point along the X direction, they may move to another position along an indexing direction, referred to herein as the Y direction, and continue to build the same layer by reciprocal movement along the X direction. Alternately, the dispensing heads may move in the Y direction between forward and reverse movements or after more than one forward-reverse movement. The series of scans performed by the dispensing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the dispensing head of unit 16, within the layer. Such Z displacement is carried out in order to cause contact of the leveling device with the surface in one direction and prevent contact in the other direction.

System 110 optionally and preferably comprises a building material supply system 330 which comprises the building material containers or cartridges and supplies a plurality of building materials to fabrication apparatus 114.

A control unit 152 controls fabrication (e.g., printing) apparatus 114 and optionally and preferably also supply system 330. Control unit 152 typically includes an electronic circuit configured to perform the controlling operations. Control unit 152 preferably communicates with a data processor 154 which transmits digital data pertaining to fabrication instructions based on computer object data, e.g., a CAD configuration represented on a computer readable medium in a form of a Standard Tessellation Language (STL) format or the like. Typically, control unit 152 controls the voltage applied to each dispensing head or nozzle array and the temperature of the building material in the respective printing head or respective nozzle array, as described herein.

According to some embodiments of the present invention, control unit 152 is operated such that the temperature of the building material (uncured) does not exceed 40° C. or 35° C.

Once the manufacturing data is loaded to control unit 152 it can operate without user intervention. In some embodiments, control unit 152 receives additional input from the operator, e.g., using data processor 154 or using a user interface 116 communicating with unit 152. User interface 116 can be of any type known in the art, such as, but not limited to, a keyboard, a touch screen and the like. For example, control unit 152 can receive, as additional input, one or more building material types and/or attributes, such as, but not limited to, color, characteristic distortion and/or transition temperature, viscosity, electrical property, magnetic property. Other attributes and groups of attributes are also contemplated.

Figure 1B:
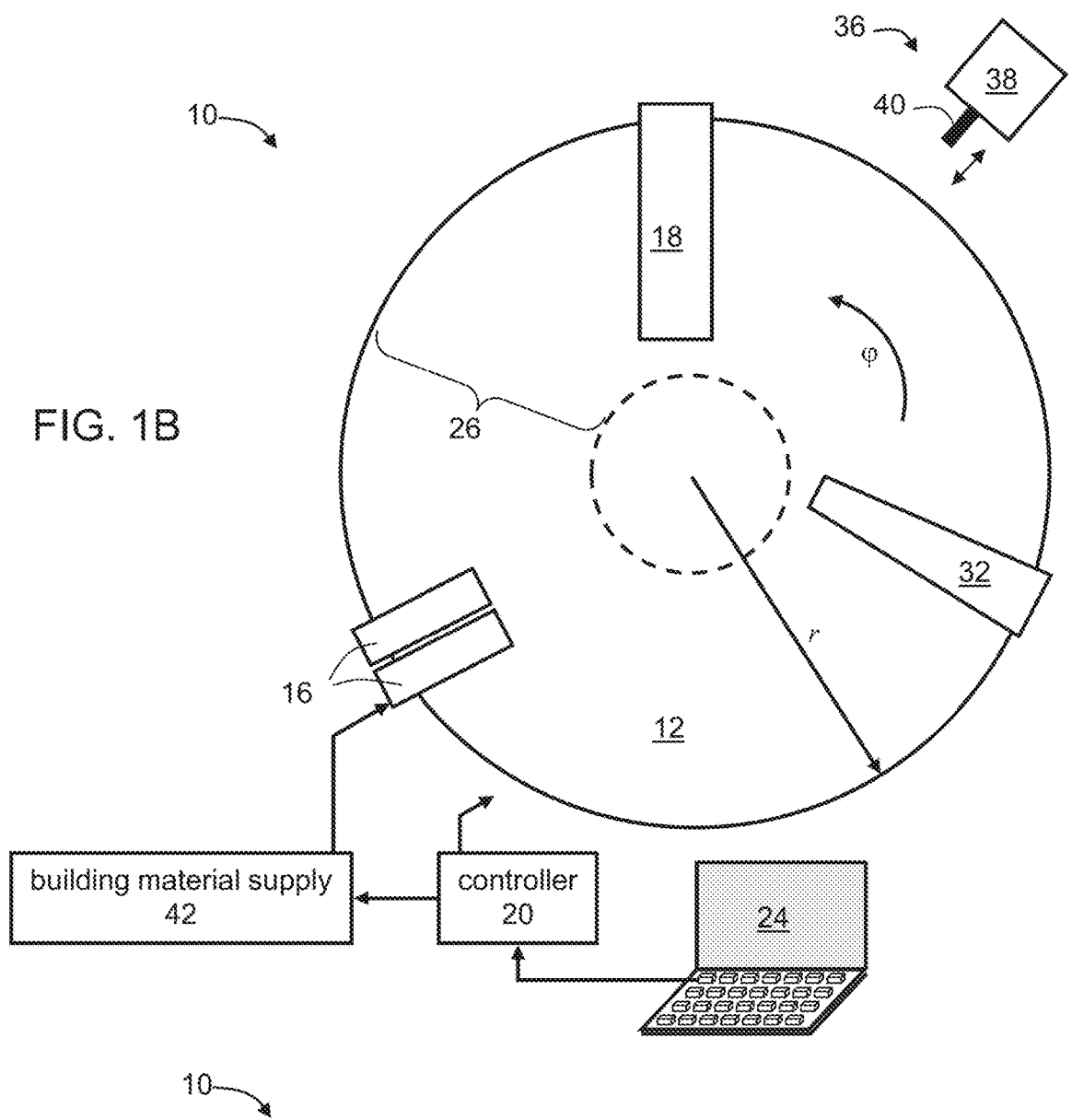
Figure 1C:
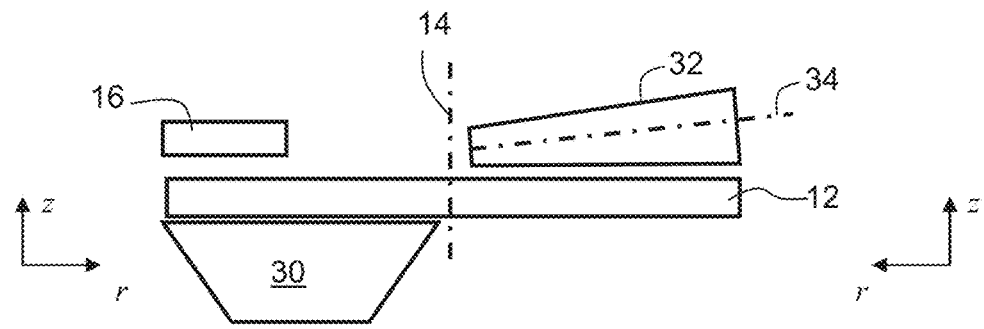
Figure 1D:
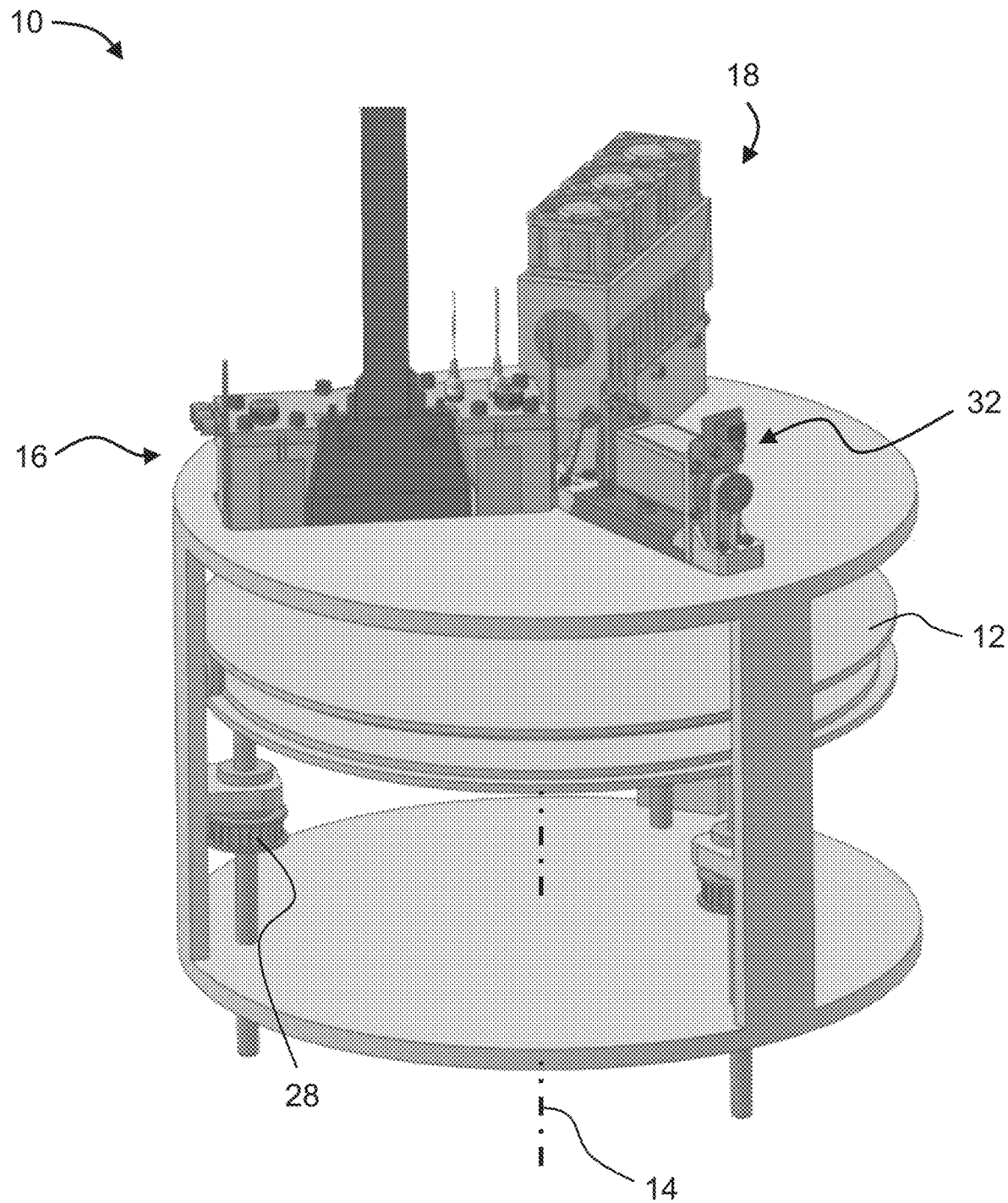

Another representative and non-limiting example of a system 10 suitable for AM of an object according to some embodiments of the present invention is illustrated in FIGS. 1B-D. FIGS. 1B-D illustrate a top view (FIG. 1B), a side view (FIG. 1C) and an isometric view (FIG. 1D) of system 10.

In the present embodiments, system 10 comprises a tray 12 and a plurality of inkjet printing heads 16, each having each having one or more arrays of nozzles with respective one or more pluralities of separated nozzles. Tray 12 can have a shape of a disk or it can be annular. Non-round shapes are also contemplated, provided they can be rotated about a vertical axis. Printing heads 16 can be any of the printing heads described above with respect to system 110.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While the embodiments below are described with a particular emphasis to configuration (i) wherein the tray is a rotary tray that is configured to rotate about vertical axis 14 relative to heads 16, it is to be understood that the present application contemplates also configurations (ii) and (iii). Any one of the embodiments described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction φ, and a direction perpendicular to tray 12 is referred to herein is the vertical direction z.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a supporting structure for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-C. These embodiments can be employed for any of the AM systems described above, including, without limitation, system 110 and system 10.

FIGS. 2A-B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably can be parallel to each other. When a printing head has two or more arrays of nozzles (e.g., FIG. 2B) all arrays of the head can be fed with the same building material formulation, or at least two arrays of the same head can be fed with different building material formulations.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1$-$\varphi_2$, and the angle between the linear nozzle arrays of the two heads is also $\varphi_1$-$\varphi_2$.

In some embodiments, two or more printing heads can be assembled to a block of printing heads, in which case the printing heads of the block are typically parallel to each other. A block including several inkjet printing heads 16a, 16b, 16c is illustrated in FIG. 2C.

In some embodiments, system 10 comprises a support structure 30 positioned below heads 16 such that tray 12 is between support structure 30 and heads 16. Support structure 30 may serve for preventing or reducing vibrations of tray 12 that may occur while inkjet printing heads 16 operate. In configurations in which printing heads 16 rotate about axis 14, support structure 30 preferably also rotates such that support structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, support structure 30 preferably also moves vertically together with tray 12. In configurations in which the vertical distance is varied by heads 16 along the vertical direction, while maintaining the vertical position of tray 12 fixed, support structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of inkjet printing heads 16 and optionally and preferably also of one or more other components of system 10, e.g., the motion of tray 12, are controlled by a controller 20. The controller can have an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

Figure 3A:
FIGS. 3A and 3B are schematic illustrations demonstrating coordinate transformations according to some embodiments of the present invention.
Figure 3B:
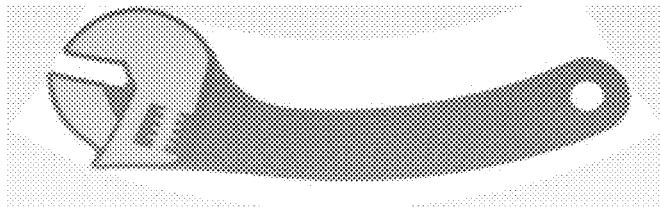

The transformation of coordinates allows three-dimensional printing over a rotating tray. In non-rotary systems with a stationary tray with the printing heads typically reciprocally move above the stationary tray along straight lines. In such systems, the printing resolution is the same at any point over the tray, provided the dispensing rates of the heads are uniform. In system 10, unlike non-rotary systems, not all the nozzles of the head points cover the same distance over tray 12 during at the same time. The transformation of coordinates is optionally and preferably executed so as to ensure equal amounts of excess material at different radial positions. Representative examples of coordinate transformations according to some embodiments of the present invention are provided in FIGS. 3A-B, showing three slices of an object (each slice corresponds to fabrication instructions of a different layer of the objects), where FIG. 3A illustrates a slice in a Cartesian system of coordinates and FIG. 3B illustrates the same slice following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material in layers, such as to print a three-dimensional object on tray 12.

System 10 optionally and preferably comprises one or more radiation sources 18, which can be, for example, an ultraviolet or visible or infrared lamp, or other sources of electromagnetic radiation, or electron beam source, depending on the modeling material being used. Radiation source can include any type of radiation emitting device, including, without limitation, light emitting diode (LED), digital light processing (DLP) system, resistive lamp and the like. Radiation source 18 serves for curing or solidifying the modeling material. In various exemplary embodiments of the invention the operation of radiation source 18 is controlled by controller 20 which may activate and deactivate radiation source 18 and may optionally also control the amount of radiation generated by radiation source 18.

In some embodiments of the invention, system 10 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 2C).

The conical roller can have the shape of a cone or a conical frustum.

The opening angle of the conical roller is preferably selected such that there is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Some embodiments contemplate the fabrication of an object by dispensing different materials from different arrays of nozzles (belonging to the same or different printing head). These embodiments provide, inter alia, the ability to select materials from a given number of materials and define desired combinations of the selected materials and their properties. According to the present embodiments, the spatial locations of the deposition of each material with the layer is defined, either to effect occupation of different three-dimensional spatial locations by different materials, or to effect occupation of substantially the same three-dimensional location or adjacent three-dimensional locations by two or more different materials so as to allow post deposition spatial combination of the materials within the layer, thereby to form a composite material at the respective location or locations.

Any post deposition combination or mix of modeling materials is contemplated. For example, once a certain material is dispensed it may preserve its original properties. However, when it is dispensed simultaneously with another modeling material or other dispensed materials which are dispensed at the same or nearby locations, a composite material having a different property or properties to the dispensed materials is formed.

Further details on the principles and operations of an AM system suitable for the present embodiments are found in U.S. Pat. No. 9,031,680, and International Publication No. WO2016/009426, the contents of which are hereby incorporated by reference.

The present embodiments thus enable the deposition of a broad range of material combinations, and the fabrication of an object which may consist of multiple different combinations of materials, in different parts of the object, according to the properties desired to characterize each part of the object.

As discussed hereinabove, the present embodiments enable deposition of material combinations that form shelled structures.

A representative and non-limiting example of a shelled structure according to some embodiments of the present invention is shown in FIGS. 4A-D.

Figure 4A:
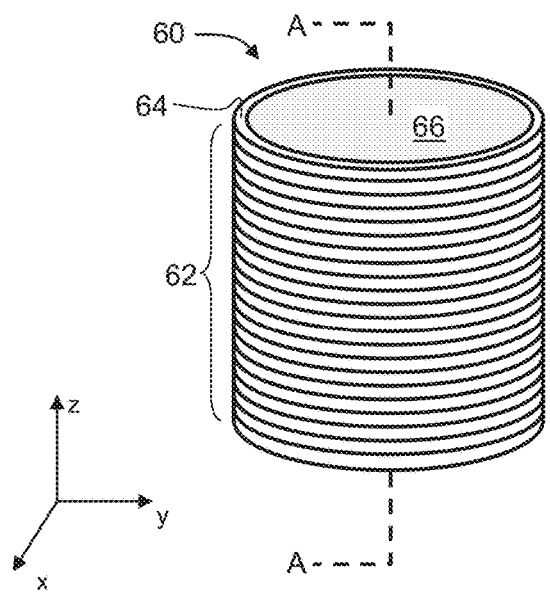
FIGS. 4A-F are schematic illustrations of shelled structures, according to some embodiments of the present invention.
Figure 4B:
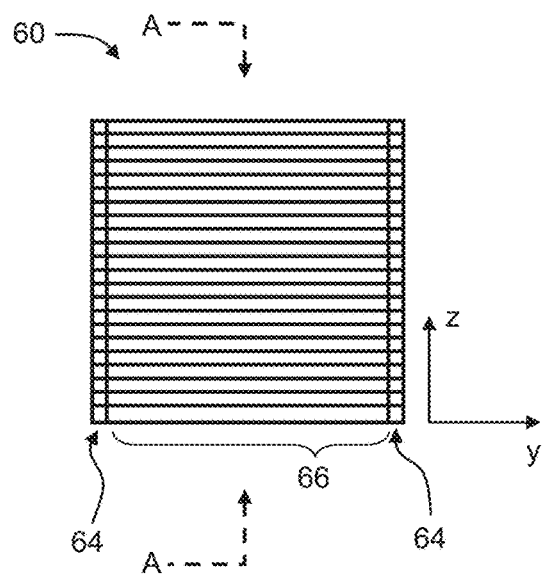

FIG. 4A is a schematic illustration of a perspective view of a structure 60, and FIG. 4B is a cross-sectional view of structure 60 along line A-A of FIG. 4A. For clarity of presentation a Cartesian coordinate system is also illustrated.

Structure 60 comprises a plurality of layers 62 stacked along the z direction. Structure 60 is typically fabricated by an AM technique, e.g., using system 10, whereby the layers are formed in a sequential manner. Thus, the z direction is also referred to herein as the "build direction" of the structure. Layers 62 are, therefore, perpendicular to the build direction. Although structure 60 is shown as a cylinder, this need not necessarily be the case, since the structure of the present embodiments can have any shape.

The shell and core of structure 60 are shown at 64 and 66, respectively. As shown, the layers of core 66 and the layers of shell 64 are co-planar. The AM technique allows the simultaneous fabrication of shell 64 and core 66, whereby for a particular formed layer, the inner part of the layer constitutes a layer of the core, and the periphery of the layer, or part thereof, constitutes a layer of the shell.

Figure 4C:
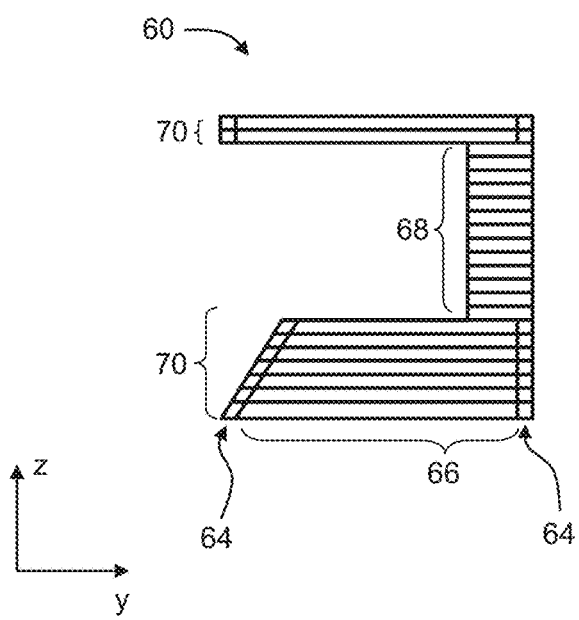
Figure 6:
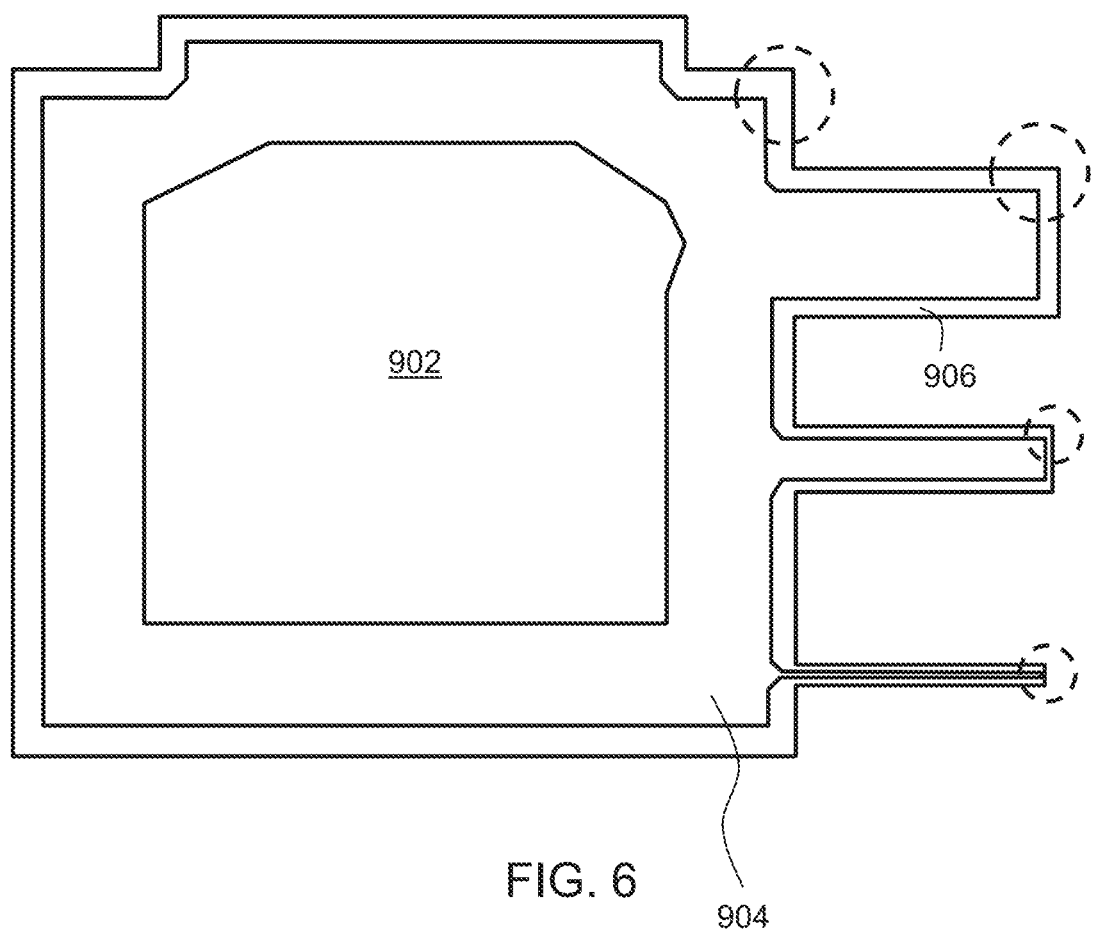
FIG. 6 is a schematic illustration of a shelled structure having parts that are devoid of a core region, according to some embodiments of the present invention.

A peripheral section of a layer which contributes to shell 64 is referred to herein as an "envelope region" of the layer. In the non-limiting example of FIGS. 4A and 4B, each of layers 62 has an envelope region. Namely, each layer in FIGS. 4A and 4B contributes both to the core and to the shell. However, this need not necessarily be the case, since, for some applications, it may be desired to have the core exposed to the environment in some regions. In these applications, at least some of the layers do not include an envelope region. A representative example of such configuration is illustrated in the cross-sectional view of FIG. 4C, showing some layers 68 which contribute to the core but not to the shell, and some layers 70 which contribute to both the core and the shell. In some embodiments, one or more layers do not include a region with core thermo-mechanical properties and comprise only a region with shell thermo-mechanical properties. These embodiments are particularly useful when the structure has one or more thin parts, wherein the layers forming those parts of the structure are preferably devoid of a core region. A representative example of such a structure is illustrated in FIG. 6, described below. Also contemplated are embodiments in which one or more layers do not include a region with shell thermo-mechanical properties and comprise only a region with core thermo-mechanical properties.

Figure 4D:
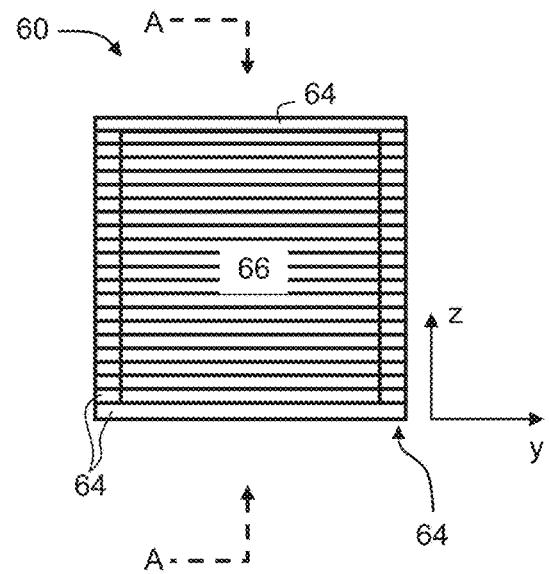

The shell can, optionally and preferably, also cover structure 60 from above and/or below, relative to the z direction. In these embodiments, some layers at the top most and/or bottom most parts of structure 60 have at least one material property which is different from core 66. In various exemplary embodiments of the invention the top most and/or bottom most parts of structure 60 have the same material property as shell 64. A representative example of this embodiment is illustrated in FIG. 4D. The top/bottom shell of structure 60 may be thinner (e.g., 2 times thinner) than the side shell, e.g. when the top or bottom shell comprises a layer above or below the structure, and therefore has the same thickness as required for layers forming the object.

Figure 4E:
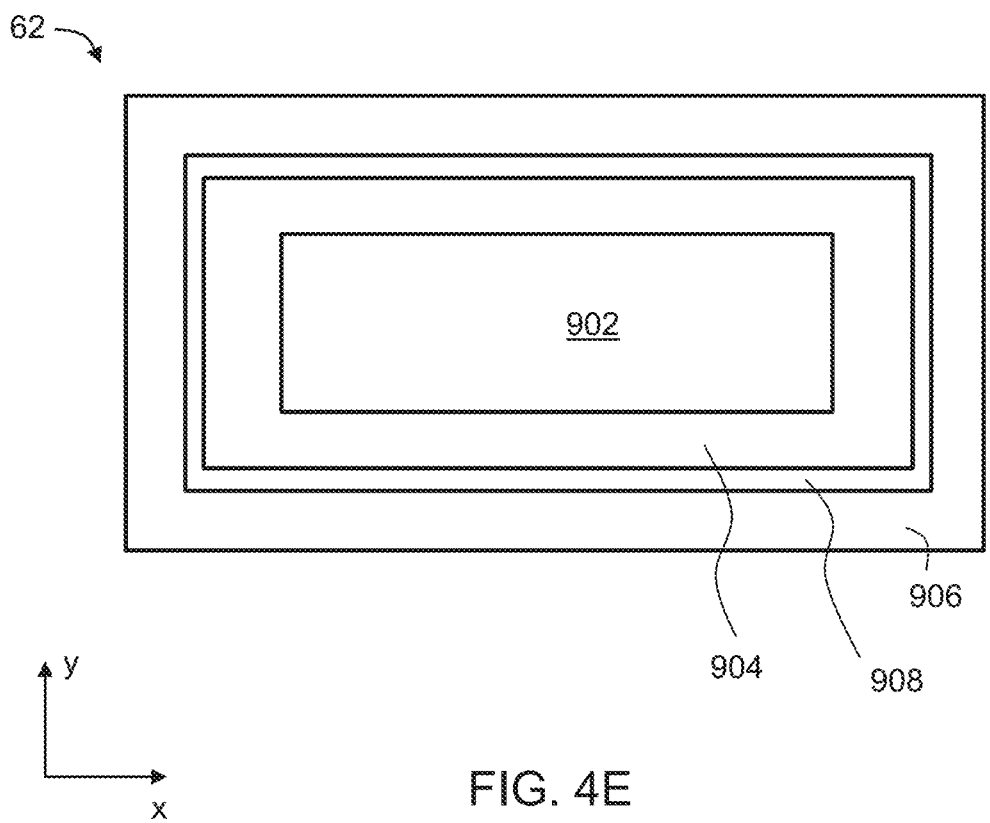

A representative example of a layer 62 suitable for some embodiments of the present invention is illustrated in FIG. 4E. In the schematic illustration of FIG. 4E, which is not to be considered as limiting, layer 62 has a core region 902, an inner envelope region 904, at least partially, more preferably completely, surrounding core region 902, and an outer envelope region 906, at least partially, more preferably completely, surrounding inner envelope region 904. Preferably, but not necessarily, outer envelope region 906 is the outermost region of layer 62.

Core region 902 preferably comprises a combination of at least two modeling formulations. The combination is optionally and preferably embodied in a voxelated manner wherein some voxels that form region 902 are made of one of the modeling martial formulations, other voxels are made of another one of the modeling martial formulations, and so on. In various exemplary embodiments of the invention core region 902 is made of a voxelated combination between the first modeling formulation and the second modeling formulation described below. The voxelated combination can be according to any distribution by which voxels occupied by the first formulation are interlaced within voxels occupied by the second formulation, such as, but not limited to, a random distribution.

The ratio between the number of voxels within region 902 that are occupied by the first modeling formulation and the number of voxels within region 902 that are occupied by the second modeling formulation is preferably from about 0.25 to about 0.45, or from about 0.25 to about 0.4, or from about 0.3 to about 0.4, e.g., about 0.33. In any embodiment of the invention, including any embodiment that includes these ratios, region 902 is optionally and preferably devoid of any material other than the first formulation and the second formulation described herein.

Further embodiments related to the ratio between the first modeling material formulation and the second modeling material formulation are provided hereinunder.

Inner envelope region 904 is preferably made of a single modeling formulation, for example, the first modeling formulation described below. Outer envelope region 906 is preferably made of a single modeling formulation, for example, the second modeling formulation described below.

The thickness of region 904, as measured within the plane of layer 62 and perpendicularly to the surface of structure 60, is preferably from about 0.1 mm to about 4 mm, or from about 0.1 mm to about 3.5 mm, or from about 0.1 mm to about 3 mm, or from about 0.1 mm to about 2.5 mm, or from about 0.1 mm to about 2 mm, or from about 0.2 mm to about 1.5 mm, or from about 0.3 mm to about 1.5 mm, or from about 0.4 mm to about 1.5 mm, or from about 0.4 mm to about 1.4 mm or from about 0.4 mm to about 1.3 mm or from about 0.4 mm to about 1.2 mm or from about 0.4 mm to about 1.1 mm. The thickness of region 906, as measured within the plane of layer 62 and perpendicularly to the surface of structure 60, is preferably from about from about 150 microns to about 600 microns, or from about from about 150 microns to about 550 microns, or from about from about 150 microns to about 500 microns, or from about from about 150 microns to about 450 microns, or from about from about 150 microns to about 400 microns, or from about from about 150 microns to about 350 microns or from about 180 microns to about 320 microns or from about 200 microns to about 300 microns or from about 220 microns to about 280 microns or from about 240 microns to about 260 microns.

In some embodiments of the present invention, layer 62 comprises an additional envelope region 908 between inner envelope region 904 and outer envelope region 906. Region 904 is preferably made of a combination, e.g., voxelated combination, of two or more modeling formulations. Typically, but not exclusively, region 904 is made of a voxelated combination including the modeling formulation making region 904 (the first modeling formulation in the above example) and the modeling formulation making region 906 (the second modeling formulation in the above example). It was found by the Inventors of the present invention that such configuration allows region 908 to serve as a stitching region that bonds region 906 to region 904.

The ratio between the number of voxels within region 908 that are occupied by the first modeling formulation and the number of voxels within region 902 that are occupied by the second modeling formulation is preferably from about 0.9 to about 1.1, e.g., about 1. In any embodiment of the invention, including any embodiment that includes these ratios, region 908 is optionally and preferably devoid of any material other than the first formulation and the second formulation described herein. The thickness of region 908, as measured within the plane of layer 62 and perpendicularly to the surface of structure 60, is preferably less than the thickness of region 904 and also less than the thickness of region 906. For example, the thickness of region 908 can be from about 70 microns to about 100 microns or from about 75 microns to about 95 microns or from about 80 microns to about 90 microns.

In some embodiments, one or more layers do not include a core region and comprise only envelope regions. These embodiments are particularly useful when the structure has one or more thin parts, wherein the layers forming those parts of the structure are preferably devoid of a core region. A representative example of such a structure is illustrated in FIG. 6, in which regions marked by dashed circles are devoid of core 902.

Figure 4F:
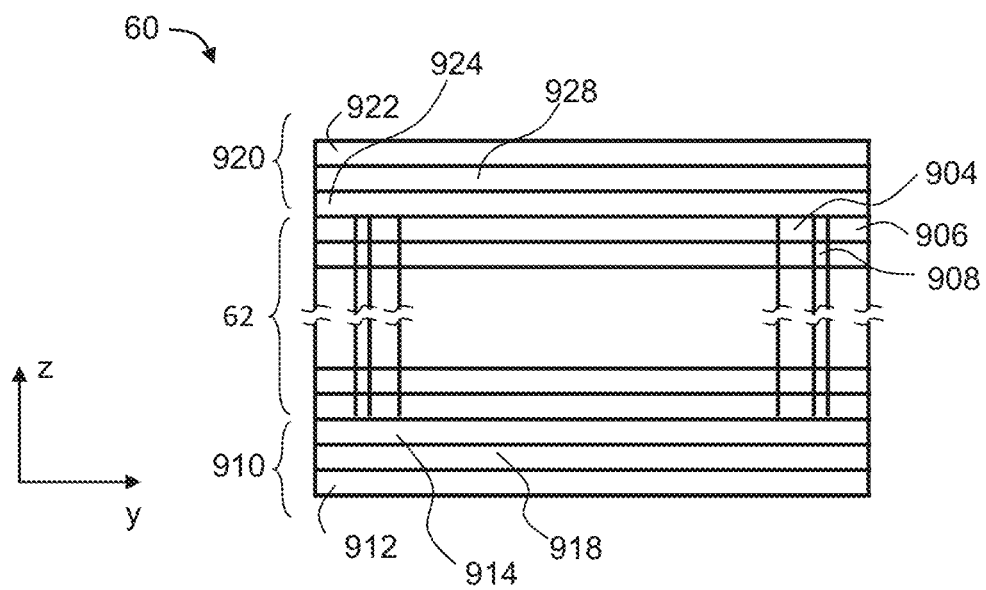

FIG. 4F is a schematic illustration of a side view of structure 60 in embodiments of the invention in which at least some of the layers 62 of structure 60 comprise core region 902, envelope regions 904 and 906 and optionally also an additional envelope region 908 between regions 904 and 906. In these embodiments structure 60 optionally and preferably comprises a base section 910 and/or a top section 920, each optionally and preferably comprises a plurality of layers.

The layers of sections 910 and 920 can be arranged such that one or more of the topmost layers 922 of top section 920 and one or more of the bottommost layers 912 of base section 910 are made of the same formulation at envelope region 906 described above. Alternatively, or more preferably additionally, the layers of sections 910 and 920 can be arranged such that one or more of the bottommost layers 924 of top section 920 and one or more of the topmost layers 914 of base section 910 are made of the same formulation at envelope region 904 described above. In some embodiments of the present invention at least one of base section 910 and top section 920 comprises one or more intermediate layers (respectively shown at 918, 928) that is made of the same or similar combination of formulations as region 908 described above.

For clarity of presentation, FIG. 4F shows a single layer for each of layers 912, 914, 918, 922, 924 and 928, however, this need not necessarily be the case, since, for some applications, at least one of these layers is embodied as a stack of layers. The number of layers in each stack is preferably selected such that the thickness, along the build direction (the z direction, in the present illustration) of the stack is a proximately the same as the thickness of the respective envelope region. Specifically, the number of layers in stacks 912 and 922 is preferably selected such that the overall thickness of these stacks along the build direction is approximately the same (e.g., within 10%) as the thickness of outer envelope region 906 as measured in the plane of layer 62 and perpendicularly to the surface of structure 60, the number of layers in stacks 914 and 924 is preferably selected such that the overall thickness of these stacks along the build direction is approximately the same (e.g., within 10%) as the thickness of inner envelope region 904 as measured in the plane of layer 62 and perpendicularly to the surface of structure 60, and the number of layers in stacks 918 and 928 is preferably selected such that the overall thickness of these stacks along the build direction is approximately the same (e.g., within 10%) as the thickness of additional envelope region 908 as measured in the plane of layer 62 and perpendicularly to the surface of structure 60.

The present inventors have devised a technique that further reduces the curling effect. In this technique, a structure, referred to herein as "a pedestal" is dispensed directly on the tray, and the layers that make up the object are thereafter dispensed on the pedestal. This embodiment is illustrated in FIGS. 5A-B.

Figure 5A:
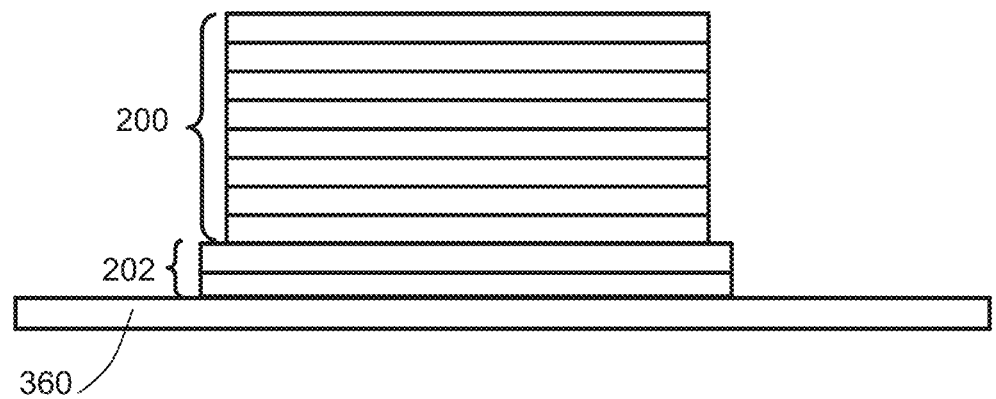
FIGS. 5A-B are schematic illustrations of an object formed on a pedestal, according to some embodiments of the present invention.
Figure 5B:
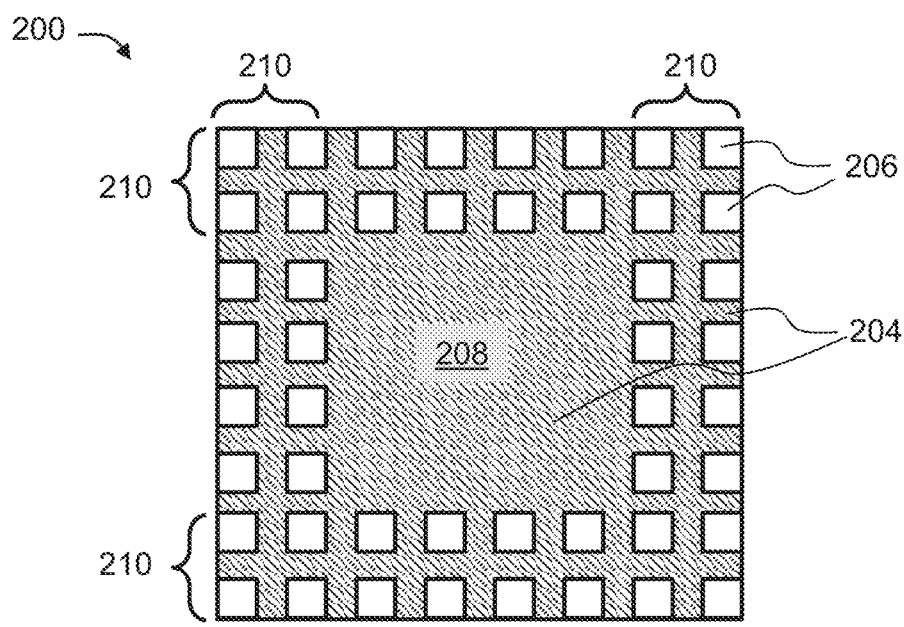

FIG. 5A shows a side view of a pedestal 202 on tray 360 wherein the layers of an object 200 are dispensed on pedestal 202. Object 200 can comprise, or be, a shelled structure (e.g., structure 60), made of the first and second modeling formulations as further detailed hereinabove. Alternatively, object 200 can be a non-shelled structure, or a shelled structure (e.g., structure 60), made of other modeling formulation, such as a commercially available modeling formulation.

Pedestal 202 optionally and preferably serves to ease the removal of object from the printing tray and thus may help prevent deformation by manual or mechanical damage. Pedestal 202 can also improve the object's accuracy in the Z direction (height), and/or may improve an object's accuracy in the X-Y directions.

Pedestal 202 preferably comprises a support formulation that includes a support material. Preferably the support formulation is soluble in liquid, e.g., in water. In various exemplary embodiments of the invention pedestal 202 comprises a combination of support formulation and modeling formulation (e.g., any of the first and second modeling formulations described herein). Preferably, the modeling formulation within pedestal 202 is of low Izod impact resistance, for example, less than 40 J/m. The advantage of this embodiment is that it reduces the tendency of the pedestal to lift from the tray.

Inaccuracies in Z may occur at the lowest layers of the printed object. This may be because the top surface of the tray at Z start level (the Z level of the tray when printing starts) may not be exactly at a height which enables the leveling device to reach and thus level the first layers deposited in the printing process, when the leveling device may be at its lowest point (e.g., because of inaccuracy in adjustments and/or incomplete flatness and horizon of the tray). As a result, the lower layers of object 200 may not be leveled by the leveling device and therefore their thickness may be greater than the designed layer thickness, therefore increasing the height of object 200 as printed in contrast to the object as designed. The use of pedestal 202 under the lowest point of the object solves this problem by specifying that the height at which the printing of the actual object starts may be the height at which the pedestal itself may be significantly leveled by the leveling device.

In various exemplary embodiments of the invention pedestal 202 has a core-shell structure, in which the shell comprises spaced pillars of modeling formulation with support formulation in-between, and the core comprises only soluble (e.g., water soluble) support formulation, and is devoid of any non-soluble modeling formulation. These embodiments are illustrated in FIG. 5B which is a top view illustration of a typical layer of pedestal 202, having a pedestal core (shown as a core region 208 in FIG. 5B) and pedestal shell (shown as an envelope region 210 in FIG. 5B). The support formulation is shown at 204 (patterned filling) and the modeling formulation pillars are shown at 206 (white filling).

The advantage of forming a pedestal with core-shell structure as defined above is that it solves the problems of Z inaccuracies and curling while minimizing the use of modeling formulation, which is typically more expensive, and tends to leave visible remnants at the bottom of object 200.

Figure 7:
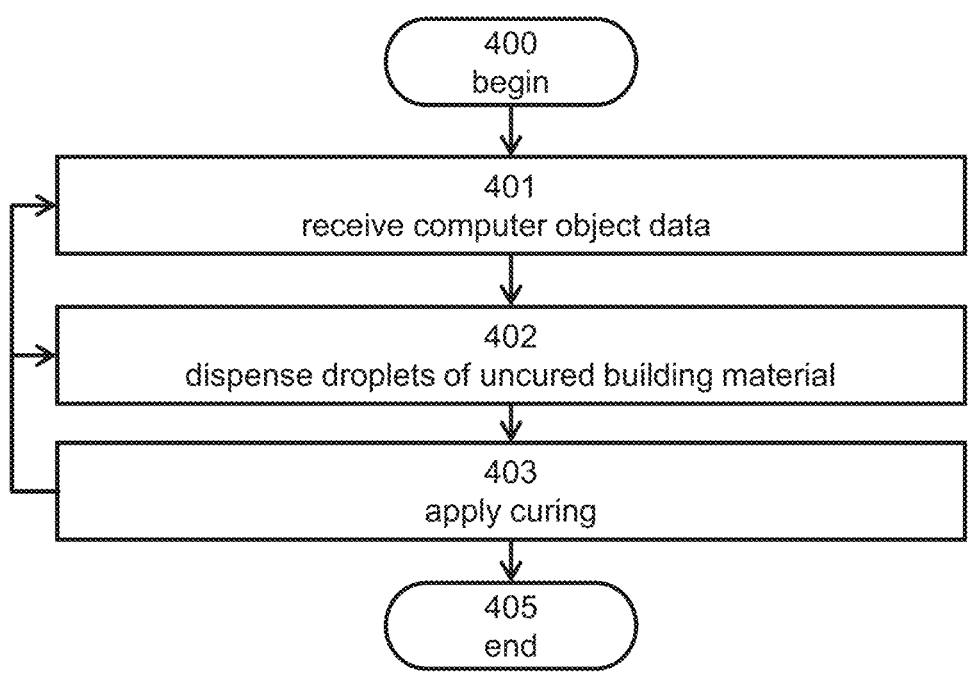
FIG. 7 is a flowchart diagram of a method suitable for AM of a three-dimensional object according to various exemplary embodiments of the present invention.

FIG. 7 is a flowchart diagram of a method suitable for AM of a three-dimensional object according to various exemplary embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method can be executed by an AM system (e.g., system 110 or system 10), preferably a 3D inkjet printing system, operated by a controller (e.g., controller 152 or 20). The method begins at 400 and optionally and preferably proceeds to 401 at which computer object data that collectively pertain to a three-dimensional shape of the object are received. The data can be received by a data processor (e.g., processor 154 or 24) operatively associated with the AM system. For example, the data processor can access a computer-readable storage medium (not shown) and retrieve the data from the medium. The data processor can also generate the data, or a portion thereof, instead of, or in addition to, retrieving data from the storage medium, for example, by means of a computer aided design (CAD) or computer aided manufacturing (CAM) software. The computer object data typically include a plurality of slice data each defining a layer of the object to be manufactured. The data processor can transfer the data, or a portion thereof, to the controller of the AM system. Typically, but not necessarily, the controller receives the data on a slice-by-slice basis.

The data can be in any data format known in the art, including, any of the aforementioned computer object data formats.

The method proceeds to 402 at which droplets of one or more modeling material formulation(s) are dispensed to form a layer in a configured pattern corresponding to a shape of a slice of the object. The modeling material formulation(s) are as described herein in any of the respective embodiments and any combination thereof.

The dispensing 402 is optionally and preferably executed without heating the dispensing heads, the fabrication chamber and the dispensed formulation. In various exemplary embodiments of the invention the dispensing 402 is executed at a temperature that is no more than 45° C., or no more than 40° C. or no more than 35° C. When the dispensing head includes a heating device or is fed via a building material reservoir which includes a heating device, the heating device is optionally and preferably switched off during the dispensing.

At 403 curing radiation is applied to the newly formed layer, preferably using a radiation source (e.g., device 324 or 18).

From operation 403 the method optionally and preferably loops back to 401 to receive data for another slice. When the data for the next slice is already stored within the controller, the method can loop back to 402 for form the next layer. Once an object formed of a plurality of layers is fabricated, the method ends at 405.

In some of any of the embodiments of the present invention, once the layers are dispensed as described herein, exposure to curing condition (e.g., curing energy) as described herein is effected. In some embodiments, the curable materials are UV-curable materials and the curing condition is such that a radiation source emits UV radiation.

In some embodiments, where the building material comprises also support material formulation(s), the method proceeds to removing the hardened support material (e.g., thereby exposing the adjacent hardened modeling material). This can be performed by mechanical and/or chemical means, as would be recognized by any person skilled in the art. A portion of the support material may optionally remain upon removal, for example, within a hardened mixed layer, as described herein.

In some embodiments, removal of hardened support material reveals a hardened mixed layer, comprising a hardened mixture of support material and modeling material formulation. Such a hardened mixture at a surface of an object may optionally have a relatively non-reflective appearance, also referred to herein as "matte"; whereas surfaces lacking such a hardened mixture (e.g., wherein support material formulation was not applied thereon) are described as "glossy" in comparison.

In some of any of the embodiments described herein, the method further comprises exposing the cured modeling material, either before or after removal of a support material, if such has been included in the building material, to a post-treatment condition. The post-treatment condition is typically aimed at further hardening the cured modeling material. In some embodiments, the post-treatment hardens a partially-cured material to thereby obtain a completely cured material.

In some embodiments, the post-treatment is effected by exposure to heat or radiation, as described in any of the respective embodiments herein. In some embodiments, when the condition is heat (thermal post-treatment), the post-treatment can be effected for a time period that ranges from a few minutes (e.g., 10 minutes) to a few hours (e.g., 1-24 hours).

In some embodiments, the thermal post-treatment comprises exposing the object to heat of at least 100° C. for at least one hour.

It is expected that during the life of a patent maturing from this application many relevant curable materials will be developed and the scope of each of curable materials described herein is intended to include all such new technologies a priori.

As used herein the term "about" refers to ±10% or ±5%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" or "process" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

Herein throughout, the term "(meth)acrylic" encompasses acrylic and methacrylic compounds.

Herein throughout, the phrase "linking moiety" or "linking group" describes a group that connects two or more moieties or groups in a compound. A linking moiety is typically derived from a bi- or tri-functional compound, and can be regarded as a bi- or tri-radical moiety, which is connected to two or three other moieties, via two or three atoms thereof, respectively.

Exemplary linking moieties include a hydrocarbon moiety or chain, optionally interrupted by one or more heteroatoms, as defined herein, and/or any of the chemical groups listed below, when defined as linking groups.

When a chemical group is referred to herein as "end group" it is to be interpreted as a substituent, which is connected to another group via one atom thereof.

Herein throughout, the term "hydrocarbon" collectively describes a chemical group composed mainly of carbon and hydrogen atoms. A hydrocarbon can be comprised of alkyl, alkene, alkyne, aryl, and/or cycloalkyl, each can be substituted or unsubstituted, and can be interrupted by one or more heteroatoms. The number of carbon atoms can range from 2 to 20, and is preferably lower, e.g., from 1 to 10, or from 1 to 6, or from 1 to 4. A hydrocarbon can be a linking group or an end group.

Bisphenol A is an example of a hydrocarbon comprised of 2 aryl groups and one alkyl group.

As used herein, the term "amine" describes both a —NR'R" group and a —NR'— group, wherein R' and R" are each independently hydrogen, alkyl, cycloalkyl, aryl, as these terms are defined hereinbelow.

The amine group can therefore be a primary amine, where both R' and R" are hydrogen, a secondary amine, where R' is hydrogen and R" is alkyl, cycloalkyl or aryl, or a tertiary amine, where each of R' and R" is independently alkyl, cycloalkyl or aryl.

Alternatively, R' and R" can each independently be hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, carbonyl, C-carboxylate, O-carboxylate, N-thiocarbamate, 0-thiocarbamate, urea, thiourea, N-carbamate, O-carbamate, C-amide, N-amide, guanyl, guanidine and hydrazine.

The term "amine" is used herein to describe a —NR'R" group in cases where the amine is an end group, as defined hereinunder, and is used herein to describe a —NR'— group in cases where the amine is a linking group or is or part of a linking moiety.

The term "alkyl" describes a saturated aliphatic hydrocarbon including straight chain and branched chain groups. Preferably, the alkyl group has 1 to 30, or 1 to 20 carbon atoms. Whenever a numerical range; e.g., "1-20", is stated herein, it implies that the group, in this case the alkyl group, may contain 1 carbon atom, 2 carbon atoms, 3 carbon atoms, etc., up to and including 20 carbon atoms. The alkyl group may be substituted or unsubstituted. Substituted alkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine.

The alkyl group can be an end group, as this phrase is defined hereinabove, wherein it is attached to a single adjacent atom, or a linking group, as this phrase is defined hereinabove, which connects two or more moieties via at least two carbons in its chain. When the alkyl is a linking group, it is also referred to herein as "alkylene" or "alkylene chain".

Herein, a C(1-4) alkyl, substituted by a hydrophilic group, as defined herein, is included under the phrase "hydrophilic group" herein.

Alkene and Alkyne, as used herein, are an alkyl, as defined herein, which contains one or more double bond or triple bond, respectively.

The term "cycloalkyl" describes an all-carbon monocyclic ring or fused rings (i.e., rings which share an adjacent pair of carbon atoms) group where one or more of the rings does not have a completely conjugated pi-electron system. Examples include, without limitation, cyclohexane, adamantine, norbornyl, isobornyl, and the like. The cycloalkyl group may be substituted or unsubstituted. Substituted cycloalkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The cycloalkyl group can be an end group, as this phrase is defined hereinabove, wherein it is attached to a single adjacent atom, or a linking group, as this phrase is defined hereinabove, connecting two or more moieties at two or more positions thereof.

Cycloalkyls of 1-6 carbon atoms, substituted by two or more hydrophilic groups, as defined herein, is included under the phrase "hydrophilic group" herein.

The term "heteroalicyclic" describes a monocyclic or fused ring group having in the ring(s) one or more atoms such as nitrogen, oxygen and sulfur. The rings may also have one or more double bonds. However, the rings do not have a completely conjugated pi-electron system. Representative examples are piperidine, piperazine, tetrahydrofurane, tetrahydropyrane, morpholino, oxalidine, and the like.

The heteroalicyclic may be substituted or unsubstituted. Substituted heteroalicyclic may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroalicyclic group can be an end group, as this phrase is defined hereinabove, where it is attached to a single adjacent atom, or a linking group, as this phrase is defined hereinabove, connecting two or more moieties at two or more positions thereof.

A heteroalicyclic group which includes one or more of electron-donating atoms such as nitrogen and oxygen, and in which a numeral ratio of carbon atoms to heteroatoms is 5:1 or lower, is included under the phrase "hydrophilic group" herein.

The term "aryl" describes an all-carbon monocyclic or fused-ring polycyclic (i.e., rings which share adjacent pairs of carbon atoms) groups having a completely conjugated pi-electron system. The aryl group may be substituted or unsubstituted. Substituted aryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The aryl group can be an end group, as this term is defined hereinabove, wherein it is attached to a single adjacent atom, or a linking group, as this term is defined hereinabove, connecting two or more moieties at two or more positions thereof.

The term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Examples, without limitation, of heteroaryl groups include pyrrole, furan, thiophene, imidazole, oxazole, thiazole, pyrazole, pyridine, pyrimidine, quinoline, isoquinoline and purine. The heteroaryl group may be substituted or unsubstituted. Substituted heteroaryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroaryl group can be an end group, as this phrase is defined hereinabove, where it is attached to a single adjacent atom, or a linking group, as this phrase is defined hereinabove, connecting two or more moieties at two or more positions thereof. Representative examples are pyridine, pyrrole, oxazole, indole, purine and the like.

The term "halide" and "halo" describes fluorine, chlorine, bromine or iodine.

The term "haloalkyl" describes an alkyl group as defined above, further substituted by one or more halide.

The term "sulfate" describes a —O—S($=$O)$_2$—OR' end group, as this term is defined hereinabove, or an —O—S($=$O)$_2$—O— linking group, as these phrases are defined hereinabove, where R' is as defined hereinabove.

The term "thiosulfate" describes a —O—S($=$S)($=$O)—OR' end group or a —O—S($=$S)($=$O)—O— linking group, as these phrases are defined hereinabove, where R' is as defined hereinabove.

The term "sulfite" describes an —O—S($=$O)—O—R' end group or a —O—S($=$O)—O— group linking group, as these phrases are defined hereinabove, where R' is as defined hereinabove.

The term "thiosulfite" describes a —O—S($=$S)—O—R' end group or an —O—S($=$S)—O— group linking group, as these phrases are defined hereinabove, where R' is as defined hereinabove.

The term "sulfinate" describes a —S($=$O)—OR' end group or an —S($=$O)—O— group linking group, as these phrases are defined hereinabove, where R' is as defined hereinabove.

The term "sulfoxide" or "sulfinyl" describes a —S($=$O)R' end group or an —S($=$O)— linking group, as these phrases are defined hereinabove, where R' is as defined hereinabove.

The term "sulfonate" describes a —S($=$O)$_2$—R' end group or an —S($=$O)$_2$— linking group, as these phrases are defined hereinabove, where R' is as defined herein.

The term "S-sulfonamide" describes a —S($=$O)$_2$—NR'R'' end group or a —S($=$O)$_2$—NR'— linking group, as these phrases are defined hereinabove, with R' and R'' as defined herein.

The term "N-sulfonamide" describes an R'S($=$O)$_2$—NR''— end group or a —S($=$O)$_2$—NR'— linking group, as these phrases are defined hereinabove, where R' and R'' are as defined herein.

The term "disulfide" refers to a —S—SR' end group or a —S—S— linking group, as these phrases are defined hereinabove, where R' is as defined herein.

The term "phosphonate" describes a —P($=$O)(OR')(OR'') end group or a —P($=$O)(OR')(O)— linking group, as these phrases are defined hereinabove, with R' and R'' as defined herein.

The term "thiophosphonate" describes a —P($=$S)(OR')(OR'') end group or a —P($=$S)(OR')(O)— linking group, as these phrases are defined hereinabove, with R' and R'' as defined herein.

The term "phosphinyl" describes a —PR'R'' end group or a —PR'— linking group, as these phrases are defined hereinabove, with R' and R'' as defined hereinabove.

The term "phosphine oxide" describes a —P($=$O)(R')(R'') end group or a —P($=$O)(R')— linking group, as these phrases are defined hereinabove, with R' and R'' as defined herein.

The term "phosphine sulfide" describes a —P($=$S)(R')(R'') end group or a —P($=$S)(R')— linking group, as these phrases are defined hereinabove, with R' and R'' as defined herein.

The term "phosphite" describes an —O—PR'($=$O)(OR'') end group or an —O—PH($=$O)(O)— linking group, as these phrases are defined hereinabove, with R' and R'' as defined herein.

The term "carbonyl" or "carbonate" as used herein, describes a —C($=$O)—R' end group or a —C($=$O)— linking group, as these phrases are defined hereinabove, with R' as defined herein.

The term "thiocarbonyl" as used herein, describes a —C($=$S)—R' end group or a —C($=$S)— linking group, as these phrases are defined hereinabove, with R' as defined herein.

The term "oxo" as used herein, describes a ($=$O) group, wherein an oxygen atom is linked by a double bond to the atom (e.g., carbon atom) at the indicated position.

The term "thiooxo" as used herein, describes a ($=$S) group, wherein a sulfur atom is linked by a double bond to the atom (e.g., carbon atom) at the indicated position.

The term "oxime" describes a=N—OH end group or a=N—O— linking group, as these phrases are defined hereinabove.

The term "hydroxyl" describes a —OH group.

The term "alkoxy" describes both an —O-alkyl and an —O-cycloalkyl group, as defined herein.

The term "aryloxy" describes both an —O-aryl and an —O-heteroaryl group, as defined herein.

The term "thiohydroxy" describes a —SH group.

The term "thioalkoxy" describes both a —S-alkyl group, and a —S-cycloalkyl group, as defined herein.

The term "thioaryloxy" describes both a —S-aryl and a —S-heteroaryl group, as defined herein.

The "hydroxyalkyl" is also referred to herein as "alcohol", and describes an alkyl, as defined herein, substituted by a hydroxy group.

The term "cyano" describes a —C≡N group.

The term "isocyanate" describes an —N=C=O group.

The term "isothiocyanate" describes an —N=C=S group.

The term "nitro" describes an —NO$_2$ group.

The term "acyl halide" describes a —(C=O)R"" group wherein R"" is halide, as defined hereinabove.

The term "azo" or "diazo" describes an —N=NR' end group or an —N=N— linking group, as these phrases are defined hereinabove, with R' as defined hereinabove.

The term "peroxo" describes an —O—OR' end group or an —O—O— linking group, as these phrases are defined hereinabove, with R' as defined hereinabove.

The term "carboxylate" as used herein encompasses C-carboxylate and O-carboxylate.

The term "C-carboxylate" describes a —C(=O)—OR' end group or a —C(=O)—O— linking group, as these phrases are defined hereinabove, where R' is as defined herein.

The term "O-carboxylate" describes a —OC(=O)R' end group or a —OC(=O)— linking group, as these phrases are defined hereinabove, where R' is as defined herein.

A carboxylate can be linear or cyclic. When cyclic, R' and the carbon atom are linked together to form a ring, in C-carboxylate, and this group is also referred to as lactone. Alternatively, R' and O are linked together to form a ring in O-carboxylate. Cyclic carboxylates can function as a linking group, for example, when an atom in the formed ring is linked to another group.

The term "thiocarboxylate" as used herein encompasses C-thiocarboxylate and O-thiocarboxylate.

The term "C-thiocarboxylate" describes a —C(=S)—OR' end group or a —C(=S)—O— linking group, as these phrases are defined hereinabove, where R' is as defined herein.

The term "O-thiocarboxylate" describes a —OC(=S)R' end group or a —OC(=S)— linking group, as these phrases are defined hereinabove, where R' is as defined herein.

A thiocarboxylate can be linear or cyclic. When cyclic, R' and the carbon atom are linked together to form a ring, in C-thiocarboxylate, and this group is also referred to as thiolactone. Alternatively, R' and O are linked together to form a ring in O-thiocarboxylate. Cyclic thiocarboxylates can function as a linking group, for example, when an atom in the formed ring is linked to another group.

The term "carbamate" as used herein encompasses N-carbamate and O-carbamate.

The term "N-carbamate" describes an R"OC(=O)—NR'— end group or a —OC(=O)—NR'— linking group, as these phrases are defined hereinabove, with R' and R" as defined herein.

The term "O-carbamate" describes an —OC(=O)—NR'R" end group or an —OC(=O)—NR'-linking group, as these phrases are defined hereinabove, with R' and R" as defined herein.

A carbamate can be linear or cyclic. When cyclic, R' and the carbon atom are linked together to form a ring, in O-carbamate. Alternatively, R' and O are linked together to form a ring in N-carbamate. Cyclic carbamates can function as a linking group, for example, when an atom in the formed ring is linked to another group.

The term "carbamate" as used herein encompasses N-carbamate and O-carbamate.

The term "thiocarbamate" as used herein encompasses N-thiocarbamate and O-thiocarbamate.

The term "O-thiocarbamate" describes a —OC(=S)—NR'R" end group or a —OC(=S)—NR'-linking group, as these phrases are defined hereinabove, with R' and R" as defined herein.

The term "N-thiocarbamate" describes an R"OC(=S)NR'— end group or a —OC(=S)NR'-linking group, as these phrases are defined hereinabove, with R' and R" as defined herein.

Thiocarbamates can be linear or cyclic, as described herein for carbamates.

The term "dithiocarbamate" as used herein encompasses S-dithiocarbamate and N-dithiocarbamate.

The term "S-dithiocarbamate" describes a —SC(=S)—NR'R" end group or a —SC(=S)NR'-linking group, as these phrases are defined hereinabove, with R' and R" as defined herein.

The term "N-dithiocarbamate" describes an R"SC(=S)NR'— end group or a —SC(=S)NR'-linking group, as these phrases are defined hereinabove, with R' and R" as defined herein.

The term "urea", which is also referred to herein as "ureido", describes a —NR'C(=O)—NR"R'" end group or a —NR'C(=O)—NR"— linking group, as these phrases are defined hereinabove, where R' and R" are as defined herein and R'" is as defined herein for R' and R".

The term "thiourea", which is also referred to herein as "thioureido", describes a —NR'—C(=S)—NR"R'" end group or a —NR'—C(=S)—NR"— linking group, with R', R" and R'" as defined herein.

The term "amide" as used herein encompasses C-amide and N-amide.

The term "C-amide" describes a —C(=O)—NR'R" end group or a —C(=O)—NR'— linking group, as these phrases are defined hereinabove, where R' and R" are as defined herein.

The term "N-amide" describes a R'C(=O)—NR"— end group or a R'C(=O)—N— linking group, as these phrases are defined hereinabove, where R' and R" are as defined herein.

An amide can be linear or cyclic. When cyclic, R' and the carbon atom are linked together to form a ring, in C-amide, and this group is also referred to as lactam. Cyclic amides can function as a linking group, for example, when an atom in the formed ring is linked to another group.

The term "guanyl" describes a R'R"NC(=N)— end group or a —R'NC(=N)— linking group, as these phrases are defined hereinabove, where R' and R" are as defined herein.

The term "guanidine" describes a —R'NC(=N)—NR"R'" end group or a —R'NC(=N)—NR"— linking group, as these phrases are defined hereinabove, where R', R" and R'" are as defined herein.

The term "hydrazine" describes a —NR'—NR"R'" end group or a —NR'—NR"— linking group, as these phrases are defined hereinabove, with R', R", and R'" as defined herein.

As used herein, the term "hydrazide" describes a —C(=O)—NR'—NR"R'" end group or a —C(=O)—NR'—NR"— linking group, as these phrases are defined hereinabove, where R', R" and R'" are as defined herein.

As used herein, the term "thiohydrazide" describes a —C(=S)—NR'—NR"R'" end group or a —C(=S)—NR'—NR"— linking group, as these phrases are defined hereinabove, where R', R" and R'" are as defined herein.

As used herein, the term "alkylene glycol" describes a —O—[(CR'R")$_z$—O]$_y$R'" end group or a —O—[(CR'R")$_z$—O]$_y$— linking group, with R', R" and R'" being as defined herein, and with z being an integer of from 1 to 10, preferably, from 2 to 6, more preferably 2 or 3, and y being an integer of 1 or more. Preferably R' and R" are both hydrogen. When z is 2 and y is 1, this group is ethylene glycol. When z is 3 and y is 1, this group is propylene glycol. When y is 2-4, the alkylene glycol is referred to herein as oligo(alkylene glycol).

When y is greater than 4, the alkylene glycol is referred to herein as poly(alkylene glycol). In some embodiments of the present invention, a poly(alkylene glycol) group or moiety can have from 10 to 200 repeating alkylene glycol units, such that z is 10 to 200, preferably 10-100, more preferably 10-50.

The term "silanol" describes a —Si(OH)R'R" group, or —Si(OH)$_2$R' group or —Si(OH)$_3$ group, with R' and R" as described herein.

The term "silyl" describes a —SiR'R"R'" group, with R', R" and R'" as described herein.

As used herein, the term "urethane" or "urethane moiety" or "urethane group" describes a Rx-O—C(=O)—NR'R" end group or a —Rx-O—C(=O)—NR'— linking group, with R' and R" being as defined herein, and Rx being an alkyl, cycloalkyl, aryl, alkylene glycol or any combination thereof. Preferably R' and R" are both hydrogen.

The term "polyurethane" or "oligourethane" describes a moiety that comprises at least one urethane group as described herein in the repeating backbone units thereof, or at least one urethane bond, —O—C(=O)—NR'—, in the repeating backbone units thereof.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Materials and Experimental Methods

Molds were prepared by pouring a volume of a mixed formulation in a silicon mold (e.g., a rectangular shape of 127×13×3 mm for "HDT" mold, and of 64×12.7×3.2 for "Impact" molds), and the molds were subjected to UV irradiation for a time period of 2-5 hours, to assure complete reaction. The source is a UV oven equipped with 10 UV lamps (Philips TL-K 40W actinic BL reflector).

3D inkjet printing of non-shelled object was performed using either an Objet30™, an Objet Eden260VS™, or a J750™ printing systems (Stratasys Ltd., Israel), in either single mode or DM mode, at jetting temperatures that do not exceed 40-42° C.

3D Inkjet printing of shelled objects was performed with the aforementioned printing systems, in a DM mode (e.g., a DM mode referred to as DM 5160 or 5130), according to the method described in U.S. Patent Application having Publication No. 2013/0040091. Generally, all printed objects were comprised of a core made of the first formulation (RF, Part A) and the second formulation (DLM, Part B), at a ratio as indicated, and one or more shells, wherein, optionally, one shell comprises the first formulation, and optionally, another shell comprises the second formulation, unless otherwise indicated.

Viscosity was measured on Brookfield viscometer at 25-45° C.

HDT measurements were performed on Ceast vicat/HDT instrument according to ASTM D-648-06.

Elastic Modulus (Modulus of Elasticity) was determined from the Strength-Strain curves, in accordance with ASTM D412.

Tensile Strength was determined in accordance with ASTM D412.

Z tensile strength was determined in accordance with ASTM D412 upon printing in the Z direction.

Elongation was determined in accordance with ASTM D412.

Z Elongation was determined in accordance with ASTM D412 upon printing in the Z direction.

Tear Resistance (TR) was determined in accordance with ASTM D 624.

O-ring Tear test was performed as described in WO 2017/208238, and measures the time until a tested objected is broken. Load, Stress and Strain percentage at maximum load were determined in accordance with ASTM D624.

Izod Notch Impact was determined in accordance with ASTM D-256-06.

Print deformations (curling) were quantitatively assessed using a 230×10×10 mm printed bar. Upon printing, the bar was left within the printing system, in a closed cabinet, for 1 hour, and was thereafter stored at room temperature for 24 hours. The bar was then placed on a flat plane (flat table) and curling was measured by putting weight on one side of the bar and measuring the height of the bar edge from the plane in mm. For this study an elevation of 4 mm or less was considered as acceptable for most mainstream applications.

All reagents and materials composing the tested formulations were obtained from known vendors.

Example 1

Modeling Material Formulations Design

The present inventors have conducted extensive studies, during a few years, in a search for modeling material formulations that can be used in 3D inkjet printing methodologies at jetting temperatures that do not exceed 40° C., and preferably do not exceed 35° C.

As discussed herein, currently available formulations feature a viscosity that meets the requirements of 3D inkjet printing systems, that is, a viscosity in the range of from 8 cPs to about 30 cPs, only at elevated temperatures of at least 50° C., usually in the range of 50–90° C., typically at 70° C.

The present inventors have studied the effect of numerous modifications of formulations currently used in 3D inkjet printing on the formulation's viscosity at low temperatures and on the formulation's stability and the mechanical properties of the hardened material formed of the formulation, and have designed, based on these studies, modeling material formulations that feature the required viscosity at the target low temperatures.

Modeling material formulations featuring a viscosity of up to 50 cPs, typically up to 20 cPs, at 20-35° C., which provide hardened materials that feature variable thermal and mechanical properties that are suitable for use in 3D inkjet printing of non-shelled objects in, for example, single jetting mode, and/or in PolyJet technology, for example, in DM mode; and of shelled objects, for example, in D-ABS mode, as described hereinabove, were designed.

The present inventors have uncovered that stable modeling material formulation which feature the required viscosity at the required temperature should include a mixture of curable materials, which can be mono-functional, multi-functional or a combination thereof, wherein the average molecular weight of all the curable materials should be no more than 500 grams/mol.

As is exemplified in the following examples, the curable materials composing the modeling material formulations of the present embodiments can include hydrophobic and/or hydrophilic curable materials, water soluble or miscible and/or water non-soluble or immiscible curable materials, and each of the above curable materials can be such that, when hardened, provides a material that features high, moderate or low Tg, as defined herein. The curable materials can include, as an alternative, or in addition, to the above-described materials, elastomeric curable materials, and/or curable materials that are characterized by relatively low viscosity at room temperature (e.g., of less than 15 centipoises or less than 10 centipoises), which are referred to herein also as "reactive diluents".

The modeling material formulations of the present embodiments typically include at least 90%, or at least 95%, or at least 98%, by weight, of curable materials, and can optionally include non-curable materials which can include non-reactive diluents, surfactants, pigments, impact modifiers, and catalyst and/or inhibitors of the reactions involved in the curing process, as described herein.

Example 2

Modeling Material Formulation Providing, when Hardened, Non-Elastomeric (Rigid) Materials Table 1 below presents exemplary chemical compositions of modeling material formulations suitable for use in 3D inkjet printing of non-elastomeric (rigid) materials in, for example, single jetting and PolyJet technologies, including DM mode, and in D-ABS mode, for printing shelled objects, as both Part A formulation (RF) and part B formulation (DLM).

As described in detail in U.S. Patent Application having Publication No. 2013/0040091 and in PCT/IB2017/055696, by the present assignee, manufacturing of shelled objects is performed using two formulations: a first formulation, Part A, referred to also as RF (reinforcer); and a second formulation, Part B, referred to also as DLM.

Preferably, the first formulation (Part A, RF) provides, when hardened, a rigid material characterized by high HDT (e.g., higher than 70° C., or higher than 90° C.), and the second formulation (Part B, DLM) provides, when hardened, a material which is less rigid than the material obtained from a hardened first formulation (RF), and which is characterized by high toughness (e.g., Izod notch Impact higher than 30 J/mol, or higher of 35 J/mol, for example, of about 30-100 J/m), and HDT lower than the first hardened formulation RF (e.g., HDT of about 40-41° C.).

In Table 1, whenever there is no particular reference to the printing mode, the indicated concentrations are representative for all modes.

TABLE 1

| Component | Exemplary Materials | Percentage (%) |
|---|---|---|
| Hydrophobic curable (meth)acrylic material, characterized, when hardened, by Tg > 50° C. | IBOA (monofunctional) (Isobornyl acrylate; CAS: 5888-33-5) (Tg = 95° C.) IBOMA (monofunctional) (Isobornyl methacrylate; CAS: 7534-94-3; SR 423D) (Tg = 175° C.) SR 833S (difunctional) (Tricyclodecanedimethanol Diacrylate; CAS: 42594-17-2) (Tg = 185° C.) | Total: 25-60 Monofunctional: 30-55 Multifunctional: 0-25 For Single and PolyJet Total: 50-60 Monofunctional: 30-60 Multifunctional: 0-25 For RF Total: 50-60 Monofunctional: 25-40 Multifunctional: 15-30 For DLM Total: 30-45 Monofunctional: 25-40 Multifunctional: 0-25 |
| Hydrophilic curable (meth)acrylic material, characterized, when hardened, by Tg > 50° C. | ACMO (Monofunctional) (Acryloyl Morpholine; CAS: 5117-12-4) (Tg = 145° C.) SR368 (Trifunctional) (Tris(2-Hydroxy Ethyl)Isocyanurate Triacrylate; CAS: 40220-08-4) (Tg = 272° C.) | Total: 15-35 Monofunctional: 15-30 Multifunctional: 0-5 For Single and PolyJet Total: 15-30 Monofunctional: 15-25 Multifunctional: 0-5 For RF Total: 25-35 Monofunctional: 20-35 Multifunctional: 0-5 For DLM Total: 25-35 Monofunctional: 20-35 Multifunctional: 0-5 |

TABLE 1-continued

| Component | Exemplary Materials | Percentage (%) |
|---|---|---|
| Hydrophobic (meth)acrylic flexible material, characterized, when hardened, by Tg < 25° C. | SR531 (Monofunctional) (Cyclic Trimethylopropane Formal Acrylate) CN131B (Monofunctional) (2-Hydroxy-3-phenoxypropyl prop-2-enoate) CN991 (Difunctional) (Aliphatic urethane diacrylate) | Total: 0-15 Monofunctional: 0-5 Multifunctional: 0-10 For Single and PolyJet Total: 0-15 Monofunctional: 0-5 Multifunctional: 5-15 For RF Total: 0-15 Monofunctional: 0-5 Multifunctional: 0-15 For DLM Total: 0-5 Monofunctional: 0-5 Multifunctional: 0-5 |
| Hydrophilic (meth)acrylic flexible material, characterized, when hardened, by Tg < 25° C. | SR 9036 (difunctional) (Ethoxylated (30) bisphenol A dimethacrylate; CAS: 41637-38-1) (Tg = −43° C.) SR415 (trifunctional) (Ethoxylated (20) Trimethylol propane triacrylate; CAS: 28961-43-5) (Tg = −40° C.) SR 9035 (Ethoxylated (15) Trimethylol propane triacrylate (Tg = −30° C.) | Total: 0-30 Difunctional: 0-5 Trifunctional: 0-30 For Single and PolyJet Total: 1-10 difunctional: 1-10 trifunctional: 0-5 For RF Total: 0-5 difunctional: 0-5 trifunctional: 0-5 For DLM Total: 10-30 difunctional: 0-5 trifunctional: 10-30 |
| Hydrophilic curable (meth)acrylic material, characterized, when hardened, by 80° C. > Tg > 25° C. | AgiSyn 1030 (difunctional) (Exo-1,7,7-trimethylbicyclo [2.2.1]hept-2-yl acrylate) (Tg = 60° C.) Photomer ® 6019 (Trifunctional) (Aliphatic urethane triacrylate) (Tg = 51° C.) | Total: 0-15 |
| Total hydrophilic curable materials | | 20-60 |
| Total hydrophobic curable materials | | 35-75 |
| Reactive diluent | DVE3 (Difunctional) (Triethyleneglycol divinyl ether) DVE2 (Difunctional) (Diethyleneglycol divinyl ether) | 0-10 (e.g., 0-7) |
| Photoinitiator | BAPO type (Bis Acyl Phosphine Oxide) Alpha Hydroxy ketone MAPO (Monoacylphosphine oxides) | 1-3 (e.g., 1-2) |
| Surfactant/Dispersant | BYK Type (PDMS derivatives) | 0-1 |
| Inhibitor | MEHQ Genorad Type | 0.01-1 |
| Inorganic/Organic Pigment | Nano scale Titanium Oxide Nano scale Zirconium Oxide Nano Silica Nano scale Carbon black | 0-2 |

Table 2 below presents the thermal and mechanical properties of printed objects formed of the exemplary modeling material formulations as presented in Table 1 above, denoted as M-33 (suitable for Single and PolyJet modes), DLM 13 (suitable as DLM formulation in D-ABS mode) and RF-13 (suitable as RF formulation in D-ABS mode), compared with objects formed of exemplary formulations currently used in Single Jetting, PolyJet and DM modes (VeroClear), and as DLM formulation (RGD515 Plus) and RF formulation (RGD531) in D-ABS mode. Objects having a rectangular shape with dimensions 127×13×3 mm were printed for HDT tests, and objects with dimensions 64×12.7×3.2 were printed for Impact tests as described herein.

Table 2 further presents the rheological properties (viscosity and surface tension) of the respective formulations.

TABLE 2

| | Vero Clear | RGD 515 Plus (DLM) | RGD 531 (RF) | M-33 | DLM 13 | RF 13 |
|---|---|---|---|---|---|---|
| HDT [° C.] | about 53 | about 40 | about 77 | about 53 | about 40 | about 78 |
| Izod Notched Impact [J/m] | 30-52 | 50-60 | 16-21 | 21-28 | 85-105 | 27-38 |

TABLE 2-continued

| | Vero Clear | RGD 515 Plus (DLM) | RGD 531 (RF) | M-33 | DLM 13 | RF 13 |
|---|---|---|---|---|---|---|
| Flexural modulus | about 2400 | about 1350 | about 2700 | about 2000 | about 800 | about 2500 |
| Water absorption [%] | 1.5 | 4.35 | | 1.23 | 13.91 | |
| Surface Tension [mN/m] with surfactant | 30 | 29 | 29.5 | — | — | — |
| Viscosity at 35° C./10 RPM | 15 [75° C.] | 62.3 [35° C.] 14.4 [75° C.] | 79 [35° C.] 14 [75° C.] | 14 | 14.6 | 14.7 |
| Surface Tension [mN/m] w/o surfactant | — | 37.5 | 39 | 31.6 | 33.5 | 35 |

As can be seen in Table 2, while the thermal (e.g., HDT) and mechanical properties of the formulations are similar to those of currently used formulations, the viscosity of the formulations at 35° C. is substantially lower.

Tables 3 and 4 below present the thermal and mechanical properties of objects formed of an exemplary DLM modeling material formulation as presented in Table 1 above, denoted DLM13 (suitable as DLM formulation in D-ABS mode), compared with objects formed of exemplary formulations currently used as DLM formulation (RGD 515 and RGD515 Plus) in D-ABS mode.

Table 3 presents properties of mold preparations and Table 4 presents properties of objects preparing in 3D inkjet printing, prepared as described hereinabove.

TABLE 3

| | RGD 515 Plus | RGD 515 | DLM13 |
|---|---|---|---|
| Impact [J/m] mold | 62.3 ± 7.8 | 73.6 ± 3.3 | 76.8 ± 4.6 |
| HDT [° C.] mold | 33.6 ± 0.1 | 44.6 ± 1.4 | 36.6 ± 1.8 |
| Tensile strength [MPa] mold | 10.2 ± 2.1 | 13.8 ± 1.0 | 8.5 ± 3.0 |
| Elongation [%] mold | 25.6 ± 1.1 | 38.4 ± 5.8 | 35.4 ± 12.2 |
| Flexural strength [MPa] | 11.1 ± 1.4 | 13.8 ± 1.9 | 5.4 ± 0.6 |
| Flexural Modulus [MPa] | 486.7 ± 69.8 | 703.1 ± 218.6 | |

TABLE 4

| | RGD 515 Plus | RGD 515 | DLM13 |
|---|---|---|---|
| Print Impact | 55.4 ± 4.5 | 73.1 ± 6.3 | 94.9 ± 9.5 |
| Print HDT | 40.6 ± 0.4 | 40.6 ± 0.7 | 40.14 |
| Tensile strength, MPa | 29.9 ± 1.2 | 30.2 ± 1.2 | 25.3 ± 0.5 |
| Elongation, % | 59.7 ± 5.1 | 95.2 ± 5.9 | 44.8 ± 3.8 |
| Flexural strength, MPa | 40.5 ± 0.6 | 37.2 ± 1.0 | 19.3 ± 0.8 |
| Flexural Modulus, MPa | 1340.0 ± 26.0 | 1276.0 ± 59.0 | 815.0 ± 76.5 |

As can be seen in Tables 3 and 4, the properties of objects made of DLM formulations by 3D-inkjet printing are generally superior to those of respective objects formed in mold.

Tables 5 and 6 below present the thermal and mechanical properties of objects formed of an exemplary RF modeling material formulation as presented in Table 1 above, denoted RF13 (suitable as RF formulation in D-ABS mode), compared with objects formed of exemplary formulations currently used as RF formulation (RGD531) in D-ABS mode.

Table 5 presents properties of mold preparations and Table 6 presents properties of objects preparing in 3D inkjet printing, prepared as described hereinabove. OOP denotes "out of printer" and describes the obtained object without post-treatment, and "PT" denotes post-treatment of the objected object by heating at least 100° C. for 1 hour.

TABLE 5

| | RGD 531 | RF13 |
|---|---|---|
| Impact OOP [J/m] | 23.65 ± 0.89 | 29.96 ± 5.14 |
| Impact PT [J/m] | 21.49 ± 1.75 | 28.86 ± 0.14 |
| HDT OOP [° C.] | 76.76 ± 1.08 | 78.24 ± 0.4 |
| HDT PT [° C.] | 101.31 ± 1.72 | 100.80 ± 1.23 |
| Tensile strength [Map] mold | 24.22 ± 7.07 | 41.22 ± 10.15 |
| Elongation [%] mold | 2.91 ± 1.06 | 3.32 ± 1.19 |
| Flex strength [MPa] mold | 45.17 ± 4.42 | |
| Flex modulus [MPa] mold | 1631.6 ± 154.42 | |

TABLE 6

| | RGD 531 | RF13 |
|---|---|---|
| Print Impact OOP [J/m] | 18.6 ± 1.9 | 32.85 ± 5.12 |
| Print Impact PT [J/m] | | 25.9 ± 4.1 |
| Print HDT OOP [° C.] | | 75.26 ± 1.61 |
| Print HDT PT [° C.] | | 91.07 |
| Tensile strength [MPa] | 64.7 ± 1.1 | 69.24 ± 1.22 |
| Strain at break [%] | 17.7 ± 1.3 | 5.44 ± 0.20 |
| Flex strength [MPa] | 91.5 ± 3.9 | 86.27 ± 0.45 |
| Flex modulus [MPa] | 2657.8 ± 195.1 | 2439.0 ± 60.07 |

Tables 7 presents the thermal and mechanical properties of objects made of an exemplary formulation as presented in Table 1, denoted M-33, in single jetting mode, of a respective currently used formulation, VeroClear, and of objects made in D-ABS mode from the exemplary formulations DLM13 and RF13 (denoted D-ABS-13) and of the respective currently used formulations (RGD515 and RGD531). Table 7 presents data obtained for objects printed in "glossy" mode.

TABLE 7

|  | Vero clear | M-33 Glossy | D-ABS-13 | D-ABS (RGD515 + RGD531) SDS |
|---|---|---|---|---|
| Print Impact OOP | 41.8 ± 11.7 | 28.96 ± 6.44 | 72.54 ± 4.33 | 65-80 |
| Print HDT OOP | 53.1 ± 0.4 | 52.1 ± 0.43 | 58.86 ± 0.66 | 58-68 |
| Print Impact PT | — | — | 87.81 ± 7.29 |  |
| Print HDT PT | — | — | 118.04 | 92-95 |
| Tensile strength, MPa | — | — | 52.3 ± 0.5 | 55-60 |
| Elongation, % | — | — | 18.2 ± 6.5 | 25-40 |
| Tensile modulus, MPa | — | — | 1560.9 ± 156.7 | 2600-3000 |
| Flexural strength, MPa | 82.7 ± 1.7 | 70 ± 0.2 | 50.5 ± 0.2 | 65-75 |
| Flexural Modulus, MPa | 2378.3 ± 22 | 2122 ± 32 | 1404.8 ± 31.4 | 1700-2200 |
| Curling 10 × 10 × 230 | 3 | 5 | 3.5-4 |  |
| Curling 10 × 35 × 230 | 2 | 4.5 | 4 |  |

Table 8 presents the thermal and mechanical properties of objects made of an exemplary formulation as presented in Table 1, denoted M-33, in single jetting mode, of a respective currently used formulation, VeroClear, and of objects made in D-ABS mode from the exemplary formulations DLM13 and RF13 (denoted D-ABS-13), for objects printed in "Matte" mode, as defined herein. VeroClear was used with SUP705 support material formulation and M33 was used with a support material formulation featuring low viscosity at a temperature of up to ° C., as described in U.S. Provisional Patent Application No. 62/612,455.

TABLE 8

|  | Vero clear + Sup705 | M-33 (no byk) + A.3 (0.01byk) | D-ABS-13 |
|---|---|---|---|
| Print Impact OOP | 36.8 ± 8.22 | 30.0 ± 0.6 | 70.5 ± 3.8 |
| Print HDT OOP | 54.71 ± 1.01 | 52.1 ± 0.6 | 64.1 ± 0.6 |
| Print Impact PT | — | — | 70.0 ± 30.7 |
| Print HDT PT | — | — | 106.2 |
| Tensile strength, MPa | — | — | 42.1 ± 0.9 |
| Elongation, % | — | — | 12.9 ± 1.6 |
| Tensile modulus, MPa | — | — | 1343.6 ± 77.7 |
| Flexural strength, MPa | 66.9 ± 0.5 | 54.8 ± 1.9 | 40.8 ± 2.4 |
| Flexural Modulus, MPa | 1817.2 ± 44.5 | 1436.1 ± 73.8 | 1046 ± 99.9 |

Example 3

Modeling Material Formulation Providing, when Hardened, Elastomeric Materials

Table 9 below presents exemplary chemical compositions of modeling material formulations suitable for use in 3D inkjet printing of elastomeric materials, as defined herein, in, for example, single jetting and PolyJet technologies, including DM mode.

Generally speaking, exemplary formulations for forming elastomeric materials elastomeric curable materials, at a concentration of at least 30% by weight, combined with one or more non-elastomeric monofunctional curable materials, at a total weight of no more than 60% by weight, and optionally one or more non-elastomeric difunctional curable materials, at a total weight of no more than 10%, preferably no more than 6%, by weight, of the total weight of the formulation, and further optionally one or more non-reactive materials (non-reactive diluents) that feature low viscosity at room temperature (e.g., lower than 20 cPs).

TABLE 9

| Component | Exemplary Materials | Percentage (%) |
|---|---|---|
| Non-elastomeric Monofunctional curable (meth)acrylic material | IBOA (Isobornyl acrylate; CAS: 5888-33-5) IBOMA (Isobornyl methacrylate; CAS: 7534-94-3; SR 423D) CN131B (2-Hydroxy-3-phenoxypropyl prop-2-enoate) SR285 (Tetrahydrofuryl Acrylate) | 20-60 |
| Non-elastomeric Difunctional curable (meth)acrylic material | SR 9036 (Ethoxylated (30) bisphenol A dimethacrylate; CAS: 41637-38-1) Ebecryl 230 (Aliphatic Urethane Diacrylate) | 0-6 |
| Elastomeric (meth)acrylic material | Genomer 1122 (2-[[(Butylamino) carbonyl]oxy]ethyl acrylate) | 35-60 |
| Non-Reactive diluent | PPG600 | 0-15 |
| Photoinitiator | BAPO type (Bis Acyl Phosphine Oxide) Alpha Hydroxy ketone MAPO (Monoacylphosphine oxides) | 1-3 (e.g., 1-2) |
| Surfactant/Dispersant Inhibitor | BYK Type (PDMS derivatives) MEHQ Genorad Type | 0-1 0.01-1 |
| Inorganic/Organic Pigment | Nano scale Titanium Oxide Nano scale Zirconium Oxide Nano Silica Nano scale carbon black | 0-2 |

Table 10 below presents the elongation of elastomeric objects formed of the exemplary modeling material formulations as presented in Table 9 above, denoted as RS-26X and RS-48E, compared with objects formed of exemplary currently used elastomeric formulations, denoted as TangoPlus and Agilus 30, as well as the viscosity of the formulations used for forming the objects.

TABLE 10

|  | TangoPlus | Agilus 30 | RS-26X | RS48E |
|---|---|---|---|---|
| Elongation (%) | 170 | 230 | >290 | >290 |
| Viscosity at 35° C. /10 RPM | 61.20 | 109.90 | 15.50 | 13.40 |

As can be seen in Table 10, the formulations presented herein feature a substantially reduced viscosity at 35° C. compared to currently used formulations for providing elastomeric hardened materials, whereby the hardened elastomeric materials obtained from these formulations also feature a substantially higher elongation.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A kit comprising a first modeling material formulation and a second modeling material formulation, each individually packaged with the kit, the first and second modeling material formulations being usable in additive manufacturing of a shelled, multi-material three-dimensional object, wherein each of said first and second modeling material formulations features a viscosity of no more than 50 cPs at 35° C.,
    and wherein said first formulation is characterized, when hardened, by heat deflection temperature (HDT) of at least 60° C., and said second formulation is characterized, when hardened, by Izod notch impact resistance (IR) value of at least 40 J/m,
    wherein said first modeling material formulation comprises:
    at least one monofunctional hydrophobic curable (meth) acrylic material, characterized, when hardened, by Tg higher than 80° C., in an amount of 25 to 40% by weight of the total weight of said first formulation; and
    at least one difunctional hydrophobic curable (meth) acrylic material, characterized, when hardened, by Tg higher than 80° C., in an amount of 15 to 30% by weight of the total weight of said first formulation,
    wherein a total amount of said monofunctional and said difunctional and/or trifunctional hydrophobic curable (meth)acrylic materials, characterized, when hardened, by Tg higher that 80° C., ranges from 50 to 60% by weight of the total weight of said first formulation, and
    at least one monofunctional hydrophilic curable (meth) acrylic material, characterized, when hardened, by Tg higher than 80° C., in an amount of 25 to 35% by weight of the total weight of said first formulation;
    at least one monofunctional hydrophobic curable material which provides, when hardened, a material featuring Tg lower than 25° C., in an amount of from 1 to 5% by weight of the total weight of the first formulation; and
    at least one difunctional hydrophobic curable material which provides, when hardened, a material featuring Tg lower than 25° C., in an amount of from 5 to 15% by weight of the total weight of the first formulation,
    wherein a total amount of said monofunctional and said difunctional hydrophobic curable (meth)acrylic materials, characterized, when hardened, by Tg lower than 25° C., ranges from 5 to 15% by weight of the total weight of said first formulation,
    and wherein said second modeling material formulation comprises:
    at least one hydrophobic curable material which provides, when hardened, a material featuring Tg higher than 80° C., in a total amount of from 30 to 45 weight percent of the total weight of said second formulation; and
    at least one hydrophilic curable material which provides, when hardened, a material featuring Tg higher than 80° C., in a total amount of from 25 to 35 weight percent of the total weight of said second formulation.

2. The kit of claim 1, wherein said at least one hydrophobic curable material which provides, when hardened, a material featuring Tg higher than 80° C. in said second formulation comprises at least one monofunctional curable material and/or at least one multifunctional curable material, wherein an amount of said at least one monofunctional curable material ranges from 25 to 40 weight percents of the total weight of said second formulation, and an amount of said at least one multifunctional curable material ranges from 0 to 25 weight percents of the total weight of said second formulation.

3. The kit of claim 1, wherein said at least one hydrophilic curable material which provides, when hardened, a material featuring Tg higher than 80° C. in said second formulation comprises at least one monofunctional curable material and/or at least one multifunctional curable material, wherein an amount of said at least one monofunctional curable material ranges from 20 to 35 weight percents of the total weight of said second formulation, and an amount of said at least one multifunctional curable material ranges from 0 to 5 weight percents of the total weight of said second formulation.

4. A method of fabricating a shelled, multi-material three-dimensional object that comprises a core region and at least one envelope region that at least partially surrounds the core region, the method comprising:
    receiving three-dimensional printing data corresponding to the shape of the object; and
    dispensing droplets of at least a first modeling material formulation and a second modeling material formulation in layers, on a receiving medium, using at least one inkjet printing head, according to said printing data,
    wherein each of said at least a first modeling material formulation and a second modeling formulation is dispensed from a different inkjet printing head and/or a different array of nozzles of an inkjet printing head,
    wherein said dispensing is such that said core region is made of a voxelated combination between said first modeling formulation and said second modeling formulation, and said at least one envelope region is made of said second modeling material formulation,
    wherein a temperature of said inkjet printing heads and of said formulation system is no more than 45° C.,
    and wherein:
    said first formulation is characterized, when hardened, by heat deflection temperature (HDT) of at least 60° C., and said second formulation is characterized, when hardened, by Izod notch impact resistance (IR) value of at least 40 J/m,
    wherein said first modeling material formulation comprises:
    at least one monofunctional hydrophobic curable (meth) acrylic material, characterized, when hardened, by Tg higher than 80° C., in an amount of 25 to 40% by weight of the total weight of said first formulation; and
    at least one difunctional hydrophobic curable (meth) acrylic material, characterized, when hardened, by Tg higher than 80° C., in an amount of 15 to 30% by weight of the total weight of said first formulation, wherein a total amount of said monofunctional and said difunctional and/or trifunctional hydrophobic curable (meth)acrylic materials, characterized, when hardened, by Tg higher that 80° C., ranges from 50 to 60% by weight of the total weight of said first formulation, and at least one monofunctional hydrophilic curable (meth) acrylic material, characterized, when hardened, by Tg higher than 80° C., in an amount of 25 to 35% by weight of the total weight of said first formulation;

at least one monofunctional hydrophobic curable material which provides, when hardened, a material featuring Tg lower than 25° C., in an amount of from 1 to 5% by weight of the total weight of the first formulation; and at least one difunctional hydrophobic curable material which provides, when hardened, a material featuring Tg lower than 25° C., in an amount of from 5 to 15% by weight of the total weight of the first formulation, wherein a total amount of said monofunctional and said difunctional hydrophobic curable (meth)acrylic materials, characterized, when hardened, by Tg lower than 25° C., ranges from 5 to 15% by weight of the total weight of said first formulation, and wherein said second modeling material formulation comprises:

at least one hydrophobic curable material which provides, when hardened, a material featuring Tg higher than 80° C., in a total amount of from 30 to 45 weight percent of the total weight of said second formulation; and at least one hydrophilic curable material which provides, when hardened, a material featuring Tg higher than 80° C., in a total amount of from 25 to 35 weight percent of the total weight of said second formulation.

5. The method of claim 4, wherein for at least a few of said layers, said dispensing is such that said at least one envelope region comprises an inner envelope region and an outer envelope region, wherein said outer envelope region is made of said second modeling material formulation and said inner envelope region is made of said first modeling material formulation.

6. The method of claim 5, wherein for at least a few of said layers, said dispensing is such that said at least one envelope region further comprises an additional envelope region between said inner envelope region and said outer envelope region, wherein said additional envelope region is made of a voxelated combination of said first modeling formulation and said second modeling formulation.

7. The kit of claim 1, wherein said second formulation further comprises at least one of:

at least one hydrophobic curable material which provides, when hardened, a material featuring Tg lower than 25° C.; and at least one hydrophilic curable material which provides, when hardened, a material featuring Tg lower than 25° C.

8. The kit of claim 1, wherein said second formulation further comprises at least one hydrophilic curable material which provides, when hardened, a material featuring Tg lower than 25° C., in a total amount of from 10 to 40 weight percent of the total weight of the second formulation.

9. The kit of claim 1, wherein said second formulation further comprises a curable material featuring a viscosity at room temperature of no more than 15 centipoises, wherein an amount said curable material ranges from 1 to 5, weight percent of the total weight of said second formulation.

10. The kit of claim 1, wherein said second modelling material formulation comprises:

at least one monofunctional hydrophobic curable (meth) acrylic material, characterized, when hardened, by Tg higher than 80° C., in an amount of 30 to 40% by weight of the total weight of said second formulation; and at least one difunctional hydrophobic curable (meth) acrylic material, characterized, when hardened, by Tg higher than 80° C., in an amount of 0 to 25% by weight of the total weight of said second formulation, wherein a total amount of said monofunctional and multifunctional hydrophobic curable (meth)acrylic materials, characterized, when hardened, by Tg higher than 80° C., ranges from 30 to 45% by weight of the total weight of said second formulation, and at least one monofunctional hydrophilic curable (meth) acrylic material, characterized, when hardened, by Tg higher than 80° C., in an amount of 25 to 35% by weight of the total weight of said second formulation;

at least one trifunctional hydrophilic curable (meth) acrylic material, characterized, when hardened, by Tg lower than 25° C., in an amount of 10 to 40% by weight of the total weight of said second formulation; and at least one reactive diluent in an amount of from 1 to 5% by weight of the total weight of said second formulation, said reactive diluent is a curable material that features a viscosity at room temperature of no more than 15 centipoises.

* * * * *